US010802277B2

(12) United States Patent
Kamiya

(10) Patent No.: US 10,802,277 B2
(45) Date of Patent: Oct. 13, 2020

(54) HEAD-MOUNTED DISPLAY DEVICE

(71) Applicant: SEIKO EPSON CORPORATION, Tokyo (JP)

(72) Inventor: Tomohide Kamiya, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 58 days.

(21) Appl. No.: 16/217,128

(22) Filed: Dec. 12, 2018

(65) Prior Publication Data
US 2019/0235244 A1 Aug. 1, 2019

(30) Foreign Application Priority Data

Feb. 1, 2018 (JP) .................. 2018-016546
May 10, 2018 (JP) .................. 2018-091545

(51) Int. Cl.
G02B 27/01 (2006.01)

(52) U.S. Cl.
CPC ....... *G02B 27/017* (2013.01); *G02B 27/0179* (2013.01); G02B 2027/0154 (2013.01); G02B 2027/0187 (2013.01)

(58) Field of Classification Search
CPC ............ G02B 27/0179; G02B 27/017; G02B 2027/0154; G02B 2027/0187; G02B 27/1033; G02B 27/283; G02B 27/0018; G02B 2027/013; G02B 2027/0174; G02B 2027/0152; G02B 2027/0138; G02B 2027/0118; G02B 2027/0178; G02B 2027/014; G02B 26/0833; G02B 5/3033; G06T 15/506; H04N 5/23219; H04N 5/23238

See application file for complete search history.

(56) References Cited

U.S. PATENT DOCUMENTS

| 5,954,642 | A * | 9/1999 | Johnson | G02B 27/017 600/300 |
| 8,223,024 | B1 * | 7/2012 | Petrou | G06F 3/011 340/573.1 |
| 8,976,086 | B2 * | 3/2015 | Hilkes | G09G 5/00 345/8 |
| 9,069,166 | B2 * | 6/2015 | Abdollahi | G02B 27/0172 |
| 10,261,579 | B2 * | 4/2019 | Wang | G02B 27/022 |
| 2005/0167590 | A1 | 8/2005 | Miyano et al. | |
| 2005/0225867 | A1 | 10/2005 | Ishibashi et al. | |
| 2009/0059501 | A1 | 3/2009 | Yamaguchi | |

(Continued)

FOREIGN PATENT DOCUMENTS

| JP | 2003-169822 A | 6/2003 |
| JP | 2009-065310 A | 3/2009 |
| JP | 2009-199590 A | 9/2009 |

Primary Examiner — Christopher E Leiby
(74) Attorney, Agent, or Firm — Oliff PLC

(57) ABSTRACT

[Solution] A head-mounted display device includes a display section disposed in front of eyes of a user and configured to display an image, a cover section configured to cover the display section when viewed from a position right opposed to the user and wearable on the user, and a position adjusting mechanism capable of adjusting a position of the display section on an opposite side of the display section side across the cover section. The cover section includes a light transmitting section opposed to the display section.

17 Claims, 31 Drawing Sheets

(56) References Cited

U.S. PATENT DOCUMENTS

| | | | |
|---|---|---|---|
| 2011/0050655 A1* | 3/2011 | Mukawa | G02B 6/0018 |
| | | | 345/204 |
| 2011/0248904 A1* | 10/2011 | Miyawaki | G02B 27/017 |
| | | | 345/7 |
| 2013/0278631 A1* | 10/2013 | Border | G06F 3/04842 |
| | | | 345/633 |
| 2015/0338660 A1* | 11/2015 | Mukawa | G02B 5/30 |
| | | | 359/13 |
| 2017/0010471 A1* | 1/2017 | Serrano Canovas | G02B 30/34 |
| 2018/0045964 A1* | 2/2018 | Jones | G02B 27/0172 |
| 2018/0188542 A1* | 7/2018 | Waldern | G02B 27/0176 |
| 2018/0190011 A1* | 7/2018 | Platt | G02B 27/1033 |
| 2019/0179409 A1* | 6/2019 | Jones | A61B 3/113 |

\* cited by examiner

[FIG. 1]
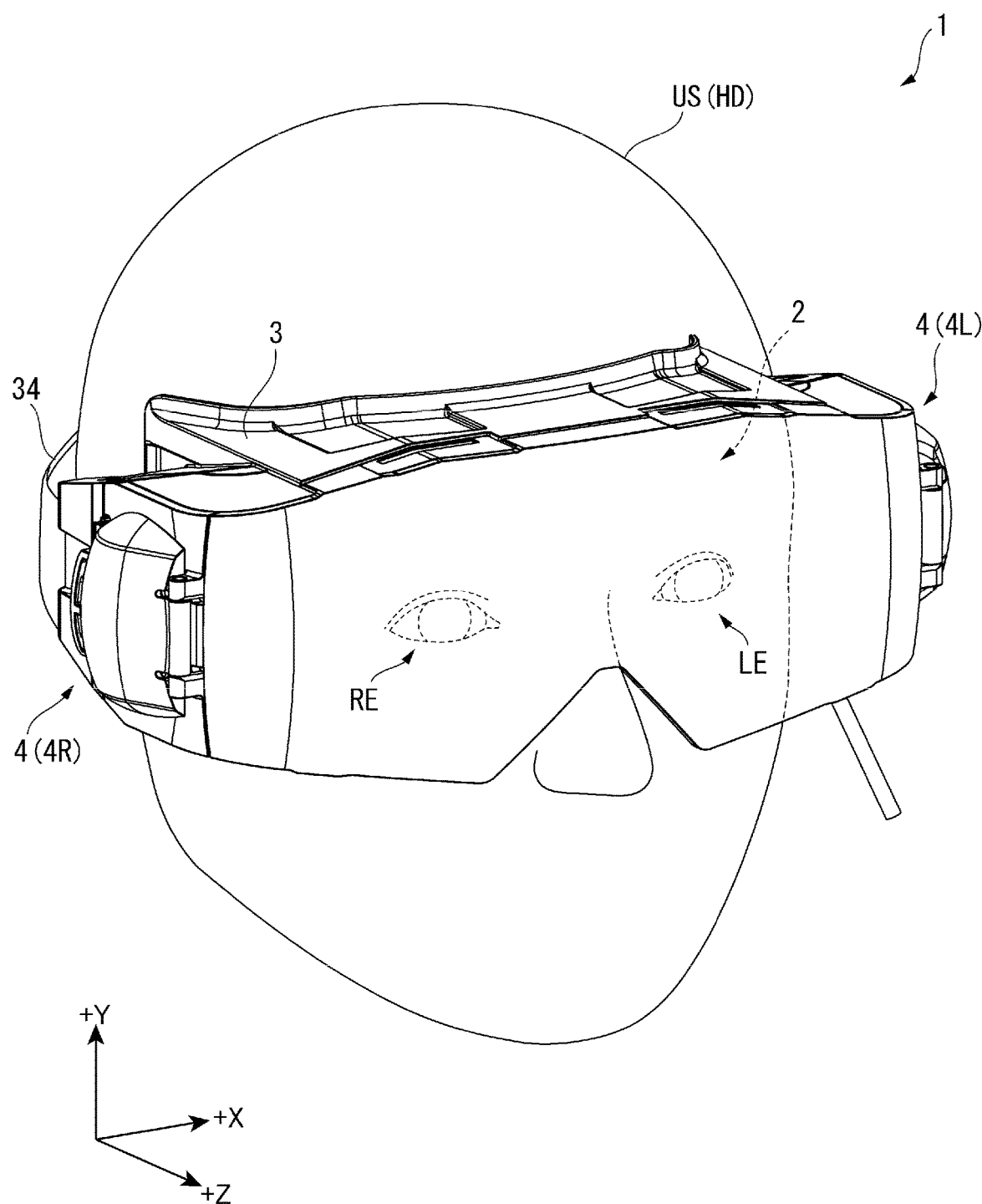

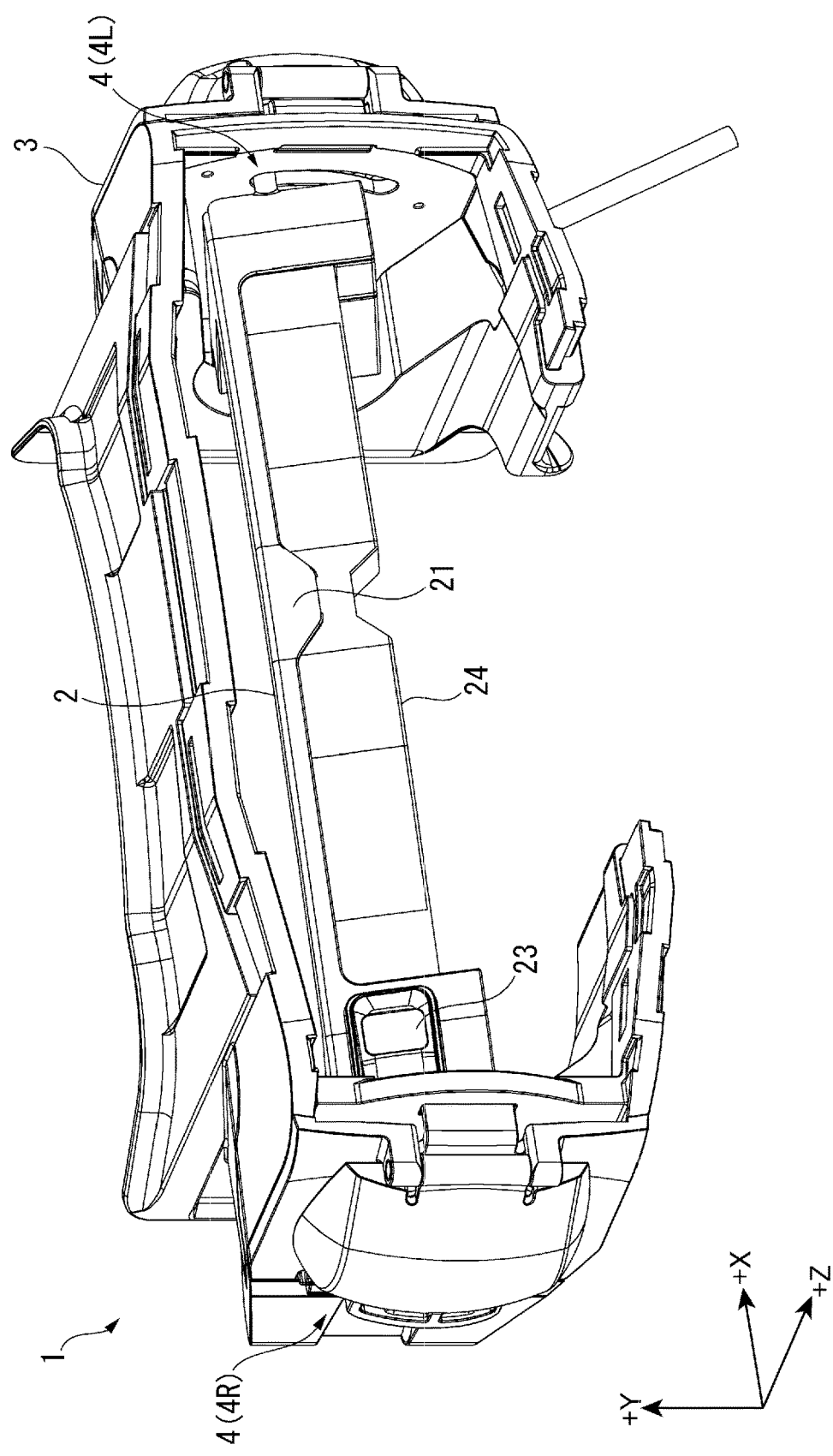
[FIG. 2]

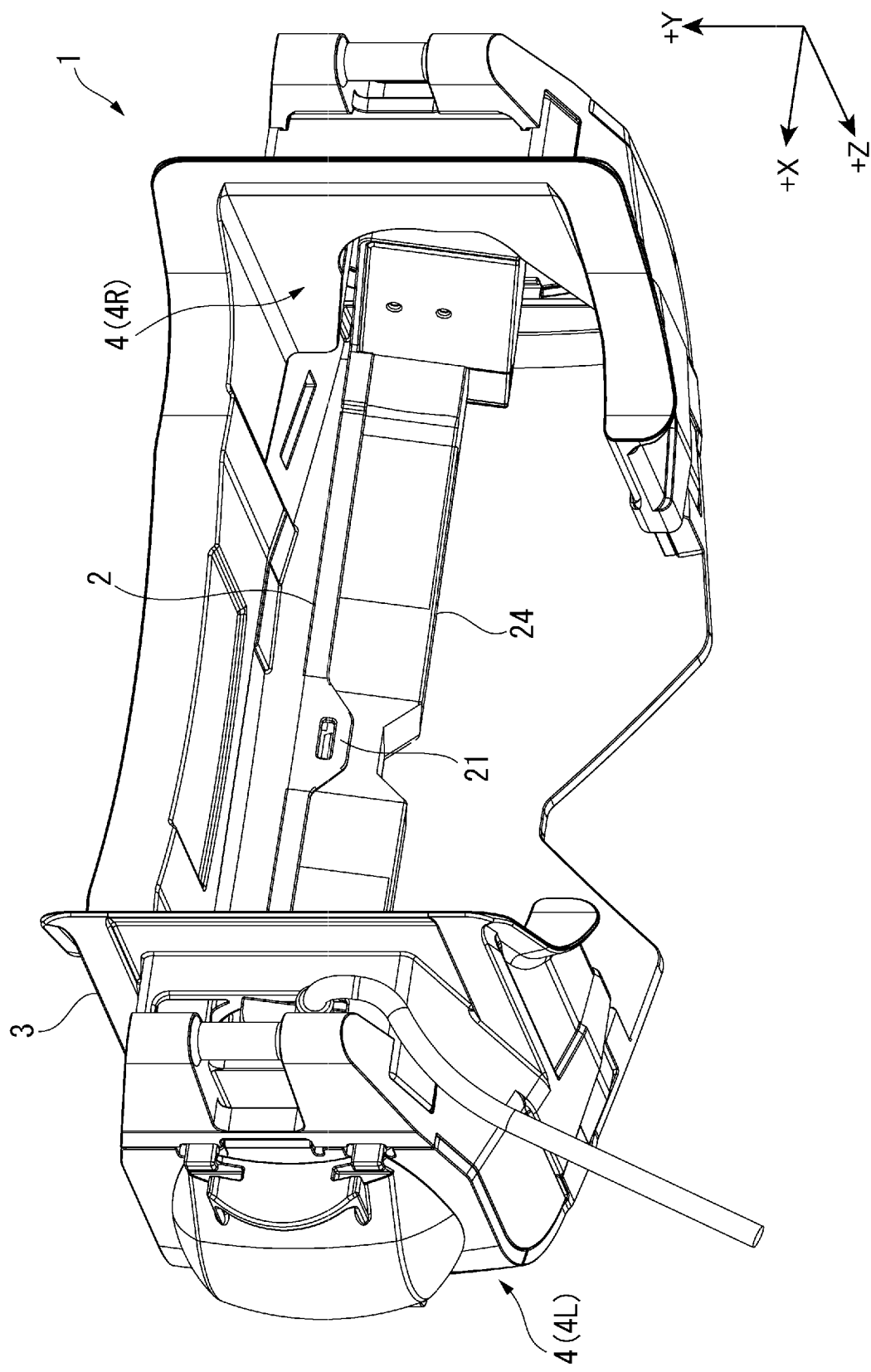

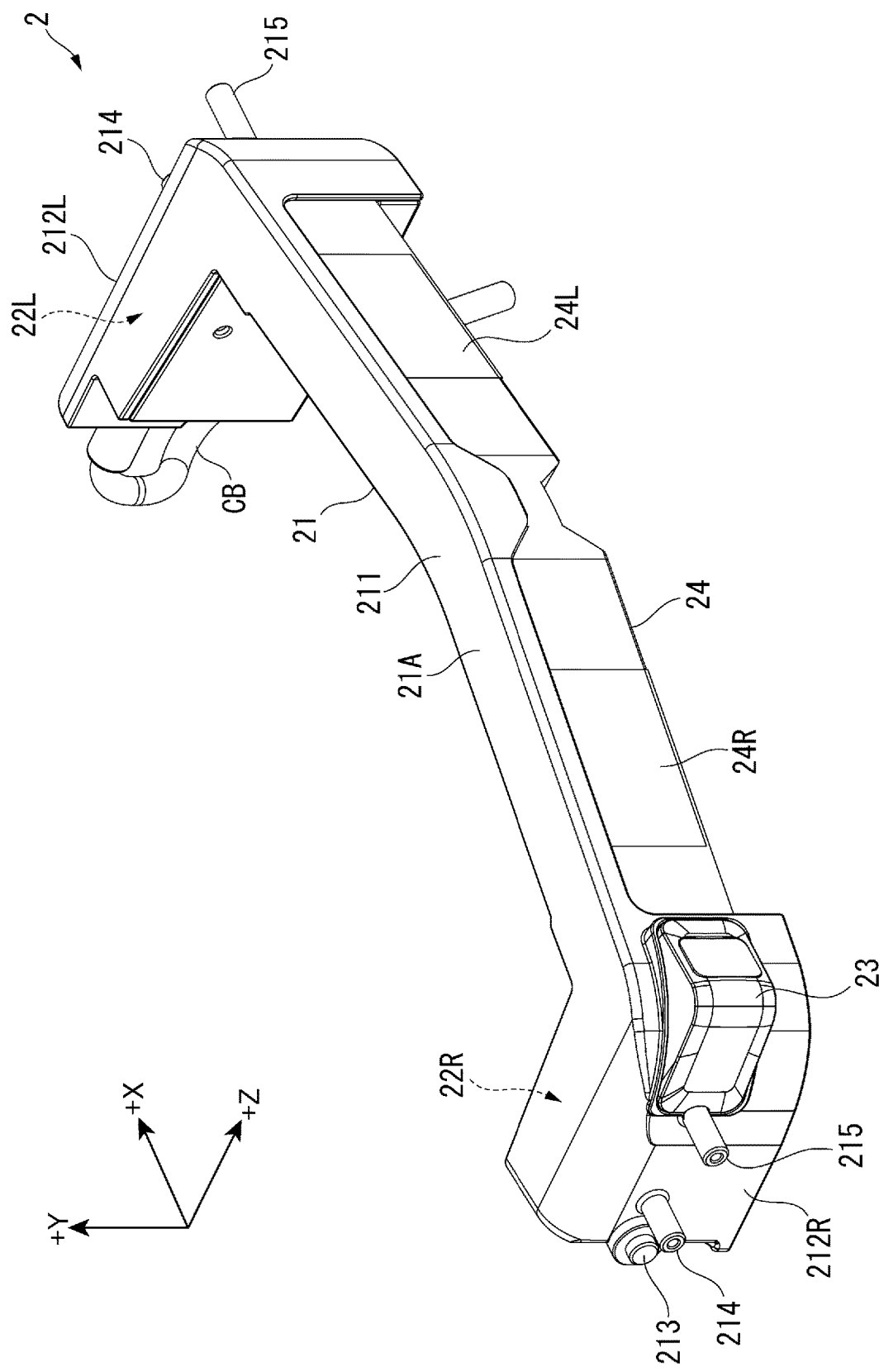
[FIG. 4]

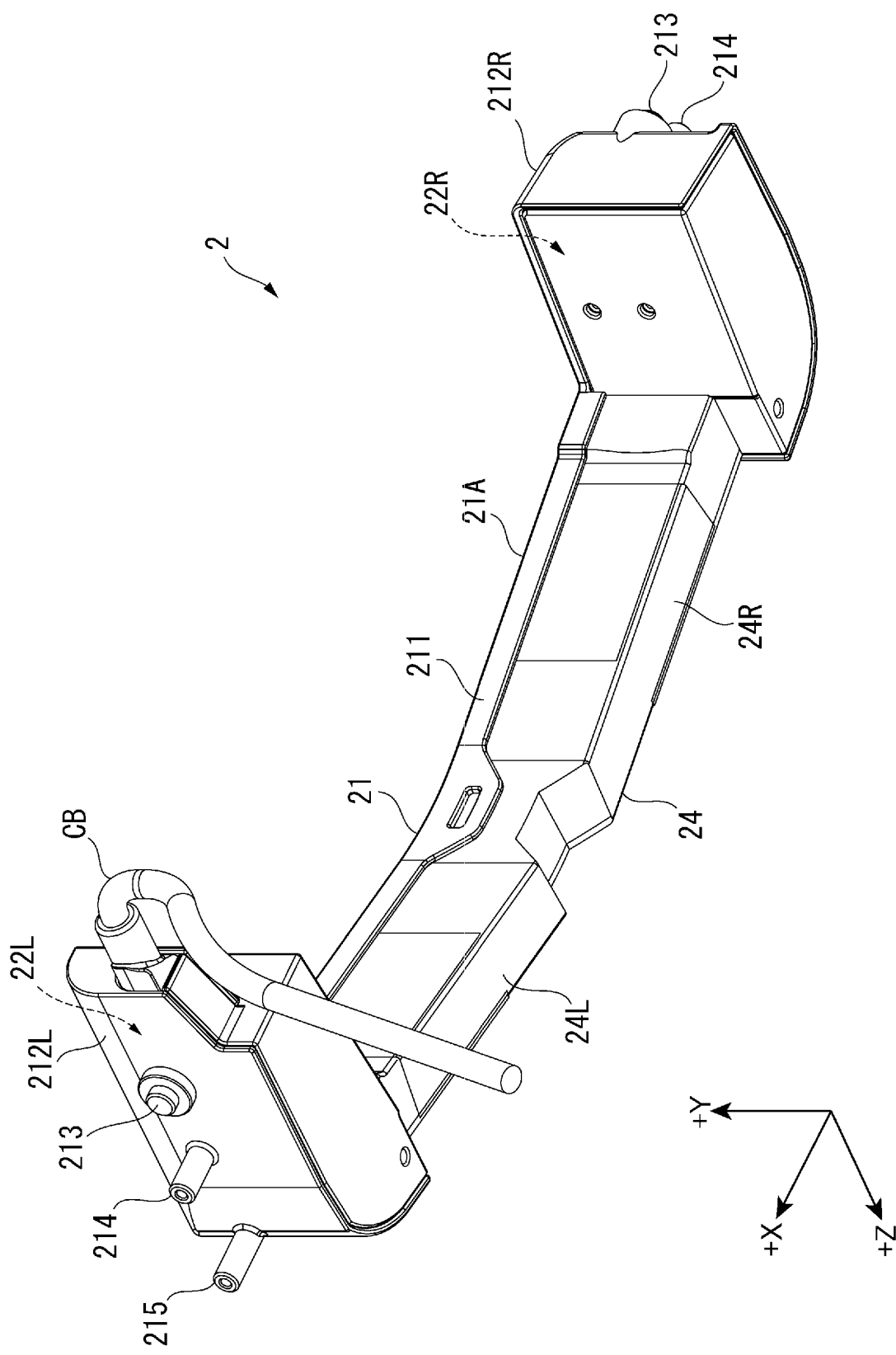

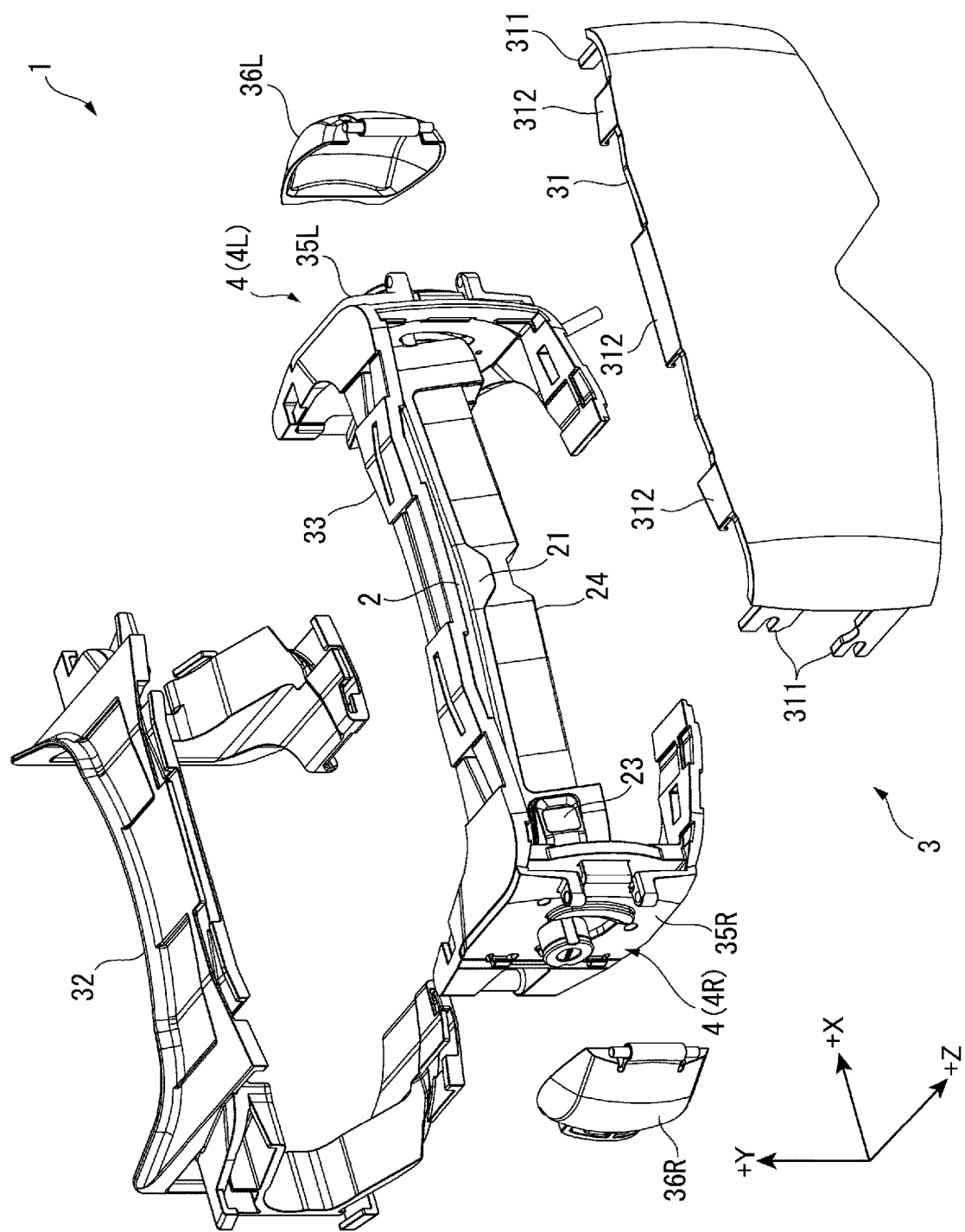
[FIG. 6]

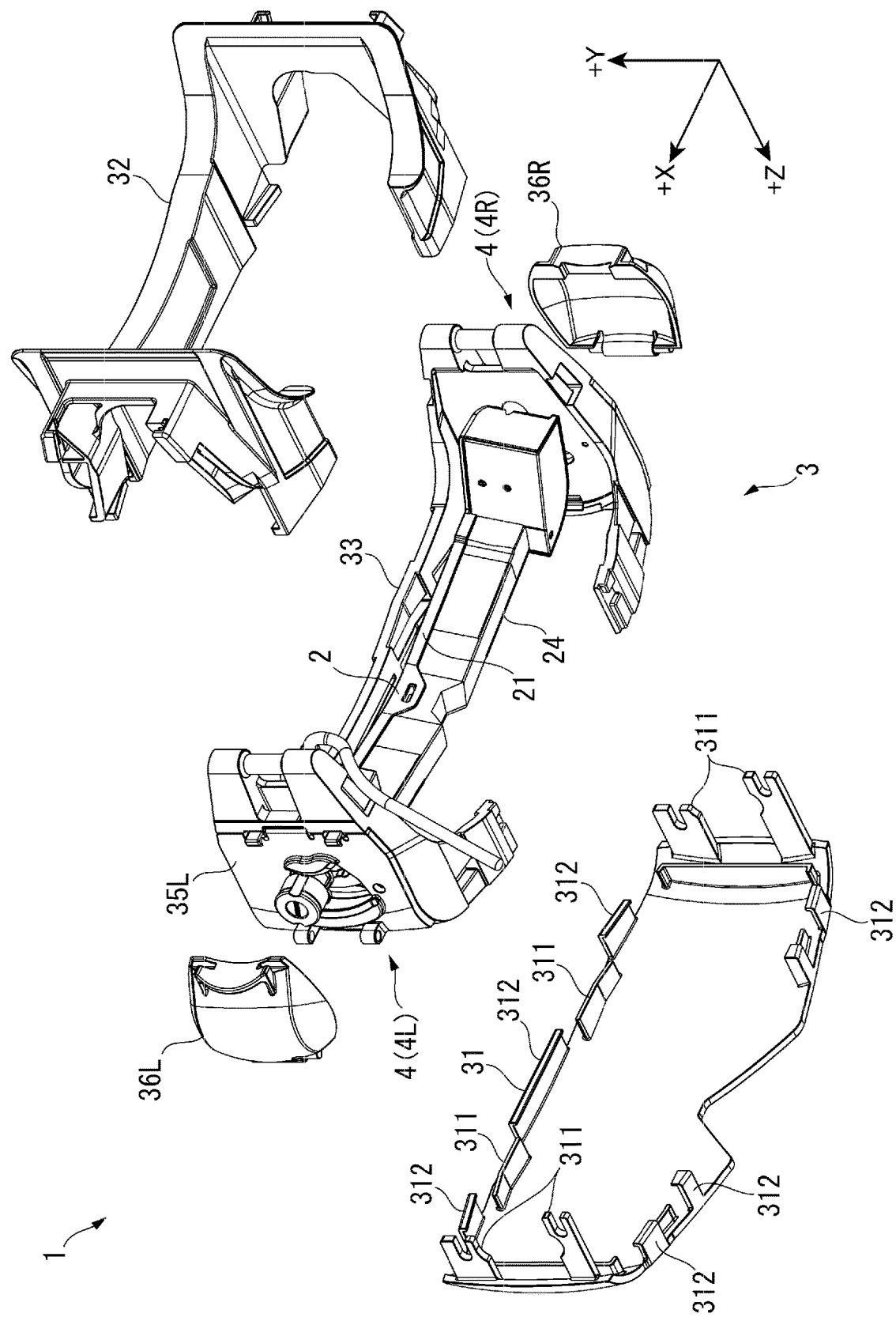

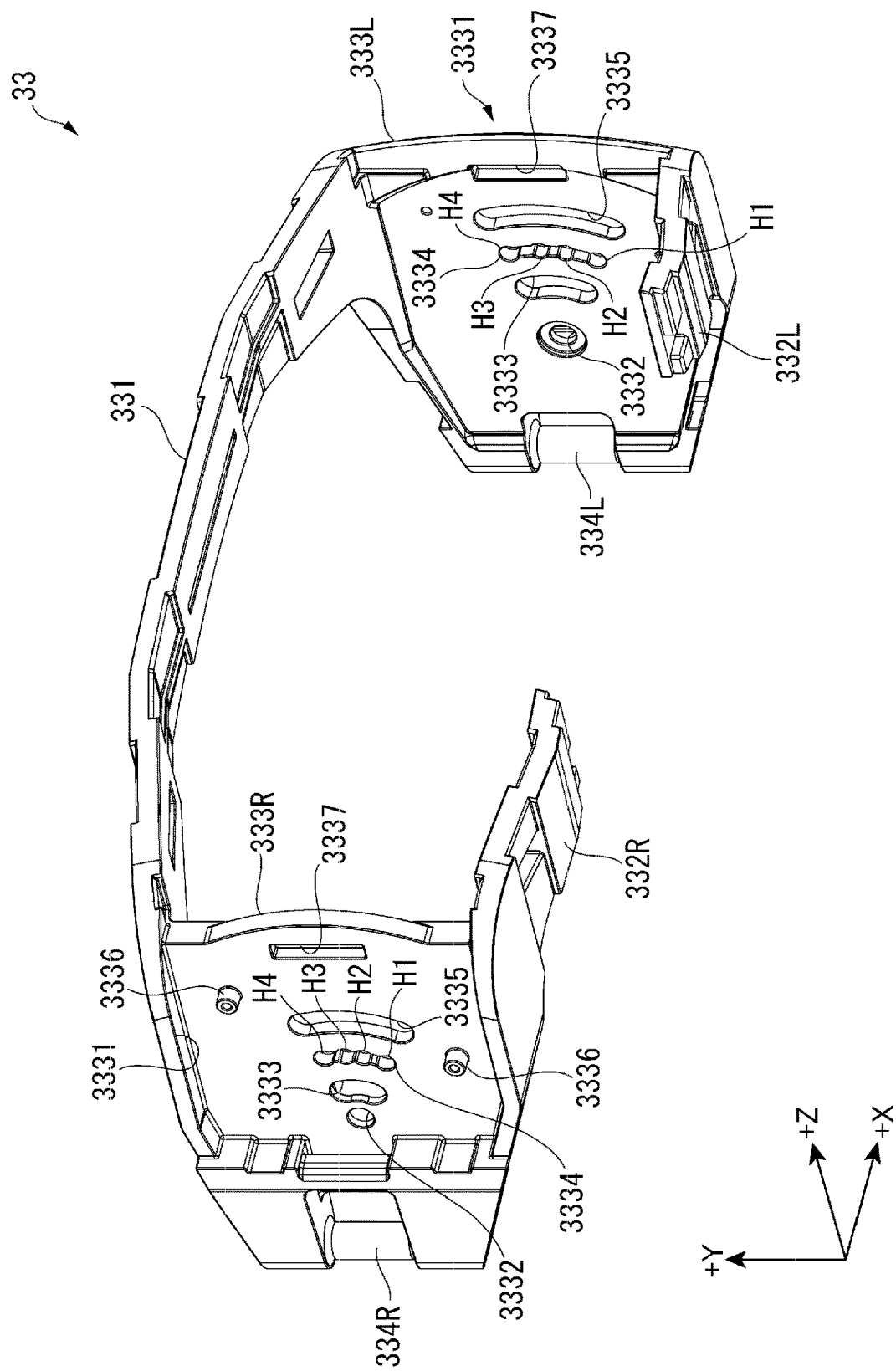
[FIG. 8]

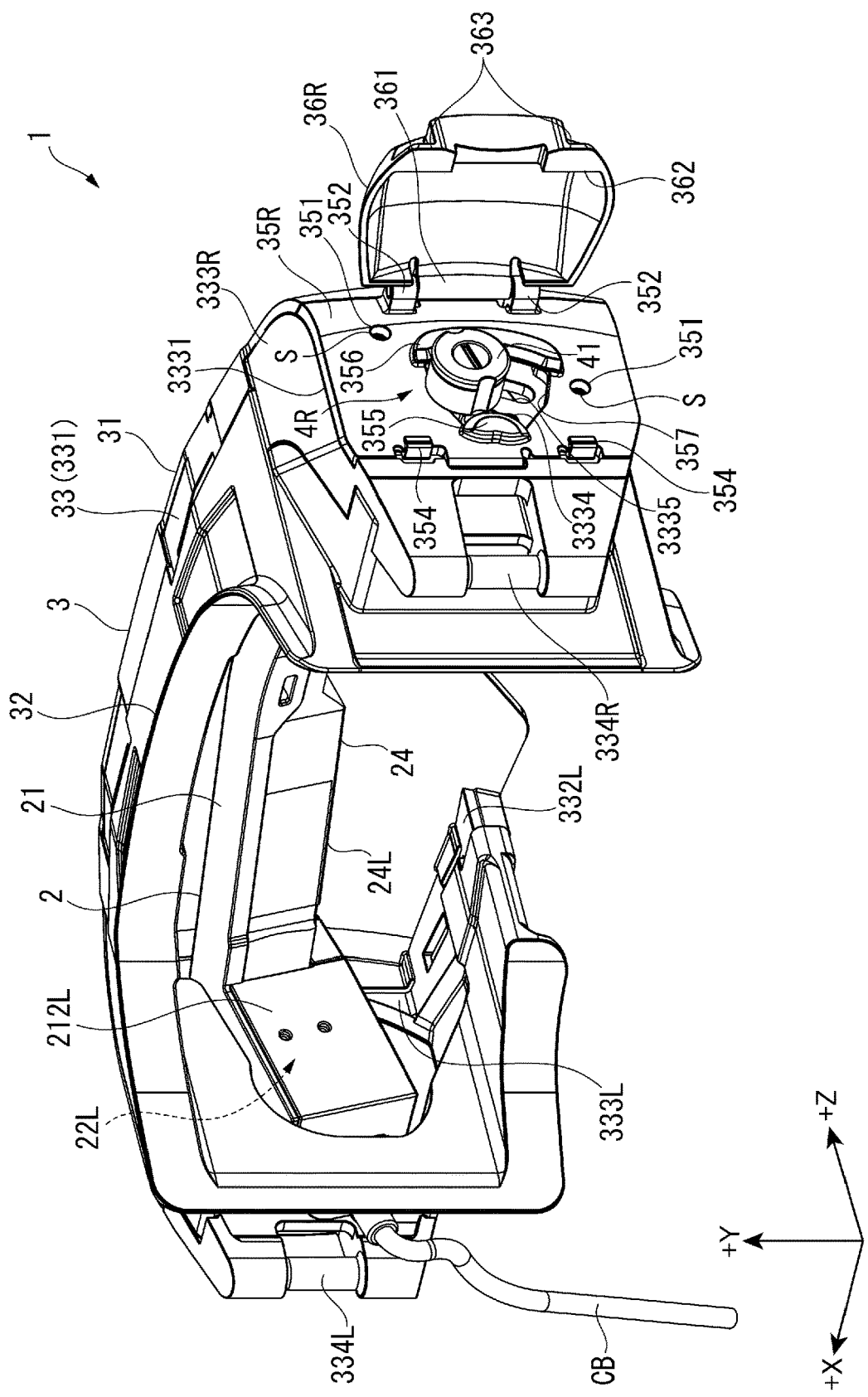
[FIG. 9]

[FIG. 10]
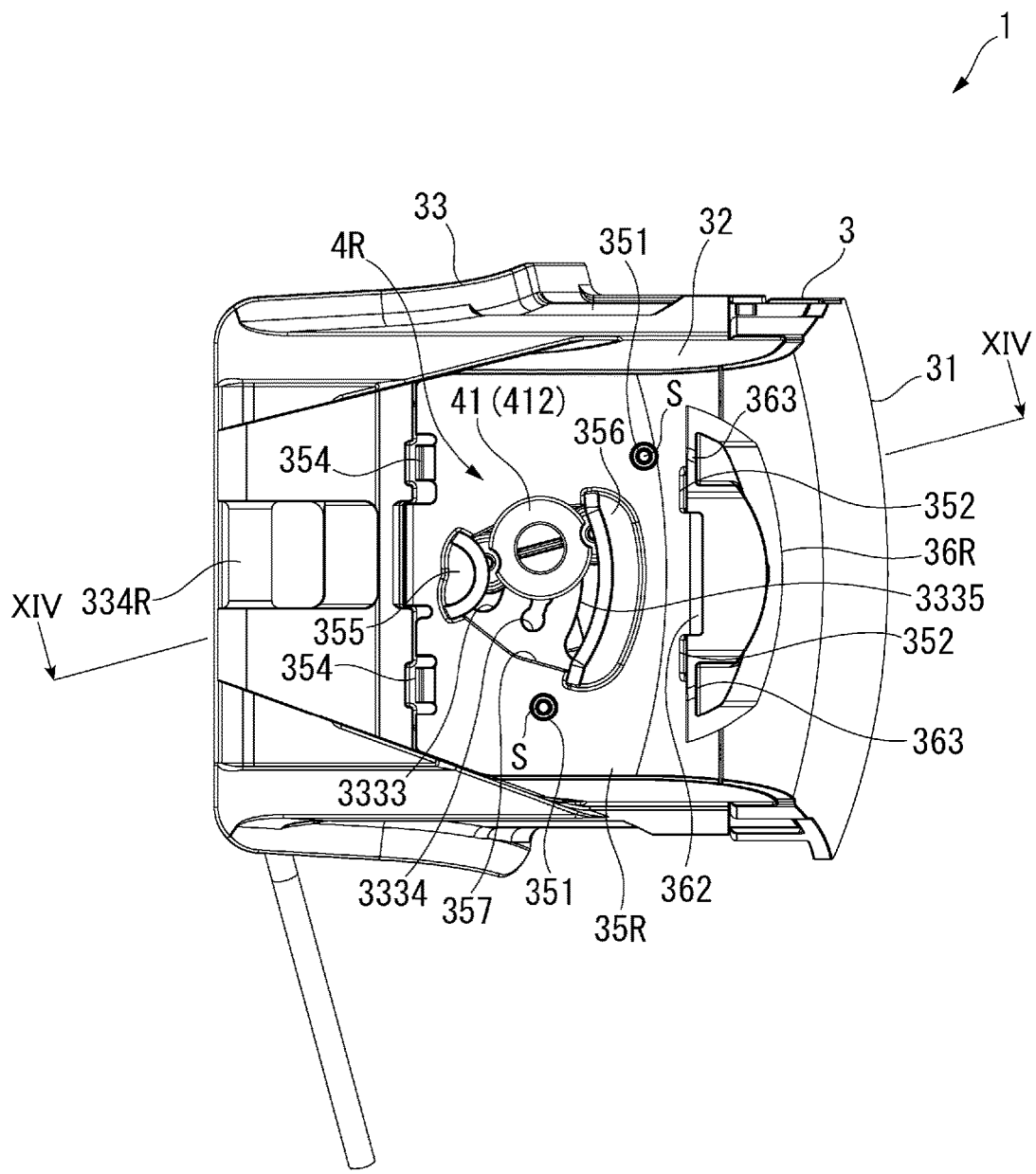

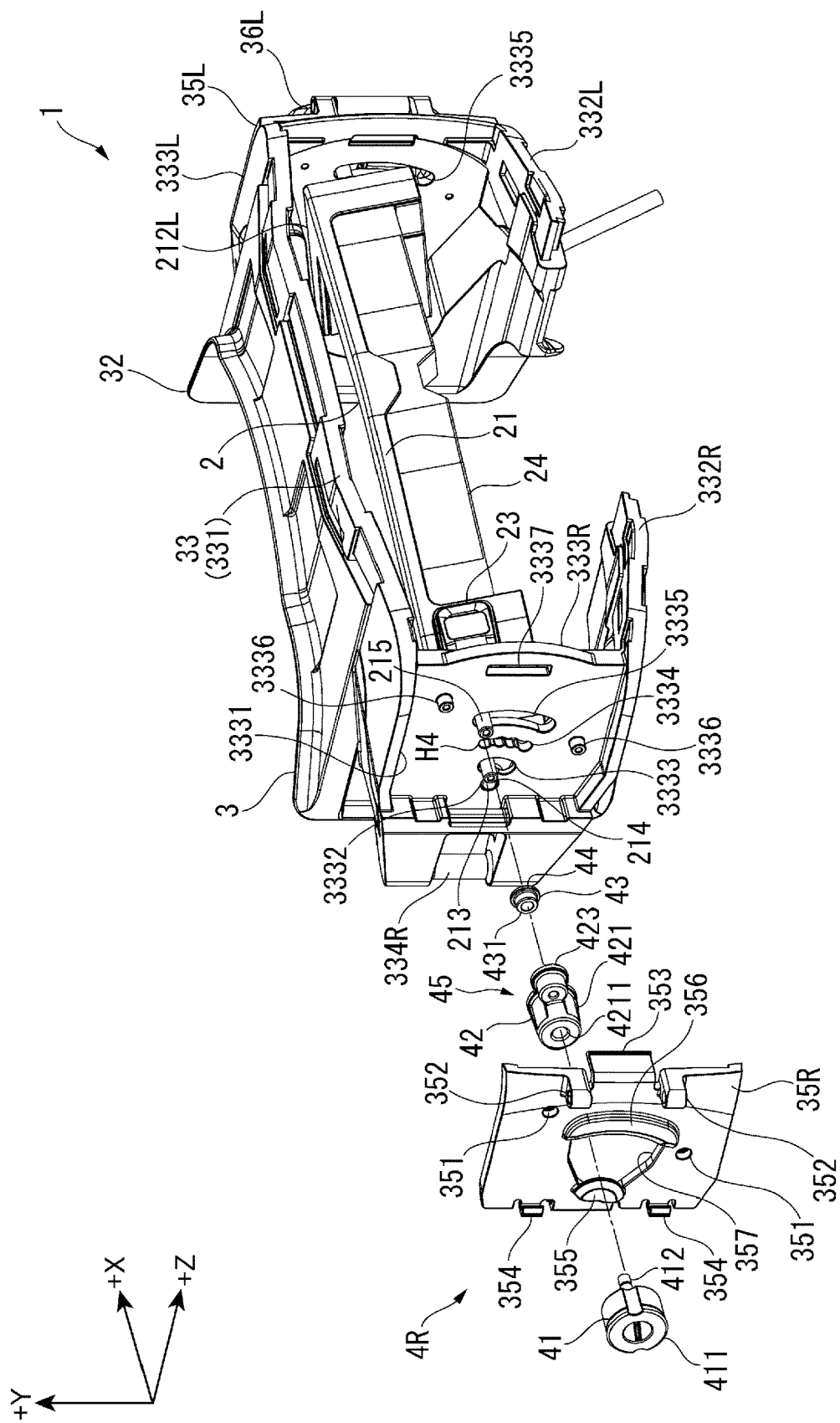
[FIG. 11]

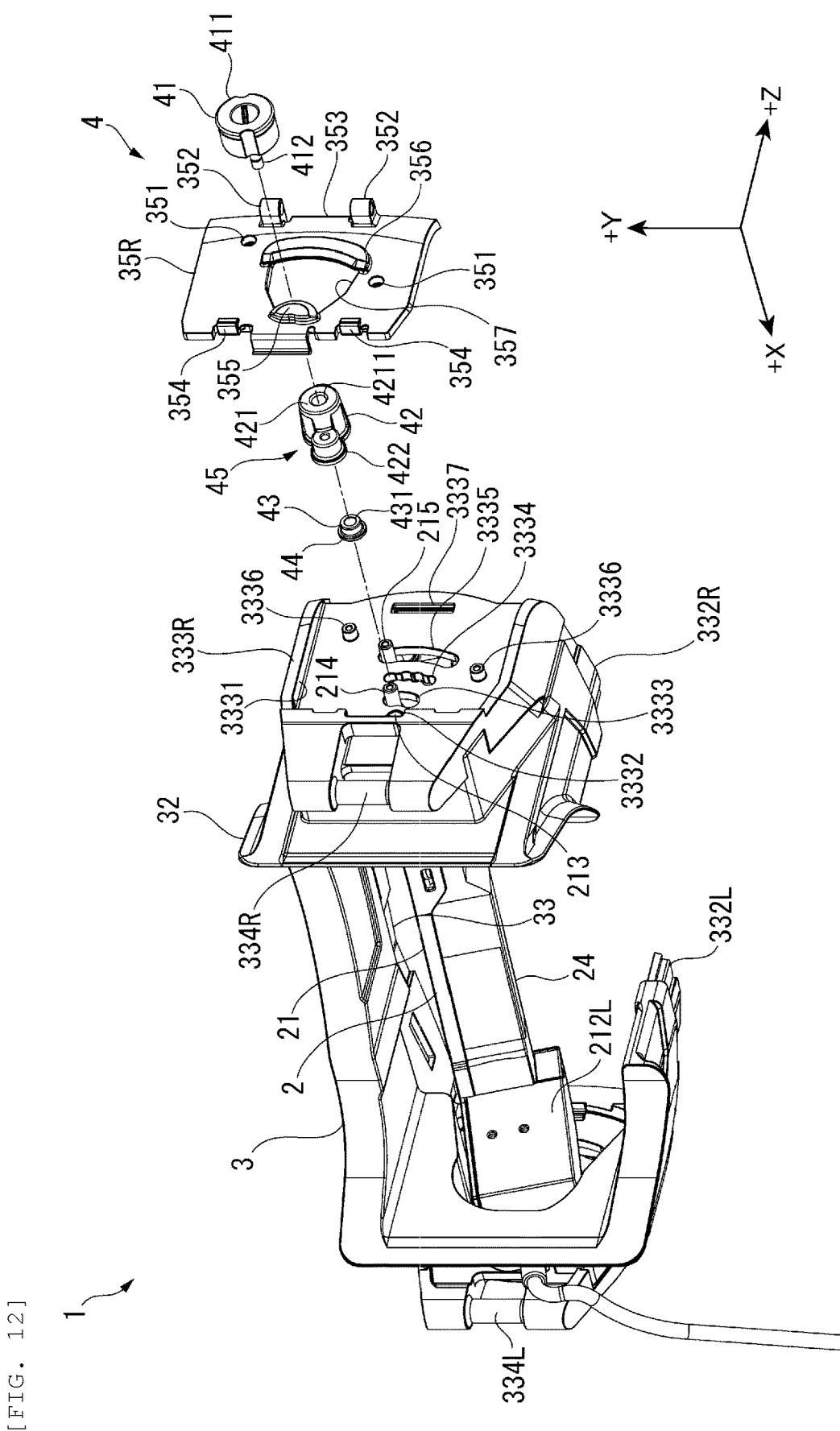
[FIG. 12]

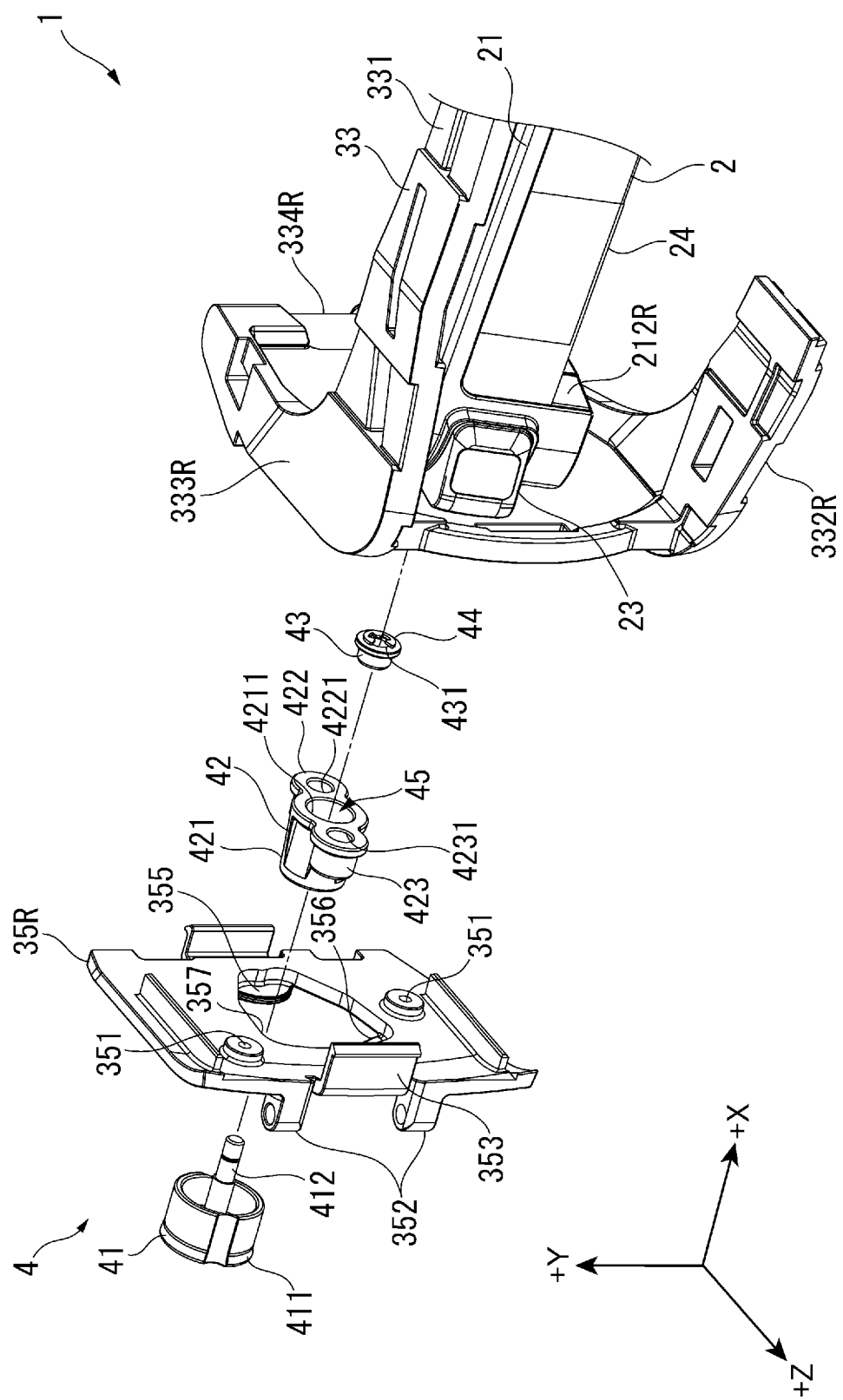
[FIG. 13]

[FIG. 14]
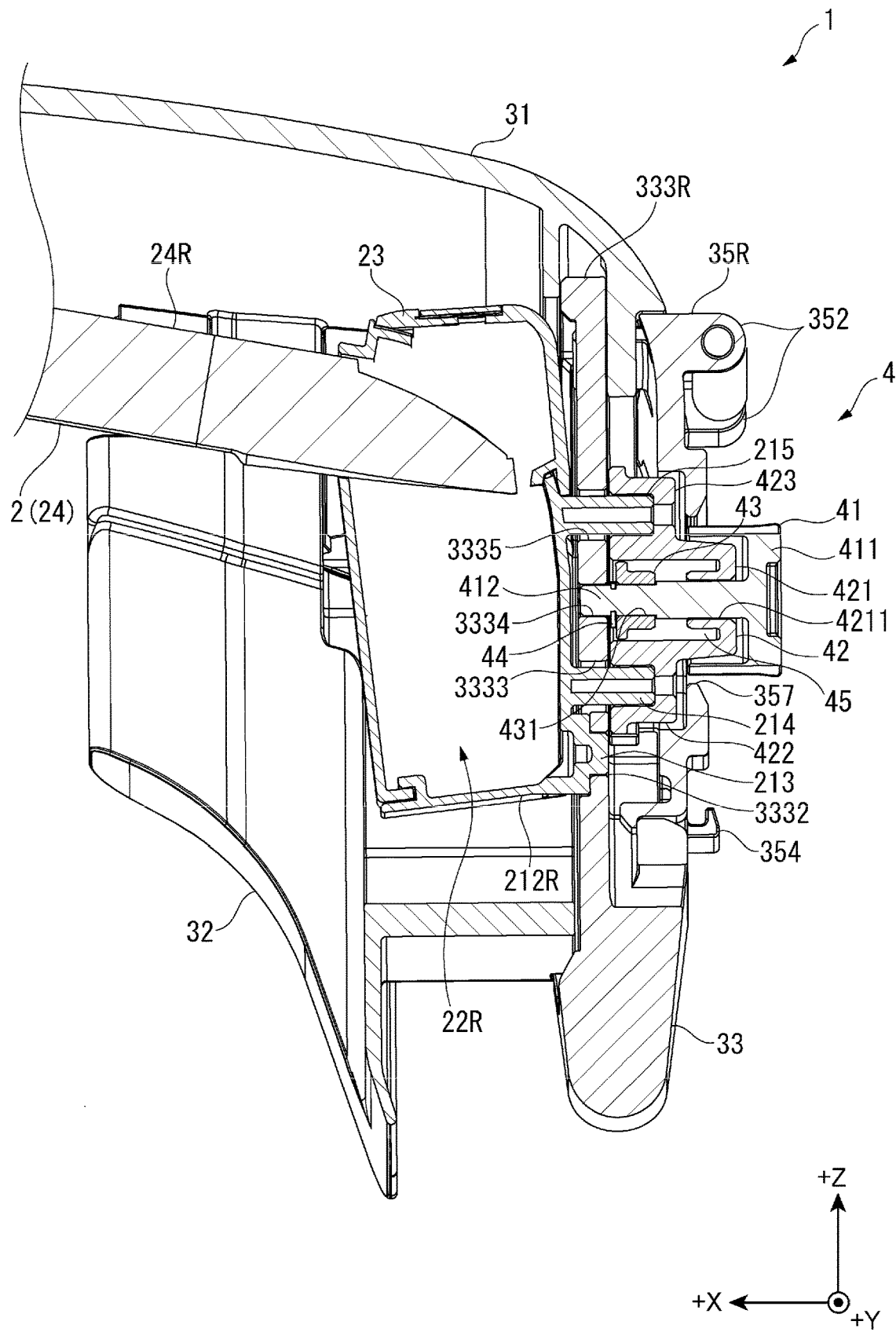

[FIG. 15]
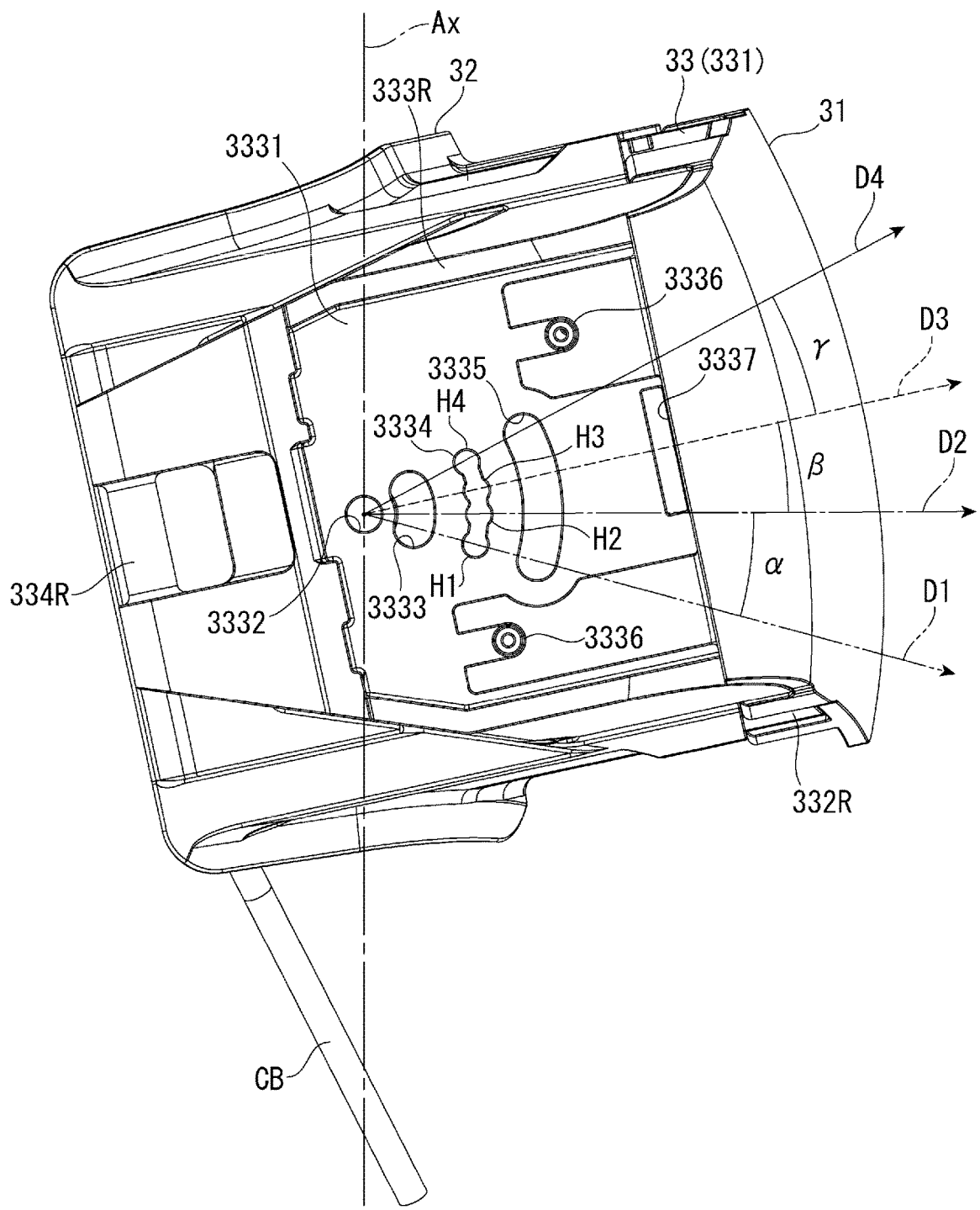

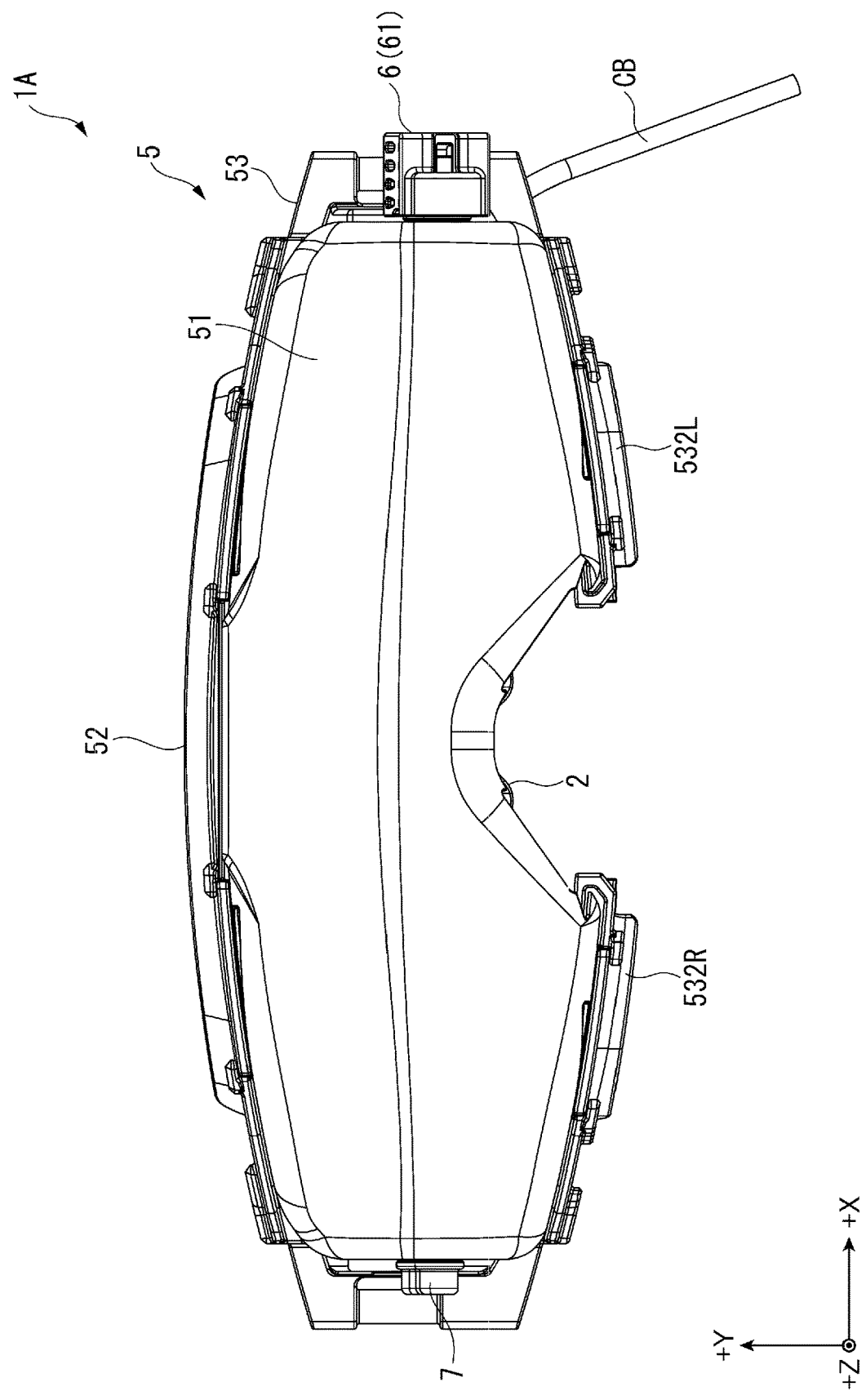
[FIG. 16]

[FIG. 17]
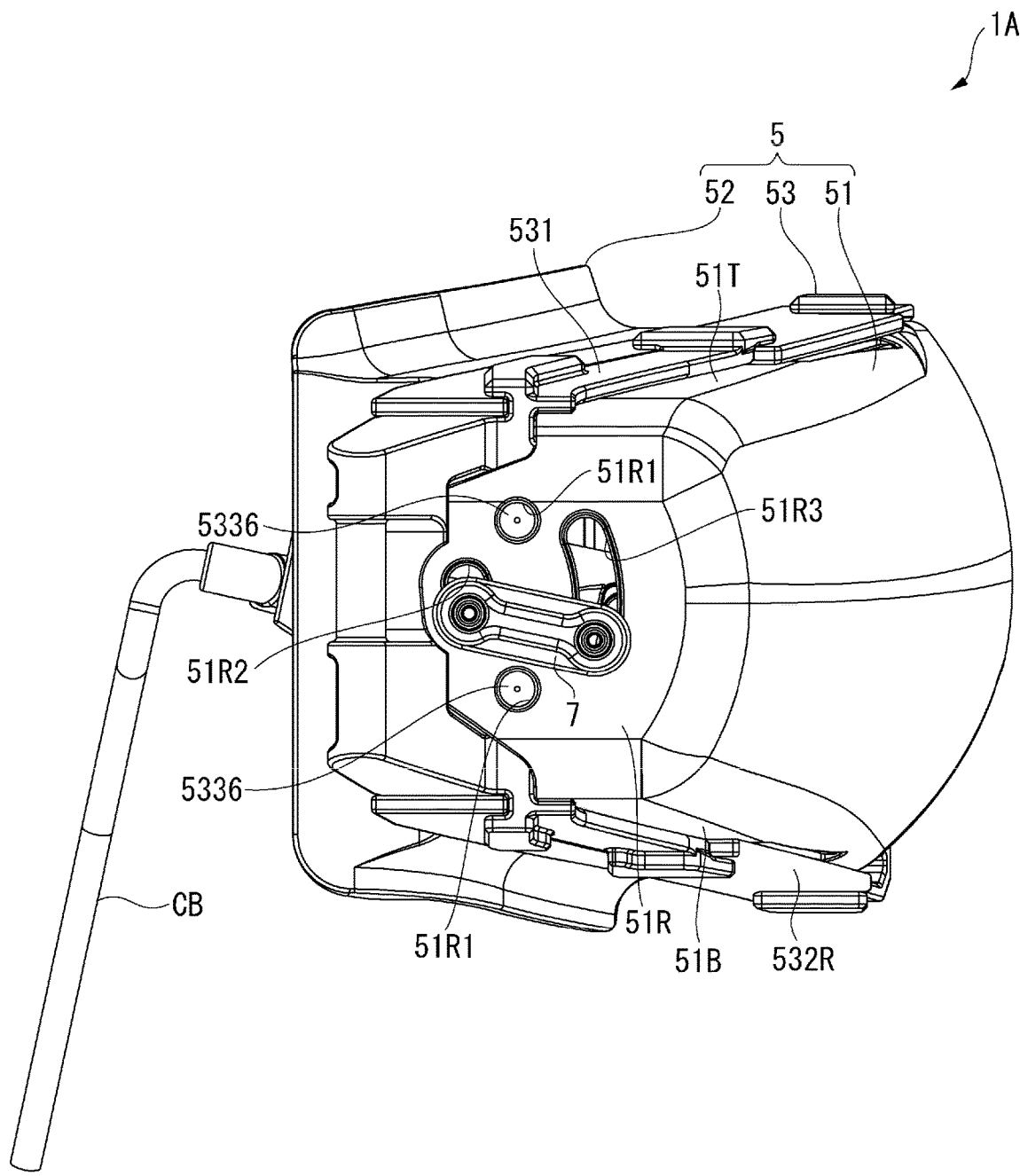

[FIG. 18]
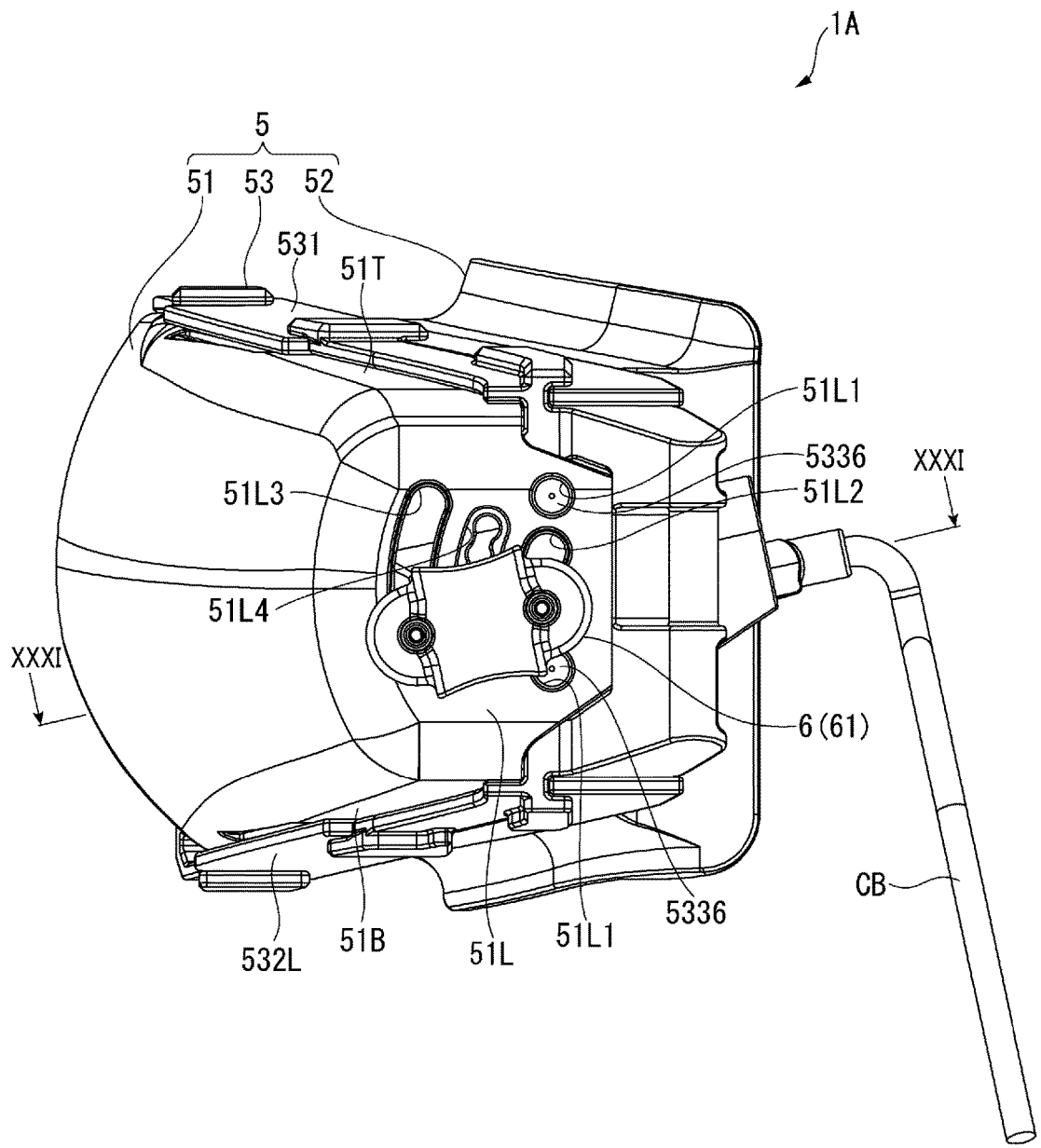

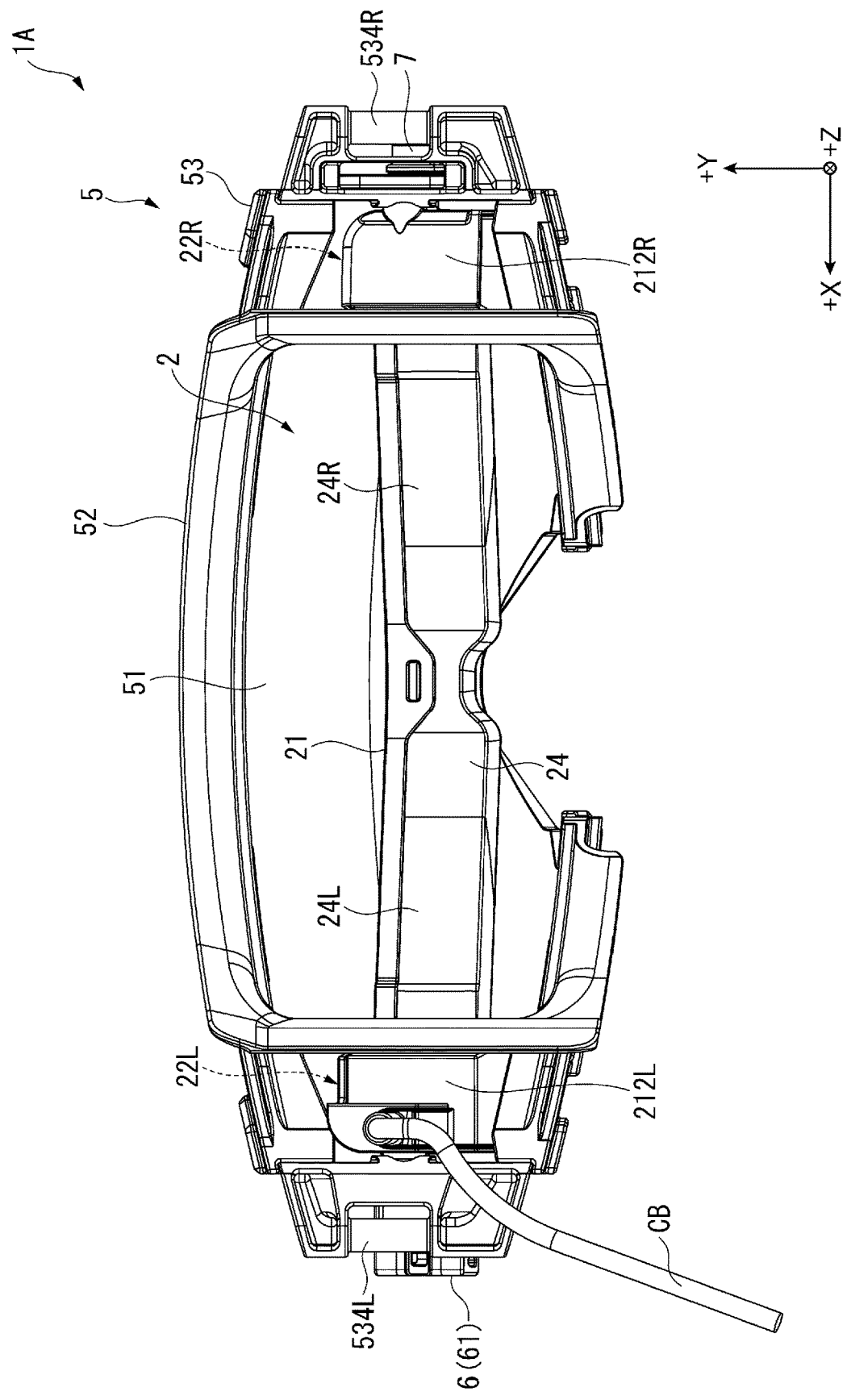
[FIG. 19]

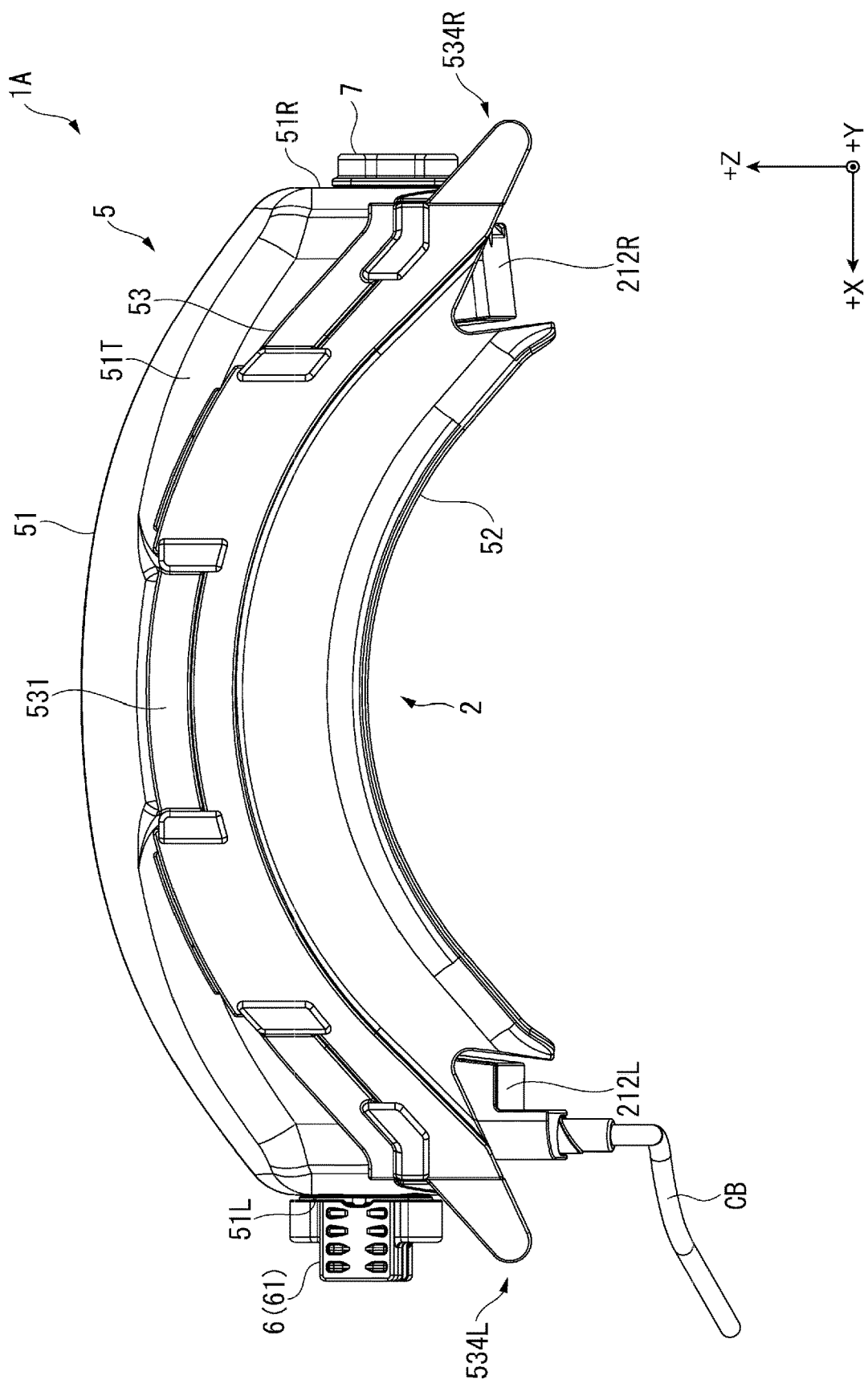

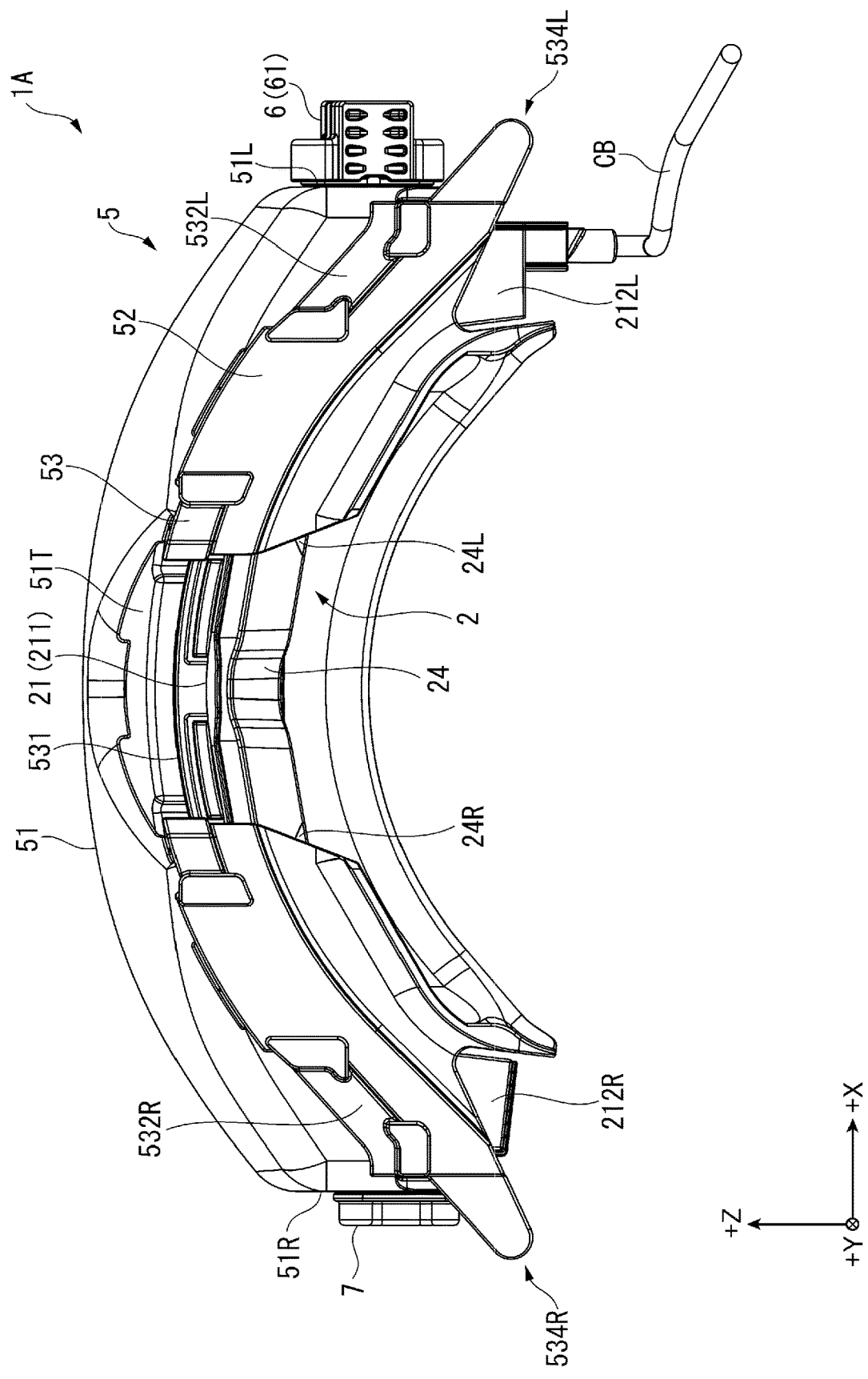
[FIG. 21]

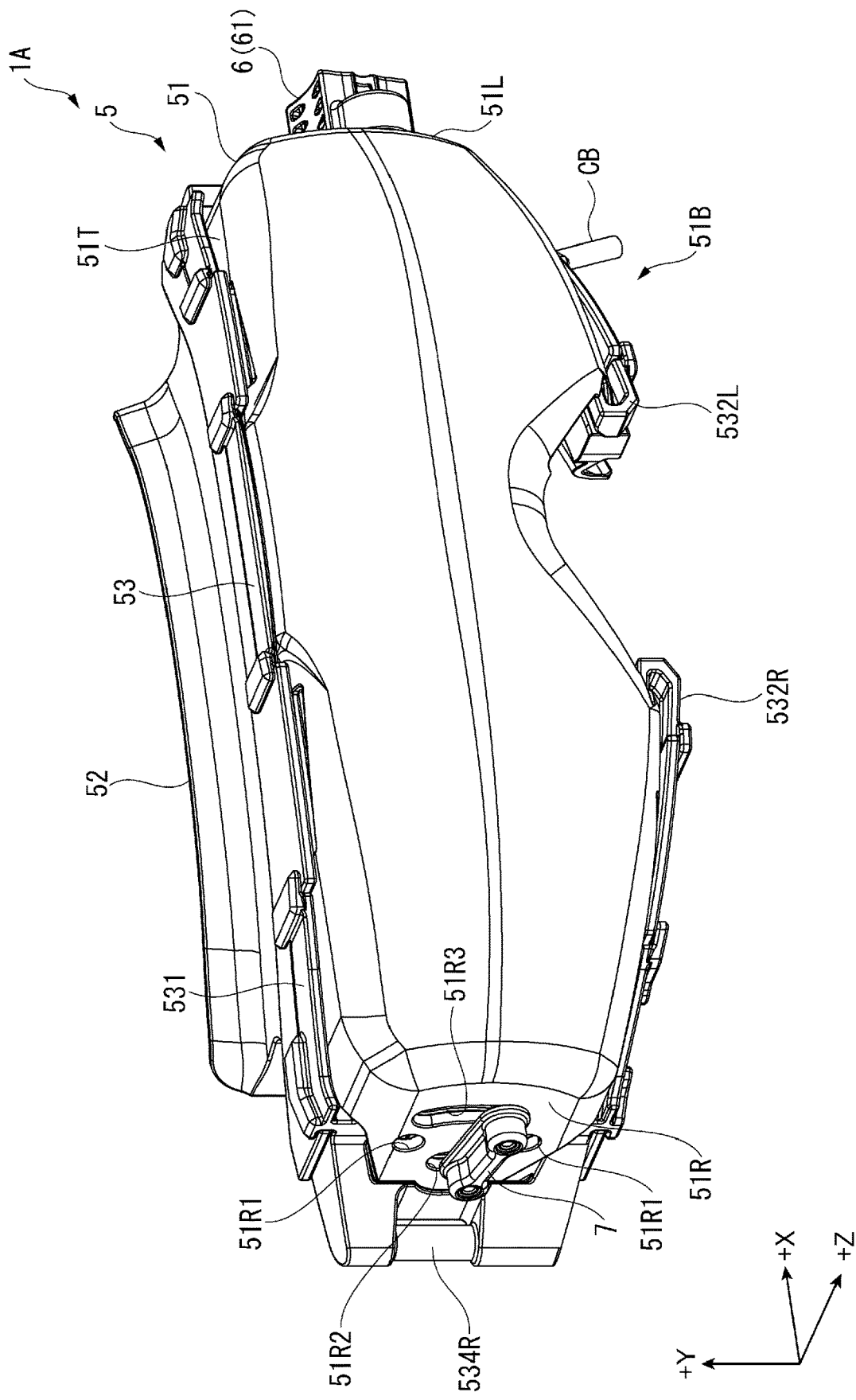

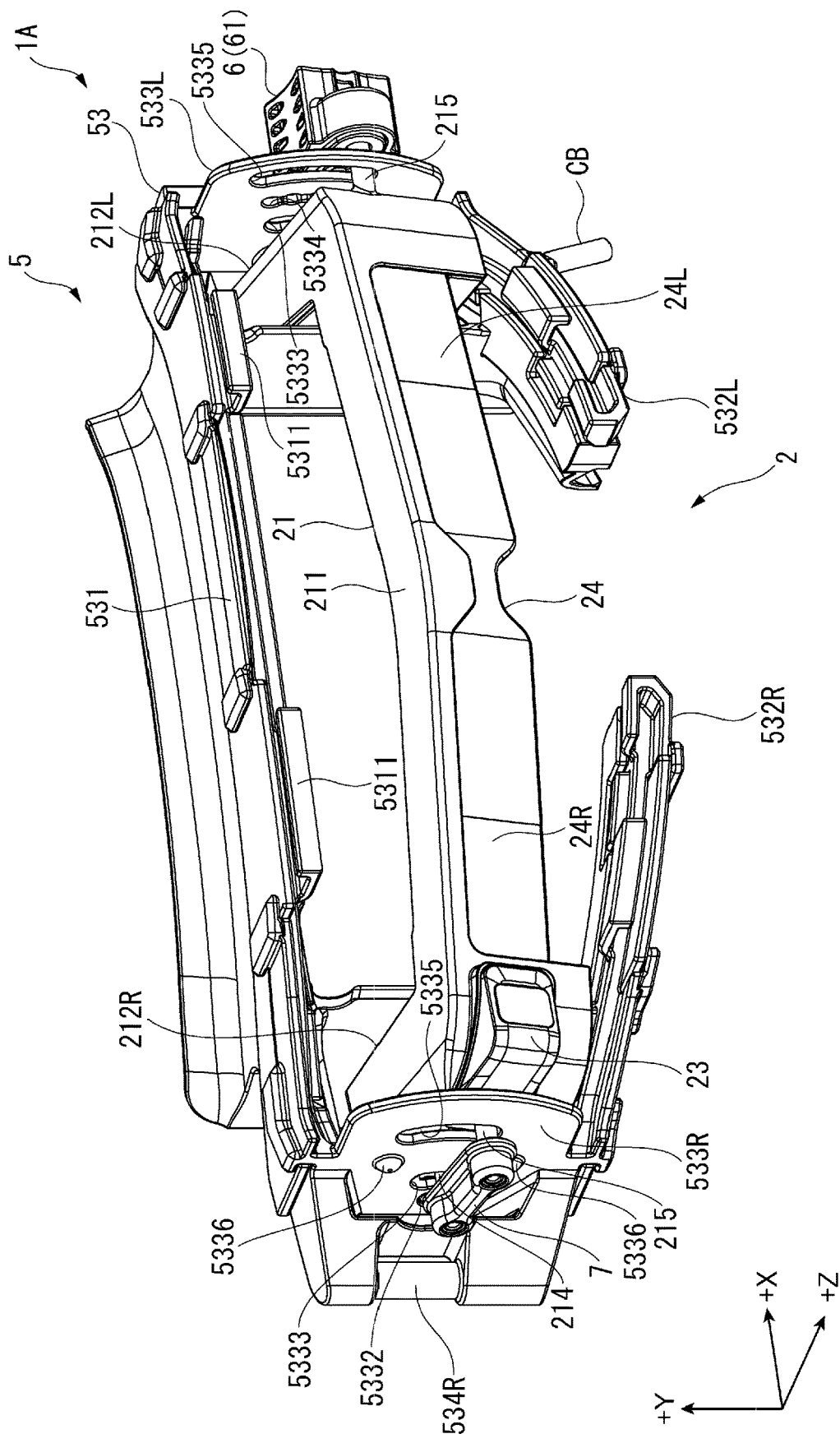
[FIG. 23]

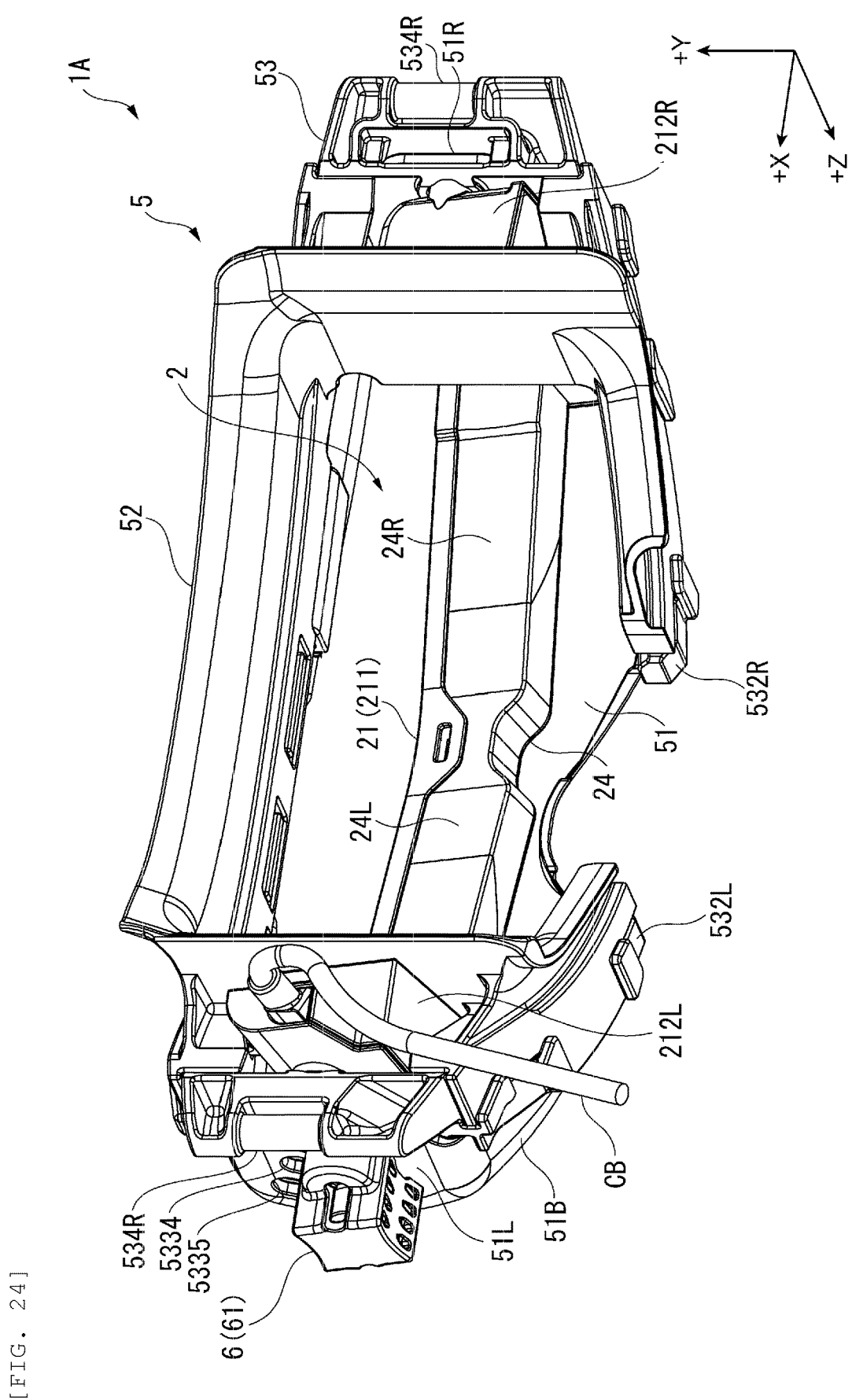
[FIG. 24]

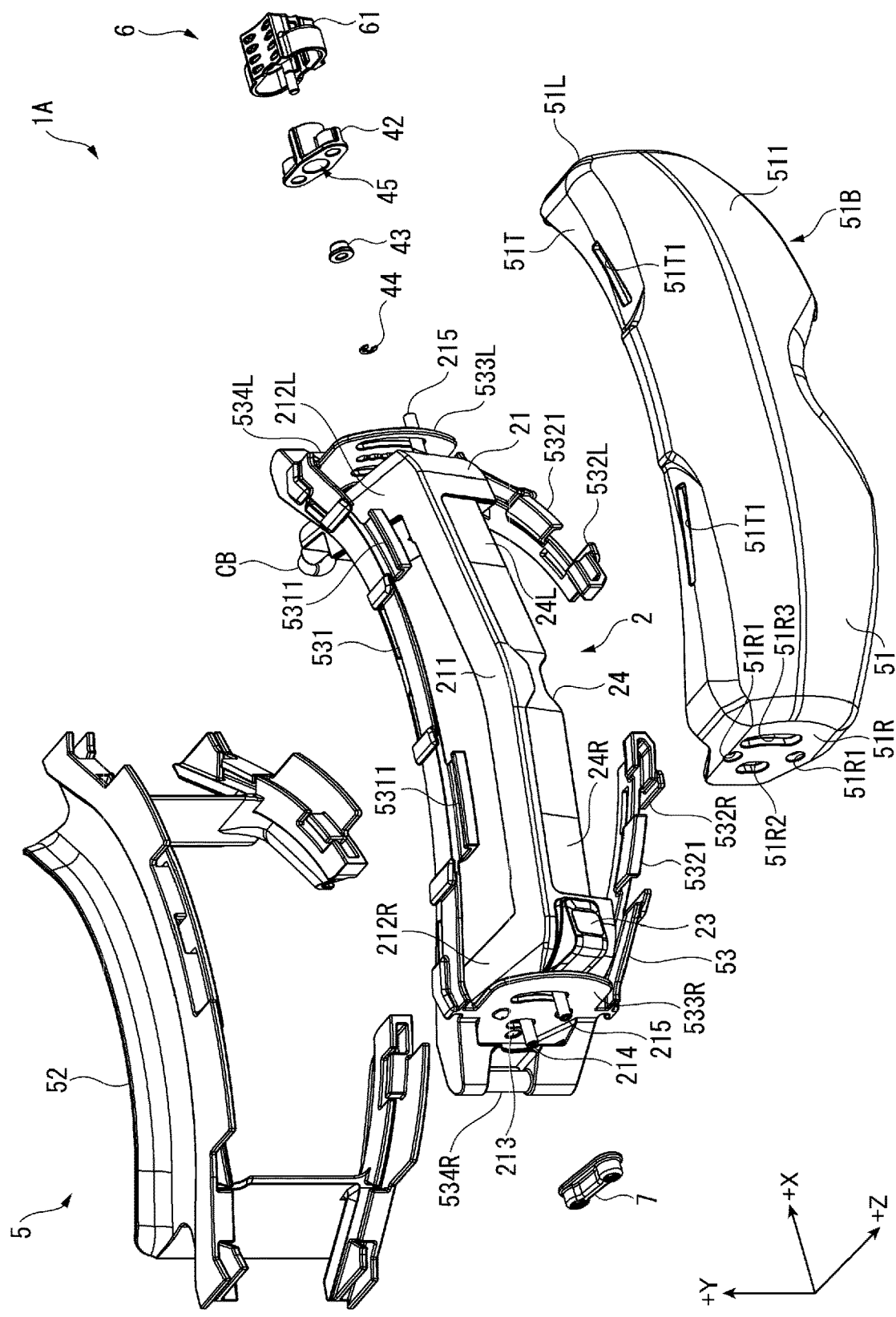
[FIG. 25]

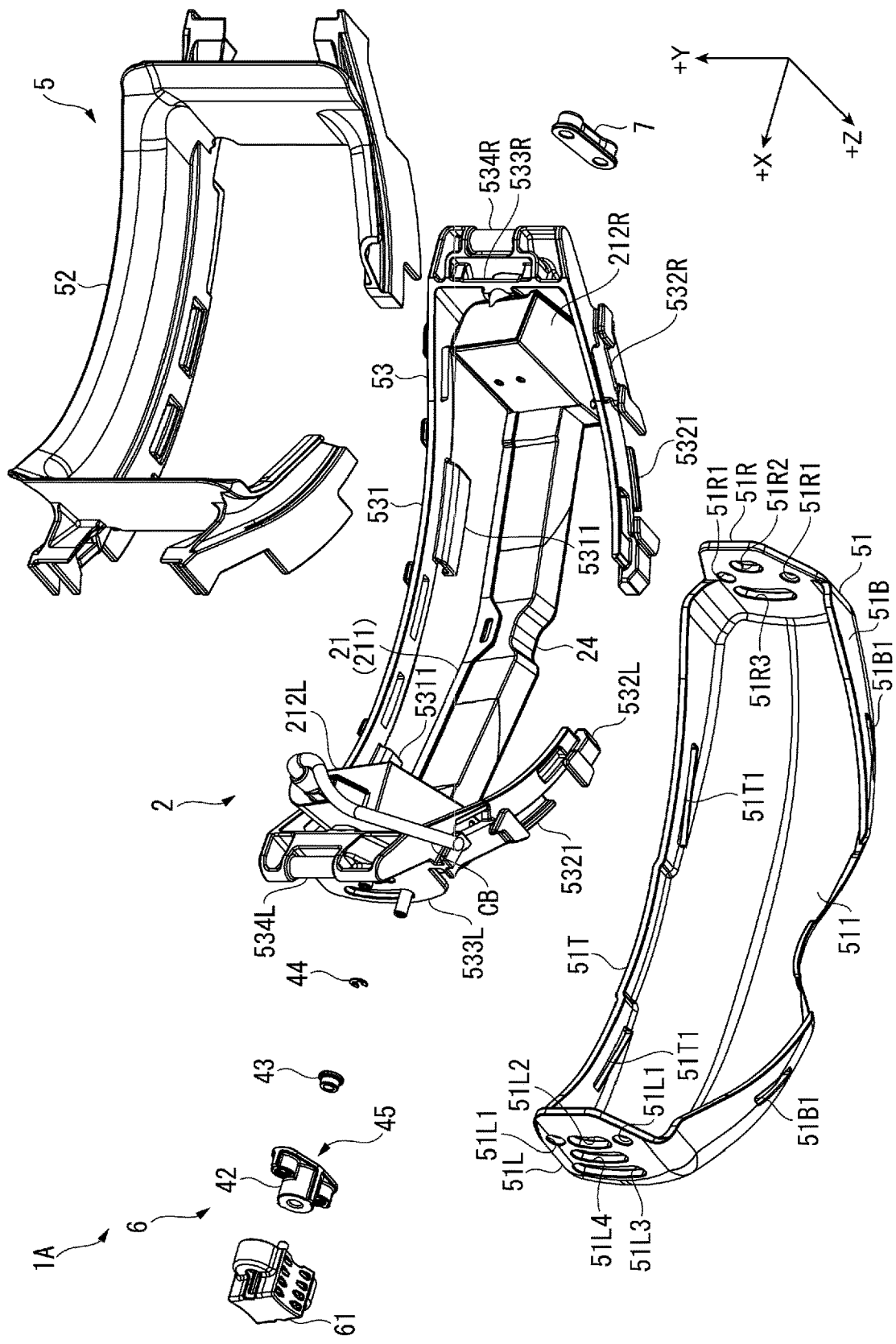
[FIG. 26]

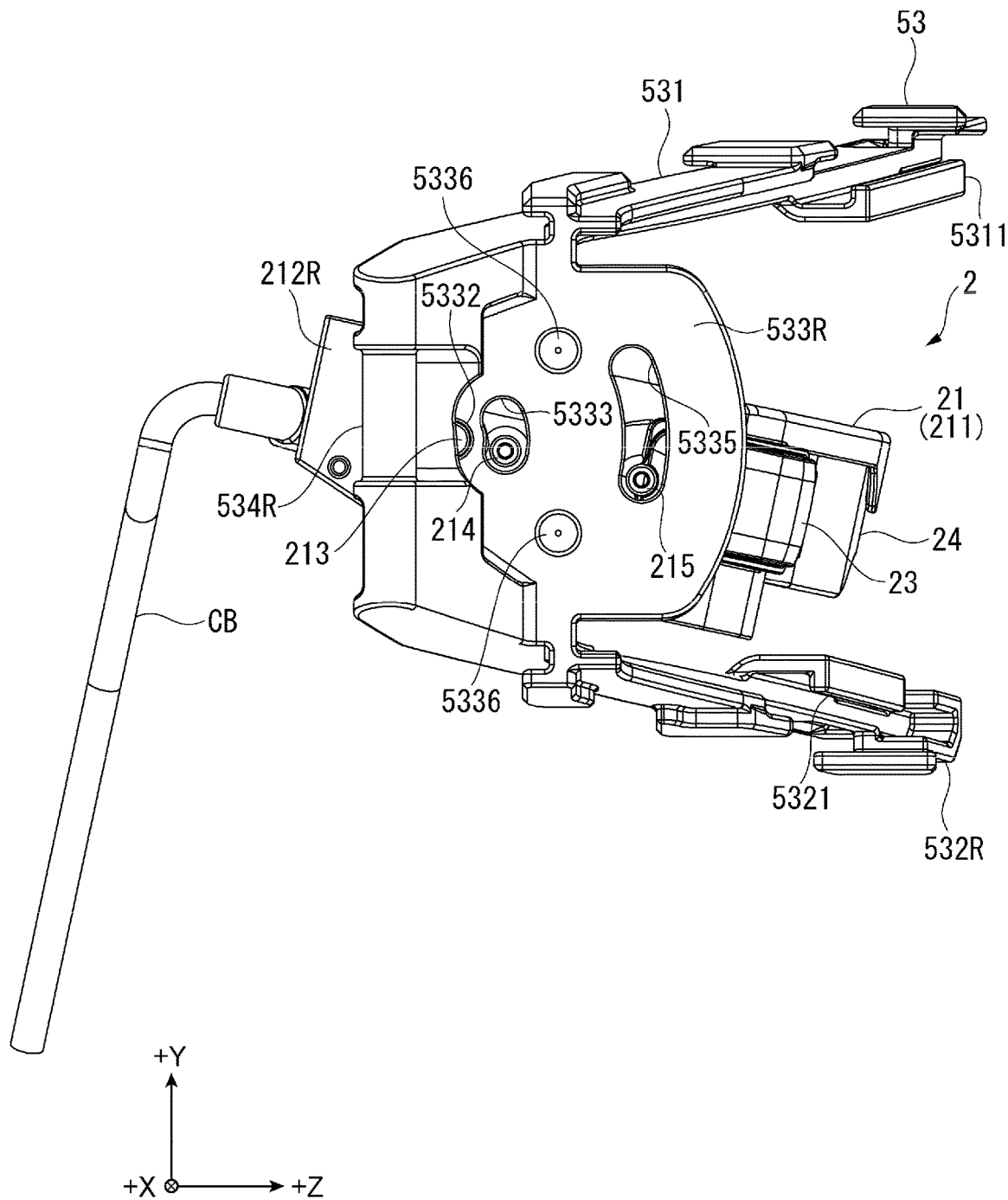
[FIG. 27]

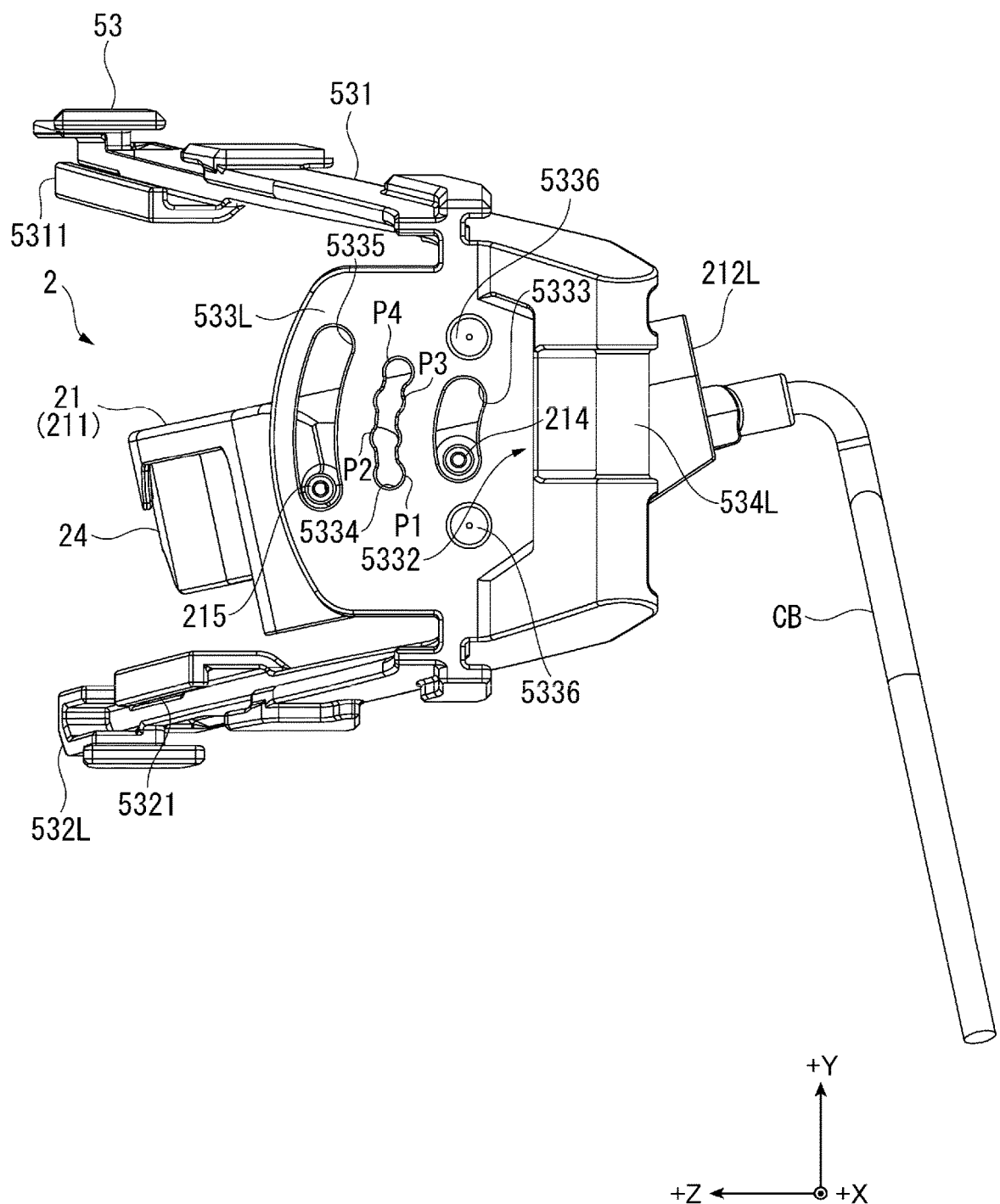
[FIG. 28]

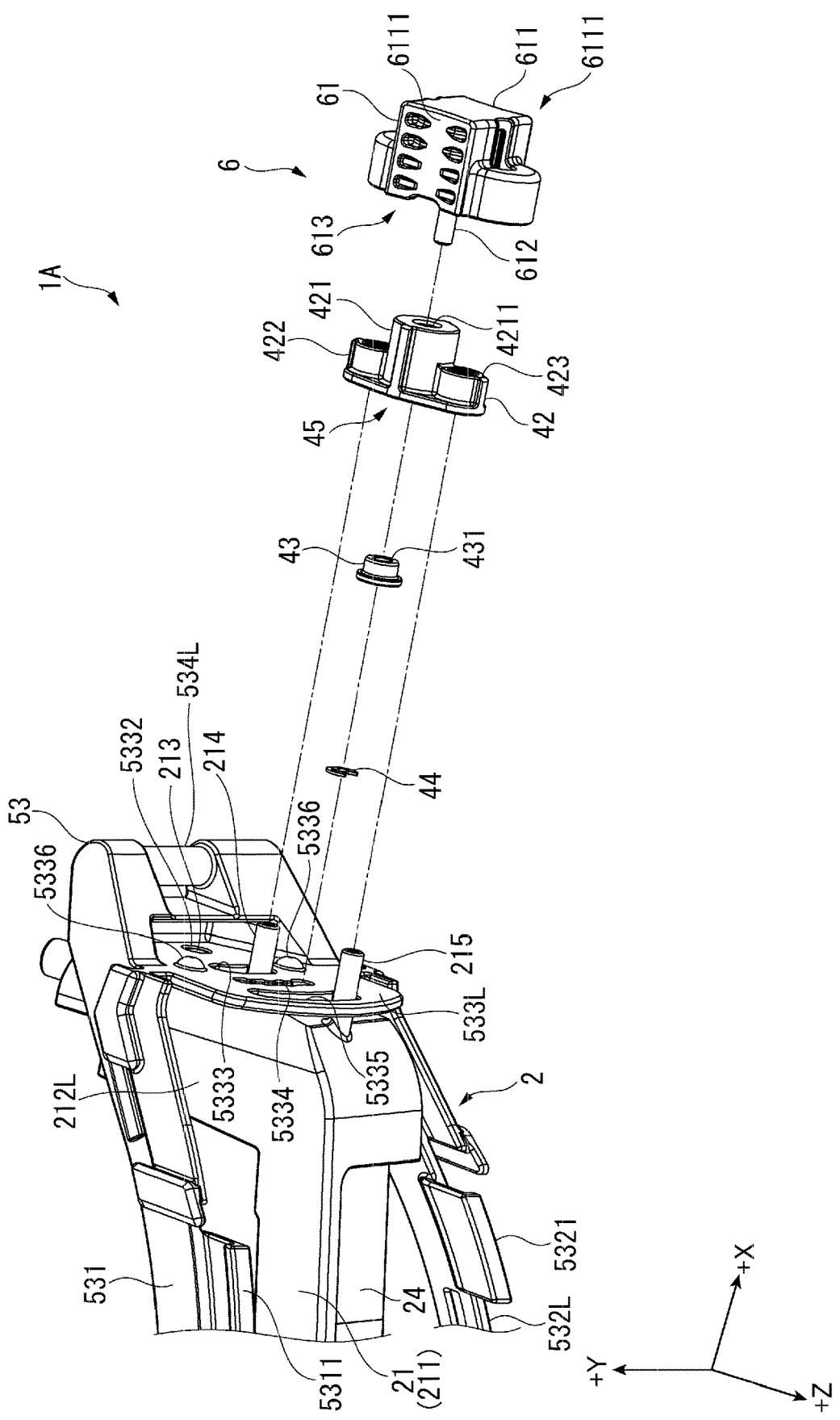

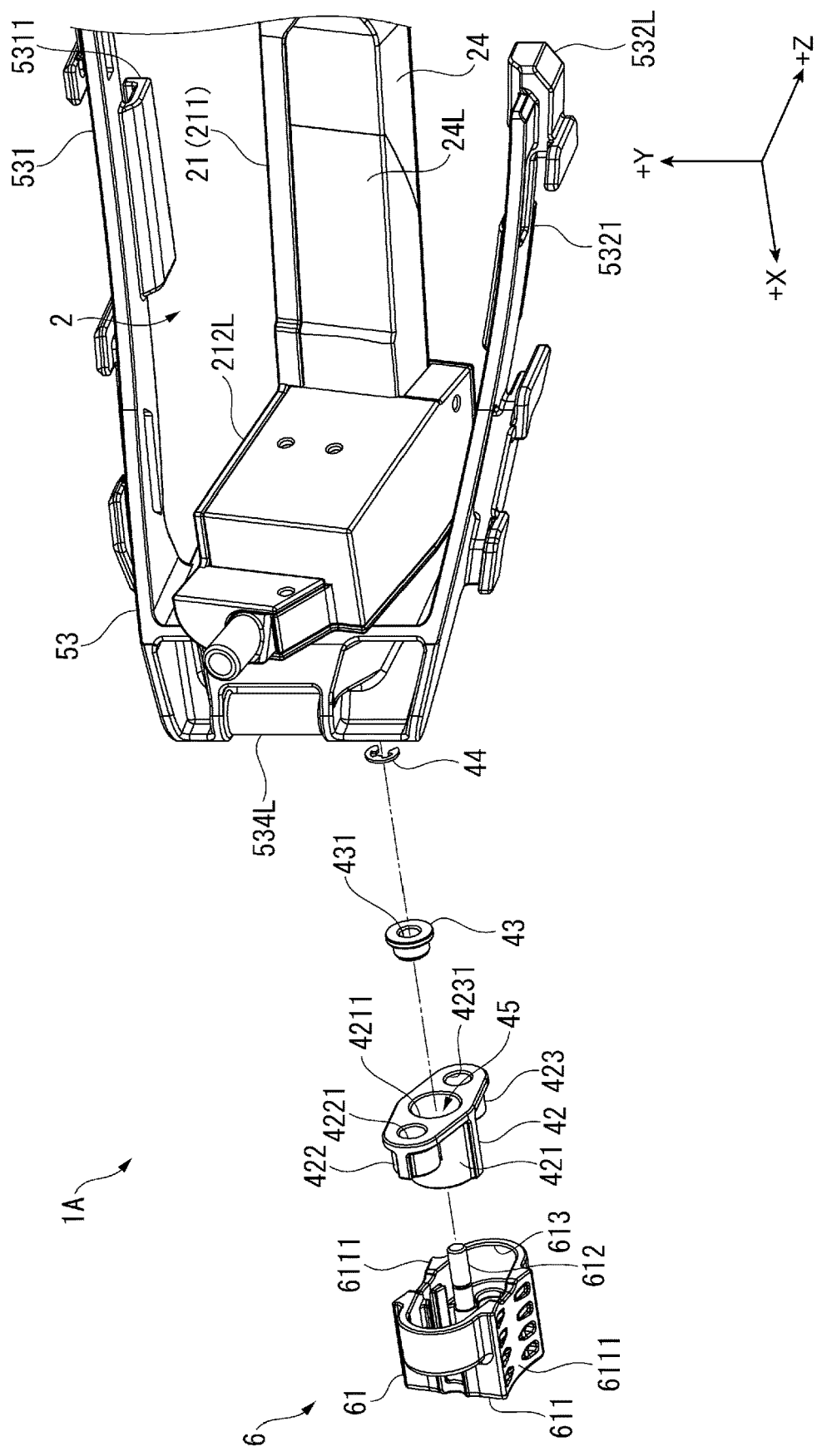

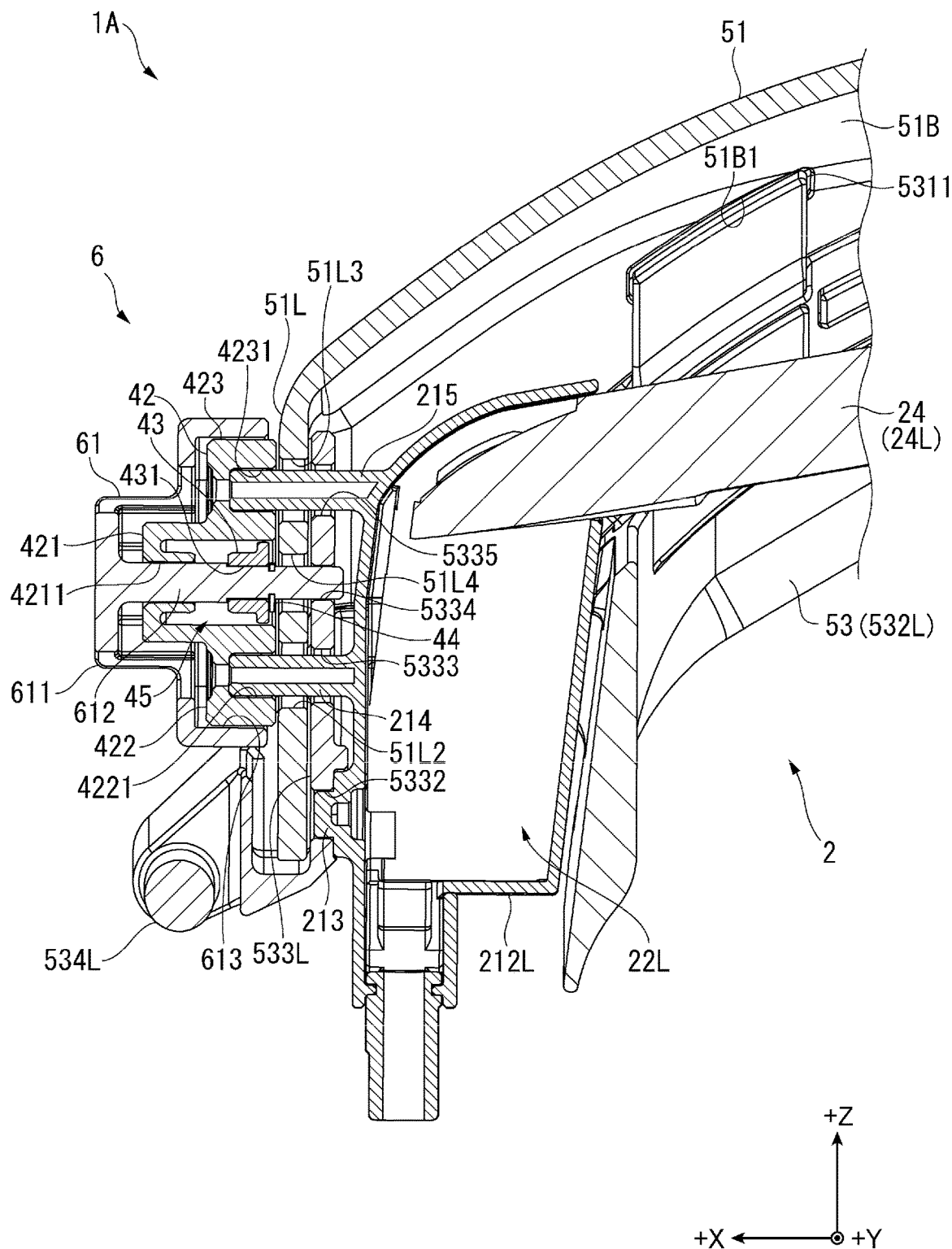
[FIG. 31]

HEAD-MOUNTED DISPLAY DEVICE

FIELD OF THE INVENTION

The present invention relates to a head-mounted display device.

BACKGROUND ART

There has been known a head-mounted display device that is mounted on the head of a user and displays an image visibly to the user. As such a head-mounted display device, there is known an abnormality probe supporting device used in a firefighting site (see, for example, Patent Literature 1).

A first abnormality probe supporting device described in Patent Literature 1 includes a fire facepiece, a display of a single eye type, an infrared camera, and an electronic component unit. The fire facepiece is attached to the face of a wearer in a sealed state by an elastic member stuck to an inner-surface-side peripheral edge portion. The display is equipped in the fire facepiece.

In the first abnormality probe supporting device, the display is attached via a supporting table. To match a sight line position to the wearer, the display is configured to be three-dimensionally movable in a sight line direction and horizontal and vertical directions with respect to the supporting table by a screw mechanism.

A second abnormality probe supporting device described in Patent Literature 1 includes goggles, a display of a single eye type, an infrared camera, and an electronic component unit. The goggles include a lens section, an elastic member for attaching the lens section to a face in a sealed state, and a belt for attaching the lens section to the face. The display is disposed to be positionally adjustable in the front-rear direction to close an opening section formed in a right-eye opposed section of the lens section. Note that the positional adjustment in the up-down and left-right directions is performed by moving the goggles.

PRIOR ART LITERATURE

Patent Literature

[Patent Literature 1] JP-2009-199590

SUMMARY OF THE INVENTION

Problem to be Solved by the Invention

However, in the abnormality probe supporting device described in Patent Literature 1, the wearer cannot adjust a display position of an image by the display in a state in which the wearer wears the fire facepiece or the goggles. Therefore, when a display position of an image or the position of the display is adjusted, the wearer needs to take off the fire facepiece or the goggle.

An advantage of some aspects of the invention is to solve at least a part of the problems described above and to provide a head-mounted display device in which the position of a display section can be adjusted from the outside.

Means for Solving the Problem

A head-mounted display device according to a first aspect of the invention includes: a display section disposed in front of eyes of a user and configured to display an image; a cover section configured to cover the display section when viewed from a position right opposed to the user and wearable on the user; and a position adjusting mechanism capable of adjusting a position of the display section on an opposite side of the display section side across the cover section. The cover section includes a light transmitting section opposed to the display section.

With such a configuration, the position of the display section can be adjusted by the position adjusting mechanism in a state in which the user wears the cover section. Therefore, it is possible to adjust the position of the display section on the opposite side of the display section side across the cover section (i.e., the outside of the cover section) without taking off the cover section.

The user wearing the head-mounted display device can visually recognize an outside world of the cover section via the light transmitting section. For this reason, it is possible to not only dispose the display section in a position where an image is easily visually recognized but also, for example, dispose the display section in a position where the outside world and the image are easily visually recognized or dispose the display section in a position where only the outside world is easily visually recognized. Therefore, it is possible to improve versatility of the head-mounted display device.

In the first aspect, it is preferable that the display section includes: an image emitting section configured to emit the image; and a light guide section having light transmissivity and configured to guide the image emitted from the image emitting section to the eyes of the user.

With such a configuration, since the light guide section has light transmissivity, it is possible to simultaneously visually recognize the image and the outside world of the cover section via the light transmitting section and the light guide section. Therefore, it is possible to carry out work while confirming information concerning a work site and the like and a manual.

Since the position of the display section can be adjusted by the position adjusting mechanism even if the user does not directly touch the display section, it is possible to prevent the light guide section from being stained. Therefore, it is possible to prevent the image and the outside world from becoming less easily visually recognized because of a fingerprint, a stain, or the like. It is possible to appropriately guide the image to the eyes of the user.

In the first aspect, it is preferable that the display section is supported by the cover section to be turnable around a turning axis extending along a left-right direction of the user.

For the user who wears the head-mounted display device and performs some kind of work, two states are possible. One state is a state in which the user performs the work while observing the image. The other state is a state in which the user performs the work without observing the image.

On the other hand, since the display section is supported to be turnable up and down around the turning axis extending along the left-right direction, the position of the display section can be adjusted to a position where the image is easily observed and a position where the image is less easily observed. Therefore, it is possible to improve the versatility of the head-mounted display device.

In the first aspect, it is preferable that, when a direction orthogonal to a center axis of a head of the user and toward a front side for the user is represented as a front direction, the position adjusting mechanism is configured to be capable of locking the display section in a first position, which is a position of the display section at a time of crossing of a line of sight of the user in a downward direction with respect to the front direction and a display surface of the image, and a second position, which is a position of the display section at a time of crossing of a line of sight of the user in an upward direction with respect to the front direction and the display surface of the image.

Note that the downward direction indicates a direction that crosses the front direction at a predetermined angle and in which light travels to the lower side. Similarly, the upward direction indicates a direction that crosses the front direction at a predetermined angle and in which light travels to the upper side. Therefore, the downward direction and the upward direction are not limited to a directly downward direction and a directly upward direction.

With such a configuration, when the display section is disposed in the first position or the second position, the position of the display section can be maintained.

The first position is a position of the display section at the time of crossing of the line sight and the display surface of the image at the time when the line of sight of the user is in the downward direction with respect to the front direction. The second position is the position of the display section at the time of crossing of the line of sight of the user, which is in the upward direction with respect to the front surface direction, and the display surface of the image. For this reason, for example, when a line of sight of the user at a normal time is in the downward direction with respect to the front direction, it is possible to make it easy for the user to visually recognize the image by locating the display section in the first position and it is possible to make it less easy for the user to visually recognize the image by locating the display section in the second position.

In the first aspect, it is preferable that the first position is a position of the display section at a time of crossing of a line of sight of the user in a downward direction at 12° with respect to the front direction and the display surface of the image.

A viewing direction of the user in a relaxed state is a direction inclined 12° in the downward direction with respect to the front direction.

For this reason, the display section is locked in the first position, whereby the user can visually recognize an image displayed by the display section in the relaxed state.

A head-mounted display device according to a second aspect of the invention includes: a display section configured to emit an image to a predetermined visual recognition position and display the image; a cover section located on an opposite side of an emission side of the image by the display section with respect to the display section; and a position adjusting mechanism capable of adjusting a position of the display section on an opposite side of the display section side across the cover section. The cover section includes a light transmitting section opposed to the display section.

Note that, as the visual recognition position, a position of eyes of a user wearing the head-mounted display device can be illustrated.

With such a configuration, it is possible to achieve the same effects as the effects of the head-mounted display device according to the first aspect.

That is, the position of the display section can be adjusted on the opposite side of the display section side across the cover section (i.e., the outside of the cover section). Therefore, the position of the display section can be adjusted in a state in which the head-mounted display is worn. Since the user wearing the head-mounted display device can visually recognize an outside world of the cover section via light transmitting section, it is possible to not only dispose the display section in a position where an image is easily visually recognized but also, for example, dispose the display section in a position where the outside world and the image are easily visually recognized or dispose the display section in a position where only the outside world is easily visually recognized. Therefore, it is possible to improve the versatility of the head-mounted display device.

In the second aspect, it is preferable that the display section includes: an image emitting section configured to emit the image; and a light guide section having light transmissivity and configured to guide the image emitted from the image emitting section to the visual recognition position.

With such a configuration, as explained above, it is possible to simultaneously visually recognize the image and the outside world of the cover section via the light guide section and the cover section. Therefore, it is possible to carry out work while confirming information concerning a work site and the like and a manual. Besides, since the user can adjust the position of the display section without directly touching the display section, it is possible to prevent the light guide section from being stained. Therefore, it is possible to prevent the image and the outside world from becoming less easily visually recognized because of a fingerprint, a stain, or the like. It is possible to appropriately guide the image to the eyes of the user.

In the second aspect, it is preferable that the light transmitting section is opposed to the light guide section.

With such a configuration, since the light transmitting section and the light guide section are opposed to each other, it is possible to visually recognize the outside world of the cover section simultaneously with the image in the position of the display section where the image can be visually recognized.

In the second aspect, it is preferable that the display section is supported by the cover section to be turnable around a turning axis extending along, of a vertical direction and a horizontal direction of the image displayed by the display section, the horizontal direction.

The horizontal direction of the image is the left-right direction for the user. For this reason, as explained above, the display section is supported to be turnable up and down for the user around the turning axis extending along the left-right direction, whereby it is possible to adjust the position of the display section to a position where the image is easily observed and a position where the image is less easily observed. Therefore, it is possible to improve the versatility of the head-mounted display device.

In the second embodiment, it is preferable that the position adjusting mechanism is configured to be capable of locking the display section in a plurality of positions in a turning range of the display section around the turning axis.

With such a configuration, since the display section can be locked in an adjusted position, it is possible to prevent the position of the display section from deviating during the observation of the image. Therefore, it is possible to improve convenience of use of the head-mounted display device.

In the second embodiment, it is preferable that the plurality of positions include a first position where an emitting direction of the image by the display section is an upward direction and a second position where the emitting direction of the image by the display section is a downward direction.

Note that the emitting direction of the image indicates a traveling direction of a main beam of image lights forming the image (a traveling direction of light forming the center of the image). As explained above, the upward direction indicates a direction that crosses the front direction at a predetermined angle and in which light travels to the upper side. Similarly, the downward direction indicates a direction that crosses the front direction at a predetermined angle and in which light travels to the lower side. Therefore, the upward direction and the downward direction are not limited to the a directly upward direction and a directly downward direction.

When the user observes an image displayed by the display section located in the first direction, the line of sight of the user is in the downward direction. When the user observes an image displayed by the display section located in the second position, a line of sight of the user is in the upward direction. For this reason, it is possible to make it easy for the user to observe the image by locating the display section in the first position. It is possible to make it less easy for the user to observe the image by locating the display section in the second position. Therefore, it is possible to adjust the position of the display section to a position where the user observes the image and a position where the user does not observe the image.

In the second aspect, it is preferable that the first position is a position where the emitting direction of the image by the display section crosses a plane orthogonal to a center axis of a head of the user wearing the head-mounted display device at a crossing angle of 12°.

When the display section is located in the first direction, a line of sight of the user in observing the image emitted by the display section is a direction inclined 12° in the downward direction with respect to the front direction for the user. For this reason, as explained above, the display section is locked in the first direction, whereby the user can visually recognize the image displayed by the display section in a relaxed state.

In the first and second aspects, it is preferable that the cover section includes a supporting section configured to cross the turning axis and support the display section, and the position adjusting mechanism is provided according to the supporting section.

With such a configuration, the position adjusting mechanism is located on a side of the head of the user. Consequently, the position adjusting mechanism can be disposed outside a field of vision of the user. It is possible to allow the user to easily operate the position adjusting mechanism.

In the first and second aspects, it is preferable that the cover section includes an opening section configured to cause the display section side and an opposite side of the display section with respect to the cover section to communicate, and the position adjusting mechanism includes: a coupling section coupled to the display section; and an operation section, one end of which is connected to the coupling section via the opening section and another end of which is exposed to the opposite side of the display section with respect to the cover section.

With such a configuration, the display section can be operated by the coupling section coupled to the display section via the opening section and the operation section exposed to the opposite side of the display section with respect to the cover section, the coupling section and the operation section being respectively located on the opposite side of the display section with respect to the cover section. Therefore, it is possible to adjust the position of the display section on the opposite side of the display section with respect to the cover section.

In the first and second aspects, it is preferable that one of the display section and the cover section includes a guide section extending along a moving direction of the display section, and another of the display section and the cover section includes a boss inserted into the guide section.

With such a configuration, since the movement of the display section is guided by the guide section and the boss, it is possible to smoothly and easily carry out the movement of the display section. Therefore, it is possible to easily carry out adjustment operation of the position of the display section.

In the first and second aspects, it is preferable that the cover section includes the guide section, the display section includes the boss, and the coupling section is coupled to the boss.

With such a configuration, the coupling section and the display section can be coupled. The operation section and the display section can be coupled via the coupling section. Therefore, the display section can be moved by the operation section.

In the first and second aspects, it is preferable that the cover section includes a protection cover configured to move in one direction to expose the operation section and move in another direction to cover the operation section.

With such a configuration, when it is desired to operate the operation section to adjust the position of the display section, the operation section can be exposed by moving the protection cover to one direction. When it is unnecessary to adjust the position of the display section, the operation section can be covered by moving the projection cover to the other direction. Therefore, it is possible to prevent the operation section from being carelessly operated to change the position of the display section.

In the first and second aspects, it is preferable that the operation section includes a recessed section, on an inside of which the coupling section is disposed.

With such a configuration, since the coupling section is housed in the operation section, it is possible to reduce the dimensions of the position adjusting mechanism. It is possible to reduce the head-mounted display device in size.

BRIEF DESCRIPTION OF THE DRAWINGS

FIG. 1 is a perspective view showing a head-mounted display device according to a first embodiment of the invention.

FIG. 2 is a perspective view showing the head-mounted display device according to the first embodiment.

FIG. 3 is a perspective view showing the head-mounted display device according to the first embodiment.

FIG. 4 is a perspective view showing a display section in the first embodiment.

FIG. 5 is a perspective view showing the display section in the first embodiment.

FIG. 6 is an exploded perspective view showing a cover section in the first embodiment.

FIG. 7 is an exploded perspective view showing the cover section in the first embodiment.

FIG. 8 is a perspective view showing a main body section in the first embodiment.

FIG. 9 is a perspective view showing the head-mounted display device in which a protection cover is opened in the first embodiment.

FIG. 10 is a side view showing the head-mounted display device in which the protection cover is opened in the first embodiment.

FIG. 11 is an exploded perspective view showing a position adjusting mechanism in the first embodiment.

FIG. 12 is an exploded perspective view showing the position adjusting mechanism in the first embodiment.

FIG. 13 is an exploded perspective view showing the position adjusting mechanism in the first embodiment.

FIG. 14 is a sectional view showing the head-mounted display device according to the first embodiment.

FIG. 15 is a side view showing a direction of the head-mounted display device mounted on a user in the first embodiment.

FIG. 16 is a front view showing a head-mounted display device according to a second embodiment of the invention.

FIG. 17 is a right side view showing the head-mounted display device according to the second embodiment.

FIG. 18 is a left side view showing the head-mounted display device according to the second embodiment.

FIG. 19 is a rear view showing the head-mounted display device according to the second embodiment.

FIG. 20 is a top view showing the head-mounted display device according to the second embodiment.

FIG. 21 is a bottom view showing the head-mounted display device according to the second embodiment.

FIG. 22 is a perspective view showing the head-mounted display device according to the second embodiment.

FIG. 23 is a perspective view showing the head-mounted display device according to the second embodiment.

FIG. 24 is a perspective view showing the head-mounted display device according to the second embodiment.

FIG. 25 is an exploded perspective view showing the head-mounted display device according to the second embodiment.

FIG. 26 is an exploded perspective view showing the head-mounted display device according to the second embodiment.

FIG. 27 is a diagram showing a supporting section on the right side in the second embodiment.

FIG. 28 is a diagram showing a supporting section on the left side in the second embodiment.

FIG. 29 is an exploded perspective view showing a position adjusting mechanism in the second embodiment.

FIG. 30 is an exploded perspective view showing the position adjusting mechanism in the second embodiment.

FIG. 31 is a sectional view showing the head-mounted display device in the second embodiment.

MODE FOR CARRYING OUT THE INVENTION

First Embodiment

A first embodiment of the invention is explained below with reference to the drawings.
[Schematic Configuration of a Head-Mounted Display Device]

FIGS. 1 and 2 are perspective views of a head-mounted display device 1 according to this embodiment viewed from above on the front side. In detail, FIG. 1 is a perspective view showing the head-mounted display device 1 mounted on a user US. FIG. 2 is a perspective view showing the head-mounted display device 1 in a state in which a light transmitting section 31 configuring a cover section 3 is removed. FIG. 3 is a perspective view of the head-mounted display device 1 viewed from below on the back side.

As shown in FIG. 1, the head-mounted display device 1 according to this embodiment is mounted on a head HD of the user US and displays an image (a virtual image) to be visually recognizable by the user US. The head-mounted display device 1 is a virtual image display device. The head-mounted display device 1 includes, as shown in FIGS. 1 to 3, a display section 2, a cover section 3, and position adjusting mechanisms 4 (4L and 4R) disposed on the left and the right in the user US with respect to the cover section 3.

As one characteristic of the head-mounted display device 1, the position of the display section 2 can be adjusted from the outside of the cover section 3 by the position adjusting mechanisms 4 (4L and 4R).

The configuration of the head-mounted display device 1 is explained blow.

Note that, in the following explanation, a direction orthogonal to the center axis of the head HD of the user US wearing the head-mounted display device 1 and extending from the back side to the front side for the user US is represented as a +Z direction. Two directions orthogonal to the +Z direction and orthogonal to each other are represented as a +X direction and a +Y direction. Among these directions, the +X direction is a direction orthogonal to the center axis of the head HD and extending from the right side to the left side for the user US. The +Y direction is a direction extending from the lower side to the upper side for the user US along the center axis of the head HD. Although illustration is omitted, the opposite direction of the +Z direction is represented as a −Z direction. The same applies to a −X direction and a −Y direction. That is, the +Z direction is the front direction for the user US. A ±X direction is the left-right direction of the user US.

In the configuration explained below, components indicated by signs attached with "R" indicate components located on the −X-direction side (the right side for the user US) in the head-mounted display device 1. Components indicated by signs attached with "L" indicate components located on the +X-direction side (the left side for the user US) in the head-mounted display device 1.
[Configuration of the Display Section]

FIGS. 4 and 5 are perspective views of the display section respectively viewed from above in the front side (the +Y-direction side on the +Z-direction side) and below on the back side (the −Y-direction side on the −Z-direction side). Note that, since the display section 2 is capable of turning in the ±Y direction, the +Y direction and the +Z direction shown in FIGS. 4 and 5 are the +Y direction and the +Z direction at the time when the display section 2 is disposed in a state in which a surface 21A on the +Y-direction side in a frame 21 is substantially parallel to an XZ plane.

The display section 2 emits an image visually recognizable as a virtual image on the −Z-direction side toward the eyes of the user US and displays the image to be visually recognizable by the user US. The display section 2 is covered on the +Z direction side by the cover section 3 and supported by the cover section 3 to be turnable in the ±Y direction around a turning axis extending along the +X direction. That is, the display section 2 is supported by the cover section 3 to be turnable around a turning axis extending along the left-right direction for the user US.

The display section 2 includes, as shown in FIGS. 4 and 5, the frame 21, image emitting sections 22L and 22R, an imaging section 23, and a light guide section 24.
[Configuration of a Frame]

The frame 21 is formed in a substantial U shape opened on the −Z-direction side when viewed from the +Y-direction side. The frame 21 supports the image emitting sections 22L and 22R, the imaging section 23, and the light guide section 24. The frame 21 includes a supporting section 211 extending along the +X direction, a housing section 212R located on the −X-direction side with respect to the supporting section 211, and a housing section 212L located on the +X-direction side with respect to the supporting section 211. The supporting section 211 and the housing sections 212L and 212R are integrated.

The supporting section 211 supports the light guide section 24 on the −Y-direction side. Note that, although illustration is omitted, a harness for electrically connecting the image emitting section 22L and the image emitting section 22R is provided on the inside of the supporting section 211.

The housing section 212R houses the image emitting section 22R on the inside. The housing section 212R includes, as shown in FIG. 4, on a surface on the −X-direction side, a shaft section 213 and bosses 214 and 215 respectively projecting to the −X direction.

The shaft section 213 is inserted into a shaft supporting section 3332 (see FIG. 8) located in a supporting section 333R of the cover section 3 explained below and is turnably supported by the shaft supporting section 3332. That is, the shaft section 213 is apart serving as a turning axis extending along the +X direction of the display section 2 with respect to the cover section 3.

The two bosses 214 and 215 are located on the +Z-direction side with respect to the shaft section 213. The bosses 214 and 215 are respectively inserted into guide sections 3333 and 3335 (see FIG. 8) located in the supporting section 333R.

The housing section 212L houses the image emitting section 22L on the inside. The housing section 212L also includes, as shown in FIG. 5, on a surface on the +X-direction side, the shaft section 213 and the bosses 214 and 215 respectively projecting to the +X-direction side. The shaft section 213 and the bosses 214 and 215 are also respectively inserted into the shaft supporting section 3332 and the guide sections 3333 and 3335 (see FIG. 8) located in a supporting section 333L of the cover section 3 and function in the same manner as the shaft section 213 and the bosses 214 and 215 of the housing section 212R.

Besides, as shown in FIGS. 4 and 5, the housing section 212L includes a cable CB extending from the end portion on the −Z-direction side of the housing section 212L. The cable CB is connected to the image emitting section 22L.

[Configuration of the Image Emitting Section]

The image emitting section 22L of the image emitting sections 22L and 22R forms an image for left eye visually recognized by a left eye LE of the user US and emits the image for left eye to the light guide section 24. The image emitting section 22R forms an image for right eye visually recognized by a right eye RE of the user US and emits the image for right eye to the light guide section 24.

Although detailed illustration is omitted, the image emitting section 22L includes an image forming section configured to form an image for left eye, a projecting section configured to project the formed image for left eye onto the light guide section 24, and a control section configured to control the image forming section. As the image forming section, a combination of a light source and an image forming panel such as a liquid crystal panel can be illustrated. Besides, an image forming panel of a self-emitting type such as an organic EL panel can be illustrated. The control section causes the image forming section to form an image for left eye corresponding to image information input from the cable CB.

Note that the image emitting section 22R has the same configuration as the configuration of the image emitting section 22L. The image emitting section 22R forms an image for right eye corresponding to image information input via the harness among image information input from the outside via the cable CB and projects the image for right eye onto the light guide section 24.

[Configuration of the Imaging Section]

The imaging section 23 is provided in the housing section 212R and images a region on the front side of the user US (the +Z direction side). The imaging section 23 outputs a captured image to the outside via the harness and the cable CB.

[Configuration of the Light Guide Section]

The light guide section 24 is disposed along the +X direction in front of the eyes of the user US. The light guide section 24 includes a light guide section for right eye 24R located on the −X-direction side and a light guide section for left eye 24L located on the +X-direction side.

The light guide section for right eye 24R internally reflects, on an interface, image light of an image for right eye made incident from the image emitting section 22R, causes the image light to travel to the center side (the +X-direction side), reflects the image light on a semi-transmissive layer (not shown in FIGS. 4 and 5) provided according to the right eye RE of the user, and emits the image light for the image for right eye to the right eye RE to thereby guide the image for right eye to the right eye RE.

Similarly, the light guide section for left eye 24L causes image light of an image for left eye made incident from the image emitting section 22L to travel to the center side (the −X-direction side), reflects the image light on a semi-transmissive layer (not shown in FIGS. 4 and 5) provided according to the left eye LE of the user, which is a visual recognition position of the image for left eye, and emits the image light for left eye to the left eye LE to thereby guide the image for left eye to the left eye LE.

Such a light guide section 24 is formed of resin (e.g., cycloolefin polymer) showing high light transmissivity in a visible light region. That is, the light guide section 24 has light transmissivity. For this reason, the user US can observe the outside world via the light guide section for right eye 24R and the light guide section for left eye 24L and the light transmitting section 31 explained below.

Note that the light guide section 24 has a configuration in which the light guide section for left eye 24L and the light guide section for right eye 24R are integrated. However, not only this, but, for example, the light guide section for left eye 24L and the light guide section for right eye 24R may be respectively individually provided.

The images guided to the right eye RE and the left eye LE by the light guide section 24 are images having a predetermined aspect ratio. The horizontal direction of the images visually recognized by the user US is the left-right direction for the user US, that is, a direction along the +X direction (a direction substantially parallel to the +X direction). The vertical direction of the visually recognized images is the up-down direction for the user US, that is, a direction along the +Y direction (a direction substantially parallel to the +Y direction). Therefore, in the head-mounted display device 1 configured to be turnable the display section 2 in the ±Y direction, the +X direction can be defined by the horizontal direction of the visually recognized image.

[Configuration of the Cover Section]

FIGS. 6 and 7 are exploded perspective views of the cover section 3 respectively viewed from above on the front side (the +Y direction side on the +Z-direction side) and from below on the back side (the −Y-direction side on the −Z-direction side).

The cover section 3 is a part attachable to the head HD of the user US in the head-mounted display device 1. In detail, the cover section 3 has a configuration like goggles. The cover section 3 is located on the +Z-direction side with respect to the user US. The cover section 3 supports the display section 2 to be turnable in the ±Y direction and covers the display section 2 on the +Z-direction side. That is, the cover section 3 is disposed on the +Z-direction side, the ±X-direction side, and the ±Y-direction side except the −Z-direction side with respect to the display section 2.

The cover section 3 includes, as shown in FIGS. 6 and 7, the light transmitting section 31, a contact section 32, a main body section 33, a mounting section 34 (see FIG. 1), cover attachment sections 35R and 35L, and protection covers 36L and 36R.

Among these sections, as shown in FIG. 1, the mounting section 34 is a band wound around the head HD when the cover section 3 is attached to the head HD. The mounting section 34 is attached to the main body section 33.

[Configuration of the Light Transmitting Section]

As shown in FIGS. 6 and 7, the light transmitting section 31 is a part equivalent to a lens section in the goggles. The light transmitting section 31 is disposed on the +Z-direction side with respect to the display section 2. The light transmitting section 31 has a function of protecting the light guide section 24 and the eyes of the user US. Specifically, the light transmitting section 31 is a light transmissive member combined with the main body section 33 to be opposed to the light guide section 24 on the +Z-direction side. The light transmitting section 31 is formed by resin that transmits light in a visible light region. The user US can observe the outside world directly or via the light guide section 24.

Such a light transmitting section 31 includes, at a peripheral edge thereof, a plurality of insertion sections 311 and a plurality of claw sections 312 projecting to the −Z-direction side. The plurality of insertion sections 311 are inserted into the main body section 33 and the plurality of claw sections 312 engage with the main body section 33, whereby the light transmitting section 31 is attached to the main body section 33.

Note that the light transmitting section 31 is capable of transmitting at least a part of incident light. The light transmitting section 31 may have any characteristic as a light transmission characteristic if the user US can visually recognize the outside world via the light transmitting section 31. For example, the light transmitting section 31 may have at least any one of a wavelength selection characteristic for limiting a wavelength of transmitted light, a polarized light selection characteristic for transmitting predetermined polarized light and preventing transmission of other polarized lights, and a transmission prevention characteristic for transmitting a predetermined ratio of light in incident light. The light transmitting section 31 may or may not have a function of an optical lens.

[Configuration of the Contact Section]

The contact section 32 is combined with the main body section 33 on the −Z-direction side. The contact section 32 comes into contact with the face of the user US when the head-mounted display device 1 is mounted on the head HD. The contact section 32 is formed of elastic resin in a substantial C shape opened on the −Y-direction side when viewed from the +Z-direction side or the −Z-direction side. A part on the −Z-direction side in the contact section 32 is formed in a curved shape along the face of the user US and comes into contact with a part surrounding both the eyes of the user US.

Note that, although the contact section 32 is formed in the substantial C shape corresponding to the shape of the end edge on the −Z-direction side in the main body section 33, the contact section 32 may be formed in, for example, an annular shape (a seamless annular shape).

[Configuration of the Main Body Section]

FIG. 8 is a perspective view of the main body section 33 viewed from below on the front side (the −Y-direction side on the +Z-direction side).

The light transmitting section 31 and the contact section 32 are attached to the main body section 33. The main body section 33 turnably supports the display section 2. Besides, the mounting section 34, the cover attachment section 35L and 35R, and the protection covers 36L and 36R respectively configuring the cover section 3 are attached to the main body section 33.

The main body section 33 includes, as shown in FIG. 8, a first extending section 331, second extending sections 332L and 332R, supporting sections 333L and 333R, and attachment sections 334L and 334R. The main body section 33 is formed in a substantial C shape opened on the −Y-direction side when viewed from the +Z-direction side or the −Z-direction side by these sections.

The first extending section 331 and the second extending sections 332L and 332R respectively extend along the +X direction.

When the head-mounted display device 1 is mounted on the head HD, the first extending section 331 is disposed in a position corresponding to the forehead and comes into contact with the end portion on the +Y-direction side on the surface on the −Z-direction side of the light transmitting section 31.

When the head-mounted display device 1 is mounted on the head HD, the second extending section 332R located on the −X-direction side of the second extending sections 332L and 332R is disposed in a position corresponding to the right cheek and the second extending section 332L located on the +X-direction side is disposed in a position corresponding to the left cheek. The second extending sections 332L and 332R come into contact with the end portion on the −Y-direction side on the surface on the −Z-direction side of the light transmitting section 31. Note that, when viewed from the +Z-direction side, the main body section 33 may be formed in an annular shape obtained by connecting the second extending sections 332L and 332R.

The supporting sections 333L and 333R are parts that turnably support the display section 2 and to which the cover attachment sections 35L and 35R are respectively attached.

The supporting sections 333R located on the −X-direction side connects the end portion on the −X-direction side in the first extending section 331 and the end portion on the −X-direction side in the second extending section 332R. In other words, the supporting section 333R is a side surface section that crosses the +X direction together with the cover attachment section 35R explained below and is located on the −X-direction side. The supporting section 333R includes a disposing section 3331, the shaft supporting section 3332, guide sections 3333 and 3335, a locking section 3334, a protrusion section 3336, and a hole section 3337.

The disposing section 3331 is a part facing the −X-direction side in the supporting section 333R and is a part in which the cover attachment section 35R is disposed from the −X-direction side. The disposing section 3331 is formed in a recessed section recessed toward the inner side of the main body section 33 (the +X-direction side). The cover attachment section 35R is disposed to close the disposing section 3331.

The shaft supporting section 3332 is a circular hole section formed on a surface on the −X-direction side, which is the bottom surface of the disposing section 3331 in the supporting section 333R. The shaft supporting section 3332 turnably supports the shaft section 213 (see FIG. 4) of the housing section 212R to thereby support the display section 2 to be turnable around a turning axis extending along the +X direction.

The guide sections 3333 and 3335 and the locking section 3334 are formed to pierce through the supporting section 333R in the +X direction. That is, the guide sections 3333 and 3335 and the locking section 3334 are formed as hole sections that pierce through the supporting section 333R along the +X direction, which is the thickness direction of the supporting section 333R. The guide sections 3333 and 3335 and the locking section 3334 are respectively formed in arcuate shapes centering on the shaft supporting section 3332. The dimensions in the +Y direction of the guide sections 3333 and 3335 and the locking section 3334 are formed to increase in the order of the guide section 3333, the locking section 3334, and the guide section 3335.

The boss 214 (see FIG. 4) of the housing section 212R is inserted into the guide section 3333. The boss 215 (see FIG. 4) of the housing section 212R is inserted into the guide section 3335. The guide sections 3333 and 3335 specify a turning range in the ±Y direction of the display section 2 around the shaft section 213 and the shaft supporting section 3332 and guides movement of the bosses 214 and 215 and turning of the display section 2.

The locking section 3334 is located between the guide sections 3333 and 3335 and locks a shaft section 412 (see FIGS. 11 to 14) of the position adjusting mechanism 4R explained below. Specifically, the locking section 3334 has a shape obtained by concatenating four hole sections H1, H2, H3, and H4 into which the shaft section 412 respectively can be inserted. As explained in detail below, the shaft section 412 is inserted into any one of the hole sections H1 to H4, whereby the turning in the ±Y direction of the display section 2 is restricted and the display section 2 is locked.

The protrusion section 3336 and the hole section 3337 position the cover attachment section 35R.

The protrusion section 3336 is erected from the bottom of the disposing section 3331. Screw holes to which screws S (see FIGS. 9 and 10) are fixed are formed at the distal end of the protrusion section 3336. A bent section 353 (see FIG. 11) provided in the cover attachment section 35R is inserted into the hole section 3337.

The supporting section 333L located on the +X-direction side connects the end portion on the +X-direction side in the first extending section 331 and the end portion on the +X-direction side in the second extending section 332L. Like the supporting section 333R, the supporting section 333L includes the disposing section 3331 in which the cover attachment section 35L is disposed from the +X-direction side and the shaft supporting section 3332, the guide sections 3333 and 3335, the locking section 3334, the protrusion section 3336 (not shown in FIG. 8), and the hole section 3337 respectively formed on the bottom of the disposing section 3331. Note that the configuration and the functions of the supporting section 333L are the same as the configuration and the functions of the supporting section 333R. Therefore, explanation of the configuration and the functions is omitted.

The attachment sections 334L and 334R are parts to which the end portion in the +X-direction side and the end portion in the −X direction side in the mounting section 34 are respectively attached. Among these sections, the attachment section 334L is located on the −Z-direction side with respect to the supporting section 333L. The attachment section 334R is located on the −Z-direction side with respect to the supporting section 333R.

[Configuration of the Cover Attachment Section]

FIGS. 9 and 10 are diagrams showing the head-mounted display device 1 in which the protection cover 36R is opened. In detail, FIG. 9 is a perspective view of the head-mounted display device 1 viewed from above on the back side (+Y-direction side on the −Z-direction side). FIG. 10 is a side view of the head-mounted display device 1 viewed from the right direction (the −X-direction side).

The cover attachment sections 35L and 35R are substantially rectangular members to which the protection covers 36L and 36R are respectively attached. The cover attachment sections 35L and 35R are respectively attached to the disposing sections 3331 of the supporting sections 333L and 333R crossing in the +X direction. The cover attachment sections 35L and 35R can be considered members configuring parts of the supporting sections 333L and 333R.

As shown in FIGS. 9 and 10, the cover attachment section 35R includes two hole sections 351 through which the screws S for fixing the cover attachment section 35R to the disposing section 3331 are inserted. Besides, the cover attachment section 35R includes turning supporting sections 352, a bent section 353 (see FIG. 11), locking claws 354, covered sections 355 and 356, and an opening section 357.

The turning supporting sections 352 are provided at the end portion on the +Z-direction side in the cover attachment section 35R. The turning supporting sections 352 turnably support the protection cover 36R around a turning axis extending along the +Y direction.

The bent section 353 is located between a pair of the turning supporting sections 352 and bent to the +X-direction side. The distal end of the bent section 353 is inserted into the hole section 3337 of the supporting section 333R from the −X-direction side.

The locking claws 354 are provided at the end portion on the −Z-direction side in the cover attachment section 35R. The locking claws 354 are turned in the −Z direction to lock the protection cover 36R that covers the position adjusting mechanism 4R.

The covered section 355 covers and protects, on the −X-direction side, a coupling section 42 coupled to the boss 214 inserted through the guide section 3333. Similarly, the covered section 356 covers and protects, on the −X-direction side, the coupling section 42 coupled to the boss 215 inserted through the guide section 3335. Note that the coupling section 42 is explained in detail below.

The opening section 357 is formed substantially in the center of the cover attachment section 35R. The opening section 357 exposes the locking section 3334 to the −X-direction side. Note that, as explained in detail below, the coupling section 42, an urged section 43, a ring 44, and an urging section 45 (see FIGS. 10 to 13) of the position adjusting mechanism 4R explained below are disposed between the supporting section 333R and the cover attachment section 35R. An operation section 41 (see FIGS. 10 to 13) of the position adjusting mechanism 4R is located on the outer side with respect to the cover attachment section 35R (the −X-direction side). The operation section 31 is coupled to the coupling section 42 via the opening section 357.

A shown in FIG. 10, the guide sections 3333 and 3335 and the locking section 3334 in the supporting section 333R are located in the opening section 357 when viewed from the −X-direction side. The guide sections 3333 and 3335 and the locking section 3334 are exposed to the −X-direction side via the opening section 357. For this reason, the opening section 357 is an opening section that causes, in conjunction with the guide sections 3333 and 3335 and the locking section 3334, a region on the inner side of the cover section 3 (a region on the display section 2 side) and a region on the outer side (a region on the opposite side of the display section 2) to communicate. The opening section 357 is equivalent to the opening section of the invention.

Note that, although detailed illustration is omitted, like the cover attachment section 35R, the cover attachment section 35L disposed in the disposing section 3331 of the supporting section 333L includes the hole sections 351, the turning supporting sections 352, the bent section 353, the locking claws 354, the covered sections 355 and 356, and the opening section 357. These sections function in the same manner as the components of the cover attachment section 35R. Therefore, explanation of the sections is omitted.

[Configuration of the Protection Covers]

The protection covers 36L and 36R are respectively supported by the cover attachment sections 35L and 35R to be turnable around a turning axis extending along the +Y direction. When turned to the +Z-direction side, the protection covers 36L and 36R expose the operation sections 41 explained below of the position adjusting mechanisms 4L and 4R. When turned to the −Z-direction side, the protection covers 36L and 36R cover the operation sections 41.

As shown in FIG. 9, the protection cover 36R attached to the cover attachment section 35R includes a supported section 361 supported by the turning supporting sections 352. Besides, as shown in FIGS. 9 and 10, the protection cover 36R includes a recessed section 362 and a recessed section 363.

When the protection cover 36R is turned to the −Z-direction side, the recessed section 362 houses the operation section 41 on the inside.

The locked section 363 is located on the opposite side of the supported section 361 in the protection cover 36R. When the protection cover 36R is turned to the −Z-direction side, the locked section 363 is locked by the locking claws 354. Consequently, a state in which the protection cover 36R covers the position adjusting mechanism 4R, that is, a closed state of the protection cover 36R is maintained.

Note that the protection cover 36L attached to the cover attachment section 35L has the same configuration as the configuration of the protection cover 36R. Therefore, explanation of the protection cover 36L is omitted.

[Configuration of the Position Adjusting Mechanism]

FIGS. 11 to 13 are exploded perspective views showing the position adjusting mechanism 4R. In detail, FIG. 11 is an exploded perspective view showing the position adjusting mechanism 4R viewed from the +Z-direction side, the +Y-direction side, and the −X-direction side. FIG. 12 is an exploded perspective view showing the position adjusting mechanism 4R viewed from the −Z-direction side, the −Y-direction side, and the −X-direction side. FIG. 13 is an exploded perspective view showing the position adjusting mechanism 4R viewed from the +Z-direction side, +Y-direction side, and the +X-direction side.

The position adjusting mechanism 4L is located on the +X-direction side with respect to the cover section 3. The position adjusting mechanism 4R is located on the −X-direction side with respect to the cover section 3. In other words, the position adjusting mechanism 4L is provided according to the supporting section 333L. The position adjusting mechanism 4R is provided according to the supporting section 333R. The position adjusting mechanisms 4L and 4R receive moving operation for the display section 2 by the user US and lock the display section 2 after the movement.

[Configuration of the Position Adjusting Mechanism on the Right Side]

As shown in FIGS. 11 to 13, the position adjusting mechanism 4R is provided in a position opposed to the supporting section 333R of the main body section 33 on the −X-direction side. The position adjusting mechanism 4R engages with the housing section 212R of the display section 2 turnably supported by the main body section 33.

The position adjusting mechanism 4R includes the operation section 41, the coupling section 42, the urged section 43, the ring 44, and the urging section 45.

The operation section 41 is a member operated by the user US. The operation section 41 is exposed when the protection cover 36R is turned to the +Z-direction side. The operation section 41 includes a columnar gripping section 411 gripped by the user US and a shaft section 412 coaxial with the gripping section 411.

The shaft section 412 has a diameter smaller than the gripping section 411. The shaft section 412 is inserted into and pulled out from the locking section 3334 (the hole sections H1 to H4) via the coupling section 42. Note that, although the diameter of the shaft section 412 is smaller than the diameter of the hole sections H1 to H4 of the locking section 3334, the shaft section 412 is not so small as to be able to move in connecting sections that connect the hole sections H1 to H4. For this reason, for example, when the shaft section 412 inserted into the hole section H1 is inserted into the hole section H2, it is necessary to insert the shaft section 412 into the hole section H2 after pulling out the shaft section 412 from the hole section H1.

The coupling section 42 is disposed between the covered sections 355 and 356 of the cover attachment section 35R and the supporting section 333R. The coupling section 42 is a member that couples the bosses 214 and 215 of the housing section 212R and the operation section 41 and supports the urging section 45. The coupling section 42 includes a first cylinder section 421 and a second cylinder section 422 and a third cylinder section 423, the dimensions in the +X direction and the thicknesses of which are respectively smaller than the dimension and the thickness of the first cylinder section 421, and has a configuration in which the second cylinder section 422 and the third cylinder section 423 are integrated.

The first cylinder section 421 includes, on the inside, a stepped hole 4211 that pierces through the first cylinder section 421 along the +X direction. The stepped hole 4211 is formed small in an inner diameter on the −X-direction side and large in an inner diameter on the +X-direction side. The shaft section 412 is inserted through the stepped hole 4211 from the −X-direction side. Besides the urging section 45 is disposed in the stepped hole 4211.

The second cylinder section 422 is located on the −Z-direction side with respect to the first cylinder section 421. The third cylinder section 423 is located on the +Z-direction side with respect to the first cylinder section 421.

As shown in FIG. 13, the second cylinder section 422 includes a fitting hole 4221 opened to the +Z-direction side. The boss 214 inserted through the guide section 3333 is fit in the fitting hole 4221.

The third cylinder section 423 includes a fitting hole 4231 opened to the +Z-direction side. The boss 215 inserted through the guide section 3335 is fit in the fitting hole 4231.

The operation section 41 of the position adjusting mechanism 4R and the housing section 212R of the display section 2 are coupled via such a coupling section 42.

The urged section 43 is an annular body attached to, by the ring 44, the vicinity of the end portion on the +X-direction side, which is the distal end portion in the shaft section 412 inserted through the first cylinder section 421. The urged section 43 includes, in the center, a hole section 431 through which the shaft section 412 is inserted. The urged section 43 is urged by the urging section 45 to the +X-direction side together with the shaft section 412 and the operation section 41.

Note that, in this embodiment, the ring 44 is an E ring. However, an attachment member is not limited to the ring 44 and other attachment members may be used if the urged section 43 can be attached to the shaft section 412.

The urging section 45 is disposed in the stepped hole 4211 of the first cylinder section 421. The urging section 45 causes an urging force in the +X direction to act on the shaft section 412 via the urged section 43, keeps the distal end of the shaft section 412 in the locking section 3334, and locks the display section 2.

Note that, in this embodiment, the urging section 45 is configured by a compression coil spring. However, not only this, but the urging section 45 may be other components such as an elastic body if the urging section 45 can urge the shaft section 412 to the +Z-direction side.

[Configuration of the Position Adjusting Mechanism on the Left Side]

Although detailed illustration is omitted, the position adjusting mechanism 4L provided in a position opposed to the supporting section 333L of the main body section 33 in the +X-direction side has the same configuration as the configuration of the position adjusting mechanism 4R. That is, the position adjusting mechanism 4L also includes the operation section 41, the coupling section 42, the urged section 43, the ring 44, and the urging section 45.

In the position adjusting mechanism 4L, the shaft section 412 of the operation section 41 is inserted through the first cylinder section 421 of the coupling section 42, in which the bosses 214 and 215 of the housing section 212L inserted through the guide sections 3333 and 3335 of the supporting section 333L are fit, and is inserted into the locking section 3334 (any one of the holes H1 to H4) of the supporting section 333L. The urged section 43 is attached to the vicinity of the distal end portion of the shaft section 412 by the ring 44. The shaft section 412 is urged to the supporting section 333L side by the urging section 45 disposed in the stepped hole 4211 of the first cylinder section 421. Consequently, a state in which the distal end of the shaft section 412 is inserted into any one of the hole sections H1 to H4 of the locking section 3334 is maintained. The display section 2 is locked.

[Positional Adjustment of the Display Section]

Positional adjustment of the display section 2 performed using the position adjusting mechanisms 4L and 4R is explained.

During normal use of the head-mounted display device 1, as shown in FIG. 1 and the like, the operation sections 41 of the position adjusting mechanisms 4L and 4R are covered by the protection covers 36L and 36R.

When the protection cover 36R is turned to the +z-direction side, as shown in FIG. 10, the operation section 41 of the position adjusting mechanism 4R is exposed. Although illustration is omitted, when the protection cover 36L is turned in the +Z-direction side, the operation section 41 of the position adjusting mechanism 4L is exposed.

FIG. 14 is a sectional view showing the configuration on the −X-direction side in the head-mounted display device 1. In detail, FIG. 14 is a view of components located on the −X-direction side in a cross section taken along a XIV-XIV line in FIG. 10 viewed from the +Y-direction side.

In this state, as shown in FIG. 14, the shaft section 412 of the operation section 41 configuring the position adjusting mechanism 4R is inserted into the locking section 3334 (any one of the holes H1 to H4).

As explained above, although the diameter of the shaft section 412 is smaller than the inner diameter of the holes H1 to H4, the shaft section 412 is not so small as to be able to move among the hole sections H1 to H4 adjacent to one another. The shaft section 412 is coupled to the bosses 214 and 215 via the coupling section 42. For this reason, turning of the display section 2 in the ±Y direction along the guide sections 3333 and 3335 around the shaft section 213 and the shaft supporting section 3332 is restricted as long as the shaft section 412 is inserted into the locking section 3334. That is, in this state, the display section 2 is locked to the main body section 33 of the cover section 3.

Note that, illustration is omitted in FIG. 14, the same applies to the position adjusting mechanism 4L.

On the other hand, when the shaft section 412 is pulled out from the locking section 3334 resisting the urging force of the urging section 45, it is possible to move the display section 2 in the ±Y direction together with the operation section 41 and the coupling section 42. In this state, the user US moves the gripped gripping section 411 in the ±Y direction, whereby the display section 2 is turned in the ±Y direction around the shaft section 213 and the shaft supporting section 3332.

Thereafter, when the user US reduces a tensile force on the operation section 41, the shaft section 412 is inserted into any one of the hole sections H1 to H4 of the locking section 3334 by the urging force of the urging section 45. Consequently, as explained above, the turning of the display section 2 is restricted and the display section 2 is locked.

[Position of the Display Section]

FIG. 15 is a view showing the direction of the head-mounted display device 1 at the time when the user US wears the head-mounted display device 1 and is a view of the head-mounted display device 1 viewed from the −X-direction side. Note that an axis Ax shown in FIG. 15 is an axis parallel to the center axis of the head HD of the user US. The axis Ax is shown as a reference of the center axis of the head HD.

When the user US wears the head-mounted display device 1, as shown in FIG. 15, the light transmitting section 31 faces a slightly upper side for the user US.

In the head-mounted display device 1 worn in this way, the display section 2 is disposed in any one of a first posture in which the shaft section 412 is inserted into the hole section H1 of the locking section 3334, a second posture in which the shaft section 412 is inserted into the hole section H2, a third posture in which the shaft section 412 is inserted into the hole section H3, and a fourth posture in which the shaft section 412 is inserted into the hole section H4.

A display surface of an image formed by the light guide section 24 in the second posture among these postures is substantially orthogonal to a direction parallel to a second direction D2 (a direction indicated by an arrow of an alternate long and two short dashes line) passing the center of the hole section H2 from the center of the shaft supporting section 3332 that axially supports the shaft section 213. In other words, an emitting direction of an image by the display section 2 (the light guide section 24) in the second posture is a direction opposite to the direction parallel to the second direction D2.

Note that, about an image for right eye, the emitting direction of the image is a traveling direction of a main beam of the image for right eye visually recognized by the right eye RE (a traveling direction of light forming a center portion of the image for right eye). About an image for left eye, the emitting direction of the image is a traveling direction of a main beam of the image for left eye visually recognized by the left eye LE (a traveling direction of light forming a center portion of the image for left eye).

A display surface of an image in the first posture is substantially orthogonal to a direction parallel to a first direction D1 (a direction indicated by an arrow of an alternate long and two short dashes line) passing the center of the hole section H1 from the center of the shaft supporting section 3332. The emitting direction of the image by the display section 2 (the light guide section 24) in the first posture is a direction opposite to the direction parallel to the first direction D1.

A display surface in the third posture is substantially orthogonal to a direction parallel to a third direction D3 (a direction indicated by an arrow of an alternate long and two short dashes line) passing the center of the hole section H3 from the center of the shaft supporting section 3332. The emitting direction of the image by the display section 2 (the light guide section 24) in the third posture is a direction opposite to the direction parallel to the third direction D3.

A display surface in the fourth posture is substantially orthogonal to a direction parallel to a fourth direction D4 (a direction indicated by an alternate long and two short dashes line) passing the center of the hole section H4 from the center of the shaft supporting section 3332. The emitting direction of the image by the display section 2 (the light guide section 24) in the fourth posture is a direction opposite to the direction parallel to the fourth direction D4.

The position of the hole section H2 is set to a position where the second direction D2 is orthogonal to the center axis of the head HD of the user US. In other words, the position of the hole section H2 is set to a position where the second direction D2 is orthogonal to the center axis of the head HD when viewed from the +X-direction side or the −X-direction side and parallel to the +Z direction, which is the front direction for the user US. Further, in other words, the position of the hole section H2 is set to a position where the emitting direction of the image by the display section 2 is a direction orthogonal to the center axis of the head HD when viewed from the +X-direction side or the −X-direction side.

The position of the hole section H1 is set to a position where the first direction D1 is a direction inclined 12° to the −Y-direction side with respect to the second direction D2 parallel to the front direction when viewed from the +X-direction side or the −X-direction side, that is, a position where the first direction D1 is a direction inclined 12° in the downward direction for the user US. In other words, the position of the hole section H1 is set to a position where the emitting direction of the image by the display section 2 is a direction inclined 12° to the +Y-direction side with respect to a plane orthogonal to the center axis of the head HD when viewed from the +X-direction or the −X-direction side, that is, a direction inclined 12° to the upward direction with respect to the plane. In short, the position of the hole section H1 is a position where the emitting direction of the image by the display section 2 is the direction inclined 12° to the +Y-direction side with respect to the front direction when viewed from the +X-direction side or the −X-direction side.

For this reason, when the display section 2 is in the first posture, a display surface of the image crosses a line of sight of the user US inclined 12° in the downward direction for the user US (the −Y direction) with respect to the +Z direction, which is the front direction. That is, a crossing angle α of the first direction D1 with respect to the second direction D2 shown in FIG. 15 is 12° in the downward direction.

The position of the hole section H3 is set to a position where the third direction D3 is a direction inclined 12° to the +Y-direction side with respect to the second direction D2 parallel to the front direction when viewed from the +X-direction side or the −X-direction side, that is, a position where the third direction D3 is a direction inclined 12° in the downward direction for the user US. In other words, the position of the hole section H3 is set to a position where the emitting direction of the image by the display section 2 is a direction inclined 12° to the −Y-direction side with respect to a plane orthogonal to the center axis of the head HD when viewed from the +X-direction or the −X-direction side, that is, a direction inclined 12° to the downward direction with respect to the plane. In short, the position of the hole section H3 is a position where the emitting direction of the image by the display section 2 is the direction inclined 12° to the −Y-direction side with respect to the front direction when viewed from the +X-direction side or the −X-direction side.

For this reason, when the display section 2 is in the third posture, a display surface of the image crosses a line of sight of the user US inclined 12° in the upward direction for the user US (the +Y direction) with respect to the +Z direction, which is the front direction. That is, a crossing angle β of the third direction D3 with respect to the second direction D2 shown in FIG. 15 is 12° in the upward direction.

The position of the hole section H4 is set to a position where the fourth direction D4 is a direction inclined 27° to the +Y-direction side with respect to the second direction D2 parallel to the front direction when viewed from the +X-direction side or the −X-direction side, that is, a position where the fourth direction D4 is a direction inclined 27° in the upward direction for the user US. In other words, the position of the hole section H3 is set to a position where the emitting direction of the image by the display section 2 is a direction inclined 27° to the −Y-direction side with respect to a plane orthogonal to the center axis of the head HD when viewed from the +X-direction or the −X-direction side, that is, a direction inclined 27° to the downward direction with respect to the plane. In short, the position of the hole section H4 is a position where the emitting direction of the image by the display section 2 is the direction inclined 27° to the −Y-direction side with respect to the front direction when viewed from the +X-direction side or the −X-direction side.

For this reason, when the display section 2 is in the fourth posture, a display surface of the image crosses a line of sight of the user US inclined 27° in the upward direction for the user US (the +Y direction) with respect to the +Z direction, which is the front direction. That is, a crossing angle of the fourth direction D4 with respect to the second direction D2 shown in FIG. 15 is 27° in the upward direction. A crossing angle γ of the fourth direction D4 with respect to the third direction is 15° further in the upward direction.

A line of sight of the user US in a relaxed state is along the direction inclined 12° to the −Y-direction side with respect to the +Z direction, which is the front direction. That is, the line of sight of the user US in the relaxed state is substantially parallel to the direction inclined 12° to the −Y-direction side with respect to the +Z direction. For this reason, by disposing the display section 2 in a position where the display section 2 is in the first posture, in the relaxed state of the user US, it is possible to locate the display surface in the direction of the line of sight of the user US. The direction of the line of sight of the user US and the emitting direction of the image can be set to opposite directions to each other. Therefore, the user US can visually recognize a displayed image (virtual image). The position of the display section 2 in the first posture is equivalent to the first position of the invention.

The display section 2 is disposed in a position where the display section 2 takes the second posture, whereby the user US can visually recognize an image by slightly looking up.

Further, the display section 2 is disposed in the third posture or the second posture, whereby it is possible to prevent the display surface of the image from being located in the direction of the line of sight of the user US in the relaxed state. On the other hand, it is possible to make it easy to observe the outside world. The position of the display section 2 in the third posture or the fourth posture is equivalent to the second position of the invention.

Effects of the First Embodiment

With the head-mounted display device 1 according to this embodiment explained above, it is possible to achieve the following effects.

The head-mounted display device 1 includes the display section 2 disposed in front of the eyes of the user US and configured to display an image, the cover section 3 configured to cover the display section 2 in a position right opposed to the user (a position in the +Z-direction side) and mounted on the user US, and the position adjusting mechanisms 4L and 4R capable of adjusting the position of the display section 2 on the opposite side of the display section 2 side across the cover section 3. Among these sections, the cover section 3 includes the light transmitting section 31 opposed to the display section 2. Consequently, the position of the display section 2 can be adjusted by the position adjusting mechanisms 4L and 4R in a state in which the user US wears the cover section 3. Therefore, the position of the display section 2 can be adjusted without detaching the cover section 3. The user US wearing the head-mounted display device 1 can visually recognize the outside world via the light transmitting section 31. For this reason, it is possible to not only dispose the display section in a position where an image is easily visually recognized but also, for example, dispose the display section 2 in a position where the outside world and the image are easily visually recognized or dispose the display section 2 in a position where only the outside world is easily visually recognized. Therefore, it is possible to improve versatility of the head-mounted display device 1.

The display section 2 includes the image emitting sections 22L and 22R configured to emit images and the light guide section 24 configured to guide the images emitted from the image emitting sections 22L and 22R to the eyes of the user, which are visual recognition positions of the image. Consequently, since the light guide section 24 has light transmissivity, it is possible to simultaneously visually recognize the image and the outside world of the cover section 3 via the light transmitting section 31 and the light guide section 24. Therefore, it is possible to carry out work while confirming information concerning a work site and the like and a manual.

Even if the user US does not directly touch the display section 2, the position of the display section 2 can be adjusted by the position adjusting mechanism 4L and 4R. Therefore, it is possible to prevent the light guide section 24 from being stained. Therefore, it is possible to prevent the image and the outside world from becoming less easily visually recognized because of a fingerprint, a stain, or the like. It is possible to appropriately guide the image to the eyes of the user US.

The display section 2 is supported by the cover section 3 to be turnable around the turning axis extending along the +X direction, which is the left-right direction for the user US. Specifically, the shaft section 213 functioning as the turning axis of the display section 2 is inserted into the shaft supporting section 3332 of the cover section 3 and turnably supported. Consequently, the position of the display section can be adjusted to a position where the user US easily observes the image. Therefore, it is possible to improve the versatility of the head-mounted display device 1.

The position adjusting mechanism 4R is capable of locking the display section 2 in the first posture (the first position) of crossing of a line of sight of the user US orthogonal to the center axis of the head HD of the user US and in the downward direction with respect to the +Z direction, which is the front direction for the user US, and the display surface of the image by the light guide section 24. The position adjusting mechanism 4R is capable of locking the display section 2 in the third posture or the fourth posture (each of which is the second position) of crossing of a line of sight of the user US in the upward direction with respect to the front direction and the display surface of the image by the light guide section 24. The same applies to the position adjusting mechanism 4L. Consequently, it is possible to maintain the positions of the display section 2 in the postures.

For example, when a line of sight of the user US at a normal time is in the downward direction with respect to the front direction (the +Z direction), it is possible to make it easy for the user US to visually recognize the image by setting the display section 2 in the first posture. It is possible to make it less easy for the user US to visually recognize the image by setting the display section 2 in the third posture or the fourth posture. Therefore, when the user US wearing the head-mounted display device 1 does not want to visually recognize the image, it is possible to locate the display section 2 in a position where the image is less easily visually recognized.

The position (the first position) of the display section 2 in the first posture is a position of crossing of a line of sight of the user US inclined 12° to the −Y-direction side with respect to the +Z direction and the display surface. This position is a position of crossing of a line of sight of the user US in the downward direction at 12° with respect to the front direction and the display surface. Consequently, the user US can visually recognize an image displayed by the display section 2 in the relaxed state.

The head-mounted display device 1 includes the display section 2 configured to emit images to the right eye RE and the left eye LE, which are visual recognition positions of an image; the cover section 3 located on the opposite side of the emission side of the image by the display section 2 (the +Z direction) with respect to the display section 2, and the position adjusting mechanisms 4L and 4R capable of adjusting a position of the display section 2 on the opposite side of the display section 2 side across the cover section 3. The cover section 3 includes the light transmitting section 31 opposed to the display section 2. Consequently, as explained above, in a state in which the head-mounted display device 1 is mounted, it is possible to adjust the position of the display section 2 covered by the cover section 3 located on the +Z-direction side. The user US can visually recognize the outside world of the cover section 3 via the light transmitting section 31. Therefore, it is possible to not only dispose the display section 2 in a position where the image is easily visually recognized but also, for example, dispose the display section 2 in a position where the outside world and the image are simultaneously easily visually recognized or dispose the display section 2 in a position where only the outside world is easily visually recognized. Therefore, it is possible to improve the versatility of the head-mounted display device 1.

The light transmitting section 31 is opposed to the light guide section 24 of the display section 2. Consequently, it is possible to simultaneously visually recognize the outside world of the cover section 3 and the image in the position of the display section 2 where the image can be visually recognized.

The display section 2 is supported by the cover section 3 to be turnable around the rotation axis extending along the horizontal direction of the vertical direction and the horizontal direction of the image displayed by the display section. That is, the display section 2 is capable of turning around the turning axis parallel to the +X direction as explained above. Consequently, the display section 2 is supported to be turnable up and down for the user, whereby it is possible to adjust the position of the display section 2 to the position where the image is easily observed and the position where the image is less easily observed. Therefore, it is possible to improve the versatility of the head-mounted display device 1.

The position adjusting mechanisms 4L and 4R are capable of locking the display section 2 in a plurality of places in a turning range of the display section 2. Consequently, since the display section 2 can be locked in an adjusted position, it is possible to prevent the position of the display section from deviating during the observation of the image.

Therefore, it is possible to improve convenience of use of the head-mounted display device 1.

The positions where the position adjusting mechanisms 4L and 4R are capable of locking the display section 2 include a position of the first posture (the first position) where an emitting direction of the image by the display section 2 is the upward direction and a position of the third posture and the fourth posture (the second position) where the emitting direction of the image by the display section 2 is the downward direction. Consequently, by locating the display section 2 in the first position, it is possible to make it easy for the user US to observe the image. By locating the display section 2 in the second position, it is possible to make it less easy for the user US to observe the image. Therefore, it is possible to adjust the position of the display section 2 to a position where the image is observed and a position where the image is not observed.

A position of the display section 2 in the first posture (the first position) is a position where the emitting direction of the image by the display section 2 crosses, at a crossing angle of 12°, a plane orthogonal to the center axis of the head of the user US. The display section 2 is locked in this position, whereby, as explained above, the user US can visually recognize the image displayed by the display section 2 in the relaxed state.

The cover section 3 includes the supporting sections 333L and 333R that cross the turning axis of the display section 2 and support the display section 2. The position adjusting mechanisms 4L and 4R are provided according to the supporting sections 333L and 333R. Consequently, the position adjusting mechanisms 4L and 4R are disposed on the right side and the left side of the head HD of the user US. Therefore, it is possible to dispose the position adjusting mechanisms 4L and 4R outside the visual field of the user US. Besides, it is possible to make it easy to operate the position adjusting mechanisms 4L and 4R.

The cover section 3 includes an opening section 357 configured to cause the display section 2 side and the opposite side of the display section 2 with respect to the cover section to communicate. The position adjusting mechanism 4R includes the coupling section 42 coupled to the housing section 212R of the display section 2 and the operation section 41 in which the shaft section 412, which is one end, is connected to the coupling section 42 via the opening section 357 and the gripping section 411, which is the other end, is exposed to the opposite side of the display section 2 with respect to the cover section 3. Similarly, the position adjusting mechanism 4L includes the same operation section 41. Consequently, the display section 2 can be operated by the coupling section 42 coupled to the display section 2 via the opening section 357 and the operation section 41 exposed to the opposite side of the display section 2 with respect to the cover section 3, the coupling section 42 and the operation section 41 being respectively located on the opposite side of the display section 2 with respect to the cover section 3. Therefore, the position of the display section 2 can be adjusted on the opposite side of the display section 2 with respect to the cover section 3.

The display section 2 includes, in the housing section 212R, the bosses 214 and 215 inserted into the guide sections 3333 and 3335 of the supporting section 333R. The display section 2 includes, in the housing section 212L, the bosses 214 and 215 inserted into the guide sections 3333 and 3335 of the supporting section 333L. Consequently, since the turning of the display section 2 is guided by the guide sections 3333 and 3335 and the bosses 214 and 215, the turning of the display section 2 can be smoothly and easily carried out. Therefore, the position adjusting operation of the display section 2 can be easily carried out.

The coupling sections 42 of the position adjusting mechanisms 4L and 4R are coupled to the bosses 214 and 215 corresponding thereto. Consequently, the coupling sections 42 and the display section 2 can be coupled. The operation section 41 and the display section 2 can be coupled via the coupling sections 42. Therefore, the display section 2 can be moved by the operation section 41.

The cover section 3 includes the protection covers 36L and 36R configured to expose the operation section 41 when turned in one direction and cover the operation section 41 when turned in the other direction. Consequently, when it is desired to adjust the position of the display section 2, the operation section 41 can be exposed by turning the protection covers 36L and 36R in the +Z direction. When it is unnecessary to adjust the position of the display section 2, the operation section 41 can be covered by turning the protection covers 36L and 36R in the −Z direction. Therefore, it is possible to prevent the operation section 41 from being unexpectedly operated to change the position of the display section 2.

Second Embodiment

A second embodiment of the invention is explained.

A head-mounted display device according to this embodiment has the same configuration as the configuration of the head-mounted display device 1 explained in the first embodiment. However, the head-mounted display device according to this embodiment is different from the head-mounted display device 1 in that a position adjusting mechanism is provided only on one side for the user US and that the configuration of the position adjusting mechanism is different. Note that, in the following explanation, the same portions or substantially the same portions as the portions explained above are denoted by the same reference numerals and signs and explanation of the portions is omitted.

[Schematic Configuration of the Head-Mounted Display Device]

FIGS. 16 to 21 are a front view, a right side view, a left side view, a rear view, a top view, and a bottom view showing a head-mounted display device 1A according to this embodiment. FIGS. 22 and 23 are perspective views of the head-mounted display device 1A viewed from above on the front side. FIG. 24 is a perspective view of the head-mounted display device 1A viewed from below on the back side. Note that, in FIG. 23, illustration of a light transmitting section 51 configuring a cover section 5 is omitted.

Like the head-mounted display device 1, the head-mounted display device 1A according to this embodiment is a virtual image display device that displays an image as a virtual image. In detail, the head-mounted display device 1A is a head-mounted display device of a see-through type mounted on the head HD of the user US and used and capable of simultaneously observing an image and an outside world. The head-mounted display device 1A includes, as shown in FIGS. 16 to 24, the display section (FIGS. 19, 23, and 24), the cover section 5, a position adjusting mechanism 6, and the coupling member 7.

[Configuration of the Cover Section]

FIGS. 25 and 26 are exploded perspective views of the head-mounted display device 1A viewed from above on the front side and from below on the back side in a state in which components of the cover section 5 and the position adjusting mechanism 6 are exploded.

Like the cover section 3, the cover section 5 is a part having a configuration like goggles and detachably attachable to the head HD of the user US. The cover section 5 supports the display section 2 to be turnable in the ±Y direction and is located on the +Z-direction side with respect to the user US and covers the display section 2 on the +Z-direction side. That is, the cover section 5 is disposed on the +Z-direction side, the ±X-direction side, and the ±Y-direction side other than the −Z-direction side with respect to the display section 2.

The cover section 5 includes, as shown in FIGS. 25 and 26, a light transmitting section 51, a contact section 52, a main body section 53, and the mounting section 34 (see FIG. 1) attached to the main body section 53.

In this embodiment, unlike the cover section 3, the cover section 5 does not include the protection covers 36L and 36R. However, the cover section 5 may include, in the main body section 53, a protection cover that protects the position adjusting mechanism 6 and the coupling member 7.

[Configuration of the Light Transmitting Section]

Like the light transmitting section 31, the light transmitting section 51 is a part equivalent to a lens section in goggles and is a light transmissive member combined with the main body section 53. The light transmitting section 51 has a function of covering and protecting the light guide section 24 and the eyes of the user US on the +Z-direction side.

The light transmitting section 51 includes an oppose section 511 opposed to the light guide section 24 on the +Z-direction side and extending sections 51T, 51B, 51L, and 51R.

The opposed section 511 is a part that transmits at least a part of incident light. The user US is capable of visually recognizing the outside world via the opposed section 511. The opposed section 511 may have any characteristic as a light transmission characteristic. For example, like the light transmitting section 31, the opposed section 511 may have at least one of a wavelength selection characteristic for limiting a wavelength of transmitted light, a polarized light selection characteristic for transmitting predetermined polarized light and preventing transmission of the other polarized lights, and a transmission prevention characteristic for transmitting a predetermined ratio of light in incident light. The opposed section 511 may or may not have a function of an optical lens.

The extending section 51T extends to the −Z-direction side from the edge portion on the +Y-direction side in the opposed section 511 to the −Z-direction side. The extending section 51B extends to the −Z-direction side from the edge portion on the −Y-direction side in the opposed section 511. The extending sections 51T and 51B are curved according to the face of the user US when viewed from the +Y-direction side or the −Y-direction side such that an extension amount from the opposed section 511 increases from the center in the +X direction toward the +X-direction side and the −X-direction side. Note that, as shown in FIG. 26, the extending section 51B is divided into a part on the +X-direction side and a part on the −X-direction side.

The extending section 51T includes two long holes 51T1 into which claw sections 5311 (FIG. 25) included in the main body section 53 are respectively inserted. One long hole 51T1 of the two long holes 51T1 is located on the +X-direction side with respect to the center in the +X direction of the extending section 51T. The other long hole 51T1 is located on the −X-direction side.

As shown in FIG. 26, the extending section 51B includes two long holes 51B1 into which claw sections 5321 (FIG. 25) included in the main body section 53 are respectively inserted. One long hole 51B1 of the two long holes 51B1 is located in the extending section 51B on the +X-direction side. The other long hole 51B1 is located in the extending section 51B on the −X-direction side.

As shown in FIG. 25, the extending section 51R extends to the −Z-direction side from the edge portion on the −X-direction side in the opposed section 511. As shown in FIG. 26, the extending section 51L extends to the −Z-direction side from the edge portion on the +X-direction side in the opposed section 511.

As shown in FIG. 26, an extension amount of the extending sections 51L and 51R from the opposed section 511 is larger than an extension amount of the extending sections 51T and 51B from the opposed section 511. When the light transmitting section 51 is attached to the main body section 53, the extending section 51L comes into contact with a supporting section 533L to cover the supporting section 533L of the main body section 53 on the +X-direction side. The extending section 51R comes into contact with a supporting section 533R to cover the supporting section 533R on the −X-direction side.

In the extending sections 51L and 51R, two each of positioning holes 51L1 and 51R1, in which positioning protrusions 5336 provided in the supporting sections 533L and 533R are fit, are formed.

In the extending section 51R, long holes 51R2 and 51R3 through which the bosses 214 and 215 of the housing section 212R are inserted from the +X-direction side are formed. The long holes 51R2 and 51R3 are formed in arcuate shapes corresponding to tracks of the bosses 214 and 215 during turning in the +Y-direction side and the −Y-direction side of the display section 2.

In the extending section 51L, long holes 51L2 and 51L3 through which the bosses 214 and 215 of the housing section 212L are inserted are formed. The long holes 51L2 and 51L3 are also formed in arcuate shapes.

Further, in the extending section 51L, a long hole 51L4 same as the long holes 51L2 and 51L3 is formed between the long holes 51L2 and 51L3. In the long hole 51L4, a shaft section 612 of an operation section 61 configuring the position adjusting mechanism 6 explained below is inserted into the long hole 51L4 from the +X-direction side. The long hole 51L4 is formed in an arcuate shape corresponding to a track of the shaft section 612 turned together with the display section 2.

[Configuration of the Contact Section]

Like the contact section 32, the contact section 52 is combined with the main body section 53 on the −Z-direction side. When the head-mounted display device 1A is mounted on the head HD of the user US, the contact section 52 comes into contact with the face of the user US. The contact section 52 is formed of elastic resin in a substantial C shape opened on the −Y-direction side when viewed from the +Z-direction side or the −Z-direction side. Apart on the −Z-direction side in the contact section 32 is formed in a curved shape along the face of the user US and is in contact with a part surrounding both the eyes of the user US.

Note that the contact section 52 is formed in the substantially C shape corresponding to the shape of the end edge on the −Z-direction side in the main body section 53. However, like the contact section 32, the contact section 52 may be formed in, for example, an annular shape (a seamless annular shape).

[Configuration of the Main Body Section]

The light transmitting section 51, the contact section 52, and the mounting section 34 (see FIG. 1) are attached to the main body section 53. The main body section 53 includes, as shown in FIGS. 25 and 26, a first extending section 531, second extending sections 532L and 532R, supporting sections 533L and 533R, and attachment sections 534L and 534R.

The first extending section 531 and the second extending sections 532L and 532R respectively extend along the +X direction.

The first extending section 531 is located on the +Y-direction side. When the head-mounted display device 1A is mounted on the head HD, the first extending section 531 is disposed in a position corresponding to the forehead, in contact with the extending section 51T of the light transmitting section 51, and in contact with a part on the +Y-direction side on the +Z-direction side in the contact section 52. The first extending section 531 projects in the +Z direction and includes two claw sections 5311 inserted into the long holes 51T1 respectively corresponding thereto.

The second extending sections 532L and 532R are located on the −Y-direction side. Of the second extending sections 532L and 532R, when the head-mounted display device 1A is mounted on the head HD, the second extending section 532L located on the +X-direction side is disposed in a position corresponding to the left cheek and the second extending section 532R located on the −X-direction side is disposed in a position corresponding to the right cheek. The second extending sections 532L and 532R come into contact with the extending section 51B and come into contact with a part on the −Y-direction side on the +Z-direction side in the contact section 52.

The second extending sections 532L and 532R respectively include the claw sections 5321. The claw sections 5321 project to the +Z-direction side respectively from the second extending sections 532L and 532R and are inserted into the long holes 51B1 respectively corresponding thereto.

Note that, like the main body section 33, the main body section 53 may be formed in an annular shape obtained by connecting the second extending sections 532L and 532R when viewed from the +Z-direction side.

FIG. 27 is a view of the supporting section 533R viewed from the −X-direction side. FIG. 28 is a view of the supporting section 533L viewed from the +X-direction side. In other words, FIGS. 27 and 28 are views of the supporting sections 533R and 533L respectively viewed from positions opposed to the supporting sections 533R and 533L. Note that, in FIGS. 27 and 28, illustration of the light transmitting section 51, the contact section 52, the position adjusting mechanism 6, and the coupling member 7 is omitted.

The supporting sections 533L and 533R are parts that turnably support the display section 2. As shown in FIG. 27, the supporting section 533R is provided to connect end portions on the −X-direction side in the first extending section 531 and the second extending section 532R. As shown in FIG. 28, the supporting section 533L is provided to connect end portions on the +X-direction side in the first extending section 531 and the second extending section 532L.

Each of the supporting sections 533R and 533L includes, as shown in FIGS. 27 and 28, a shaft supporting section 5332 and guide sections 5333 and 5335, which are the same as the shaft supporting section 3332 and the guide sections 3333 and 3335, and two positioning protrusions 5336.

As shown in FIG. 27, the shaft section 213 projected on the housing section 212R is inserted through the shaft supporting section 5332 of the supporting section 533R. As shown in FIG. 28, the shaft section 213 projected on the housing section 212L is inserted through the shaft supporting section 5332 of the supporting section 533L. Consequently, the display section 2 is turnably supported by the main body section 53 around a turning axis extending along the +X direction, which is the left-right direction for the user US and the horizontal direction of a displayed image.

As shown in FIG. 27, the bosses 214 and 215 projected on the housing section 212R are respectively inserted through the guide sections 5333 and 5335 of the supporting section 533R. As shown in FIG. 28, the bosses 214 and 215 projected on the housing section 212L are respectively inserted through the guide sections 5333 and 5335 of the supporting section 533L. A turning range of the display section 2 is specified by dimensions in the +Y direction of the guide sections 5333 and 5335. Note that the guide sections 5333 and 5335 are formed in arcuate shapes corresponding to tracks of the bosses 214 and 215 during the turning of the display section 2. The shaft supporting section 5332 is located in the center of the arc.

Further, as shown in FIG. 28, the supporting section 533L includes a locking section 5334.

Like the locking section 3334, the locking section 5334 is located between the guide sections 5333 and 5335. The locking section 5334 locks the shaft section 612 (see FIGS. 29 and 30) of the operation section 61 configuring the position adjusting mechanism 6. Specifically, the locking section 5334 has a shape obtained by concatenating four hole sections P1, P2, P3, and P4 into which the shaft section 612 can be respectively inserted. As explained in detail below, the shaft section 612 is inserted into any one of the hole sections P1 to P4, whereby the turning in the ±Y direction of the display section 2 is restricted and the display section 2 is locked.

Note that, like the position of the hole section H1 in the locking section 3334, the position of the hole section P1 is a position where a direction passing the center of the hole section P1 from the center of the shaft supporting section 5332 is a direction inclined 12° to the −Y-direction side with respect to the +Z direction, which is the front direction. In other words, the position of the hole section P1 is a position where an emitting direction of an image by the display section 2 is a direction inclined 12° to the +Y-direction side with respect to the +Z direction when viewed from the +X-direction side or the −X-direction side.

Like the position of the hole section H2 in the locking section 3334, the position of the hole section P2 is a position where a direction passing the center of the hole section P2 from the center of the shaft supporting section 5332 is parallel to the +Z direction. In other words, the position of the hole section P2 is a position where the emitting direction of the image by the display section 2 is parallel to the −Z direction when viewed from the +X-direction side or the −X-direction side.

Like the position of the hole section H3 in the locking section 3334, the position of the hole section P3 is a position where a direction passing the center of the hole section P3 from the center of the shaft supporting section 5332 is a direction inclined 12° to the +Y-direction side with respect to the +Z direction. In other words, the position of the hole section P3 is a position where the emitting direction of the image by the display section 2 is inclined 12° to the −Y-direction side with respect to the +Z direction when viewed from the +X-direction side or the −X-direction side.

Like the position of the hole section H4 in the locking section 3334, the position of the hole section P4 is a position where a direction passing the center of the hole section P4 from the center of the shaft supporting section 5332 is a direction inclined 27° to the +Y-direction side with respect to the +Z direction. In other words, the position of the hole section P4 is a position where the emitting direction of the image by the display section 2 is a direction inclined 27° to the −Y-direction side with respect to the +Z direction when viewed from the +X-direction side or the −X-direction side.

Note that the locking section 5334 and the long hole 51L4, the guide section 5333 and the long hole 51L2, and the guide section 5335 and the long hole 51L3 are opening sections that cause a region on the inner side of the cover section (a region on the display section 2 side) and a region on the outer side of the cover section 5 (a region on the opposite side of the display section 2) to communicate. The locking section 5334 and the long hole 51L4, the guide section 5333 and the long hole 51L2, and the guide section 5335 and the long hole 51L3 are equivalent to the opening section of the invention.

Like the attachment sections 334L and 334R, the attachment sections 534L and 534R are parts to which the end portion in the +X-direction side and the end portion on the −X-direction side are respectively attached in the mounting section 34. As shown in FIG. 27, the attachment section 534R is located on the −Z-direction side with respect to the supporting section 533R. As shown in FIG. 28, the attachment section 534L is located on the −Z-direction side with respect to the supporting section 533L. That is, the attachment section 534R is provided in a part on the −X-direction side on the −Z-direction side in the main body section 53. The attachment section 534L is provided in a part on the +X-direction side on the −Z direction side in the main body section 53. In detail, the attachment section 534R is provided on the −X-direction side on the −Z-direction side with respect to the supporting section 533R. The attachment section 534L is provided on the +X-direction side on the −Z-direction side with respect to the supporting section 533L. Consequently, the mounting section 34 can be easily mounted on the head HD.

[Configuration of the Position Adjusting Mechanism]

FIGS. 29 and 30 are exploded perspective views of the position adjusting mechanism 6 viewed from above on the front side and below on the back side. Note that, in FIGS. 29 and 30, illustration of the light transmitting section 51 and the contact section 52 is omitted.

The position adjusting mechanism 6 receives moving operation for the display section 2 by the user US and locks the display section 2 after the movement. The position adjusting mechanism 6 is provided, according to the supporting section 533L, on the left side for the user US, that is, the +X-direction side with respect to the cover section 5 and to be opposed to the supporting section 533L across the extending direction 51L.

The position adjusting mechanism 6 includes, as shown in FIGS. 29 and 30, the operation section 61, the coupling section 42, the urged section 43, the ring 44, and the urging section 45.

Like the operation section 41, the operation section 61 is a member operated by the user US. The operation section 61 includes a gripping section 611, a shaft section 612, and a housing section 613.

The gripping section 611 is a portion gripped by the fingers of the user US in the operation section 61. Recessed sections 6111 corresponding to the fingertips of the user US are respectively formed on surfaces on the ±Y-direction side in the gripping section 611.

The urged section 43 and the ring 44 are attached to the shaft section 612 in a state in which the shaft section 612 is inserted through the stepped hole 4211 of the coupling section 42 and the urging section 45 in the stepped hole 4211. The distal end portion of the shaft section 612 is inserted through the long hole 51L4 and inserted into any one of the hole sections P1 to P4 of the locking section 5334. Note that, although the outer diameter of the distal end portion of the shaft section 612 is smaller than the diameter of the hole sections P1 to P4, the shaft section 612 is not so small as to be able to move in connecting sections that connect the hole sections P1 to P4. For this reason, as in the position adjusting mechanism 4, for example, when the shaft section 612 inserted into the hole section P1 is inserted into the hole section P2, it is necessary to pull out the shaft section 612 from the hole section P1 and thereafter insert the shaft section 612 into the hole section P2. That is, in a state in which the shaft section 612 is inserted into any one of the hole sections P1 to P4, the display section 2 is locked to the main body section 53. Note that the urged section 43 having a diameter larger than the inner diameter on the −X-direction side in the stepped hole 4211 of the coupling section 42 is provided in a position near the distal end portion of the shaft section 612. Consequently, the shaft section 612 is restricted from being pulled out from the coupling section 42.

The housing section 613 is a recessed section opened to the −X-direction side and is equivalent to the recessed section of the invention. A part on the +X-direction side in the coupling section 42 is housed in the housing section 613 from the −X-direction side.

[Positional Adjustment of the Display Section]

FIG. 31 is a sectional view showing the configuration on the +X-direction side in the head-mounted display device 1A. In detail, FIG. 31 is a view of a part on the +X-direction side on a cross section taken along a XXXI-XXXI line in FIG. 18 viewed from the +Y-direction side. Note that, in FIG. 31, illustration of the contact section 52 and the cable CB is omitted.

Positional adjustment of the display section 2 performed using the position adjusting mechanism 6 is explained.

In a state in which the operation section 61 is not operated by the user US, as shown in FIG. 31, the shaft section 612 respectively inserted through the coupling section 42, the urging section 45, the urged section 43, and the ring 44 in the operation section 61 is inserted into any one of the holes P1 to P4 of the locking section 5334 via the long hole 51L4. In this state, as explained above, the display section 2 is locked to the main body section 53.

When the operation section 61 is moved to the +X-direction side from this state and the distal end portion of the shaft section 612 is pulled out from the locking section 5334 resisting an urging force of the urging section 45, the display section 2 is capable of turning to the ±Y-direction side together with the operation section 61 and the coupling section 42. In this state, the user US moves the gripped operation section 61 in the ±Y direction, whereby the display section 2 is turned in the ±Y direction around the shaft section 213 and the shaft supporting section 3332.

Thereafter, when the user US reduces a tensile force to the +X-direction side on the operation section 61, the shaft section 612 is inserted into any one of the holes P1 to P4 of the locking section 5334 by the urging force of the urging section 45. Consequently, the turning of the display section 2 is restricted and the display section 2 is locked.

In this way, in the head-mounted display device 1A, the display section 2 is disposed in any one of the first posture in which the shaft section 612 is inserted into the hole section P1, the second posture in which the shaft section 612 is inserted into the hole section P2, the third posture in which the shaft section 612 is inserted into the hole section P3, and the fourth posture in which the shaft section 612 is inserted into the hole section P4.

A display surface of an image by the light guide section 24 in the first posture is substantially orthogonal to a direction parallel to a direction passing the center of the hole section P1 from the center of the shaft supporting section 5332. When the display section 2 takes the first posture, the display surface crosses a line of sight of the user US inclined 12° in the downward direction for the user US (the −Y direction) with respect to the +Z direction, which is the front direction. Note that the position of the display section 2 in the first posture is a first position in this embodiment.

The display surface in the second posture is substantially orthogonal to a direction parallel to a direction passing the center of the hole section P2 from the center of the shaft supporting section 5332. When the display section 2 takes the second posture, the display surface crosses a line of sight of the user US parallel to the front direction.

The display surface in the third posture is substantially orthogonal to a direction parallel to a direction passing the center of the hole section P3 from the center of the shaft supporting section 5332. When the display section 2 takes the third posture, the display surface crosses a line of sight of the user US inclined 12° in the upward direction for the user US (the +Y direction) with respect to the front direction.

The display surface in the fourth posture is substantially orthogonal to a direction parallel to a direction passing the center of the hole section P4 from the center of the shaft supporting section 3332. When the display section 2 takes the fourth posture, the display surface crosses a line of sight of the user US inclined 27° in the upward direction for the user US (the +Y direction) with respect to the front direction.

Note that the position of the display section 2 in the third posture or the fourth posture is a second position in this embodiment.

[Configuration of the Coupling Member]

As shown in FIGS. 17 and 22, the coupling member 7 is located on the −X-direction side with respect to the cover section 5. In detail, the coupling member 7 is provided, according to the supporting section 533R, on the right side for the user US, that is, the −X-direction side with respect to the cover section 5 and to be opposed to the supporting section 533R across the extending section 51R. The coupling member 7 is attached to the distal end portions of the bosses 214 and 215 inserted through the guide sections 5333 and 5335 and the long holes 51R2 and 51R3 and couples the bosses 214 and 215.

The coupling member 7 does not include a component that locks the display section 2 to the main body section 53. In this way, the head-mounted display device 1A is simplified in a configuration compared with the head-mounted display device 1. A reduction in the size and a reduction in the weight of the head-mounted display device 1A are achieved compared with the head-mounted display device 1. However, not only this, but the locking section 5334 may be provided in the supporting section 533R and the position adjusting mechanism 6 may be adopted instead of the coupling member 7.

That is, the head-mounted display device 1A may not include the coupling member 7 and may have a configuration in which the position adjusting mechanisms 6 are respectively provided on the +X-direction side and the −X-direction side with respect to the cover section 5 and the locking sections 5334 are respectively provided in the supporting sections 533L and 533R. In the head-mounted display device 1A, the position adjusting mechanism 6 may be provided on the −X-direction side with respect to the cover section 5 and the coupling member 7 may be provided on the +X-direction side with respect to the cover section 5. In other words, the position adjusting mechanism 6 only has to be provided on at least one of the +X-direction side and the −X-direction side with respect to the cover section 5. The locking section 5334 only has to be provided in a supporting section corresponding to the position adjusting mechanism 6 of the supporting sections 533L and 533R.

Effects of the Second Embodiment

With the head-mounted display device 1A according to this embodiment explained above, it is possible to achieve the same effects as the effects of the head-mounted display device 1. Besides, it is possible to achieve the following effects.

The operation section 61 configuring the position adjusting mechanism 6 includes the housing section 613, on the inside of which the coupling section 42 is disposed. Consequently, since the coupling section 42 is housed in the operation section 61, it is possible to reduce a dimension of the position adjusting mechanism 6 in the +X direction. Therefore, it is possible to reduce the head-mounted display device 1A in size.

The position adjusting mechanism 6 is provided only on the +X-direction side with respect to the cover section 5. Consequently, it is possible to achieve a reduction in the size and a reduction in the weight of the head-mounted display device 1A.

Modifications of the Embodiments

The invention is not limited to the embodiments explained above. Modifications, improvements, and the like in a range in which the object of the invention can be achieved are included in the invention.

In the embodiments, the display section 2 includes the image emitting section 22L configured to emit the image for left eye, the image emitting section 22R configured to emit the image for right eye, and the light guide section 24 including the light guide section for left eye 24L configured to guide the image for left eye to the left eye LE of the user US and the light guide section for right eye 24R configured to guide the image for right eye to the right eye RE of the user US. However, not only this, but the display section 2 may include only one of the image emitting section 22L and the light guide section for left eye 24L and the image emitting section 22R and the light guide section for right eye 24R. In this case, a position adjusting mechanism corresponding to the image emitting section 22L and the light guide section for left eye 24L or the image emitting section 22R and the light guide section for right eye 24R only has to be provided in the cover sections 3 and 5.

In the embodiments, the display section 2 is configured to guide the images emitted from the image emitting sections 22L and 22R to the left eye LE and the right eye RE of the user US with the light guide section 24. However, not only this, but the configuration of the display section is not limited to the above description if the display section 2 can display an image visually recognizably by the user US. For example, the display section may include an image display panel disposed in front of the eyes of the user US or may include an image projecting section that projects an image to the retina of the user US.

In the embodiments, the display section 2 is turnably supported by the main body sections 33 and 53 of the cover sections 3 and 5 around the turning axis extending along the left-right direction of the user US who wears the head-mounted display devices 1 and 1A. In other words, the display section 2 is supported to be turnable in the up-down direction for the user US. However, not only this, but the movement of the display section is not limited to the turning in the up-down direction. For example, the display section may be turnably supported around a turning axis extending along the up-down direction for the user US (a turning axis extending along the center axis of the head HD). The movement of the display section is not limited to the turning and may be sliding. For example, the display section may be supported to be slidable in the front-rear direction for the user US (the front direction and the opposite direction of the front direction) or may be supported to be slidable in the up-down direction or the left-right direction for the user US. Further, the moving direction of the display section does not have to be one in the head-mounted display device. The display device may be configured to be movable in a plurality of directions.

In the embodiments, the display section 2 is locked to the positions where the display section 2 takes the first to fourth postures. However, a position where the display section 2 is locked is not limited to the positions where the display sections takes the first to fourth postures. For example, the display section may be configured to be capable of being locked in any position in a movable range of the display section. The display section 2 does not have to be locked in all of the positions where the display section 2 takes the first to fourth postures. For example, the display section may be locked in two positions where the display section 2 takes the first and third postures and may be not locked in two positions where the display section takes the second and fourth postures. In this case, the movable range of the display section may be ranges of the hole sections H1 to H3 and the hole sections P1 to P3.

In the embodiments, the first posture is the posture in which the display section 2 is disposed in the position (the first position) where the display surface of the image crosses the line of sight of the user US inclined 12° in the downward direction with respect to the front direction. In other words, the first posture is the posture in which the display section 2 is disposed in the position (the first position) where the emitting direction of the image by the display section 2 is the direction inclined 12° in the upward direction with respect to the plane orthogonal to the center axis of the head HD. The third posture is the posture in which the display section 2 is disposed in the position (the second position) where the image surface of the image crosses the line of sight of the user US inclined 12° in the upward direction with respect to the front surface. Further, the fourth posture is the posture in which the display section 2 is disposed in the position (the second position) where the display surface of the image crosses the line of sight of the user US inclined 27° in the upward direction with respect to the front direction. In other words, the third and fourth postures are postures in which the display section 2 is disposed in the position (the second position) where the emitting direction of the image by the display section 2 is the direction inclined 12° or 27° in the downward direction with respect to the plane orthogonal to the center axis of the head HD. However, in these postures, an angle of the line of sight of the user US crossing the display surface and an angle of the emitting direction of the image with respect to the plane orthogonal to the center axis of the head HD are not limited to the above. For example, the first posture may be a posture in which a crossing angle (a crossing angle α) with a direction passing the centers of the hole sections H1 and P1 from the centers of the shaft supporting sections 3332 and 5332 with respect to the front direction is 10° in the downward direction. The third posture may be a posture in which a crossing angle (a crossing angle β) with a direction passing the centers of the hole sections H3 and P3 from the centers of the shaft supporting sections 3332 and 5332 with respect to the front direction is 15° in the upward direction.

In the first embodiment, the position adjusting mechanism 4R includes the coupling section 42 coupled to the bosses 214 and 215 inserted through the guide sections 3333 and 3335 and the operation section 41 coupled to the coupling section 42 by inserting the shaft section 412 through the coupling section 42, the gripping section 411 of the operation section 41 being exposed to the outside of the cover section 3. In the second embodiment, the position adjusting mechanism 6 includes the coupling section 42 coupled to the bosses 214 and 215 inserted through the guide sections 5333 and 5335 and the operation section 61 coupled to the coupling section 42 by inserting the shaft section 612 through the coupling section 42, the gripping section 611 of the operation section 61 being exposed to the outside of the cover section 5. However, not only this, but the position adjusting mechanism 4R may have an integrated configuration of the operation section 41 and the coupling section 42 if the shaft section 412 can be inserted into and pulled out from the hole sections H1 to H4 of the locking section 3334. The same applies to the position adjusting mechanism 4L. The position adjusting mechanism 6 may include an integrated configuration of the operation section 61 and the coupling section 42 if the shaft section 612 can be inserted into and pulled out from the holes P1 to P4 of the locking section 5334.

The coupling section 42 is not limited to the configuration in which the coupling section 42 is coupled to each of the bosses 214 and 215. The coupling section 42 may be coupled to only one of the bosses 214 and 215. Note that the two bosses 214 and 215 and the coupling section 42 are coupled, whereby the coupling section 42 is turned. It is possible to prevent moving operation for the display section 2 by the operation sections 41 and 61 from being less easily carried out.

Further, the configuration of the position adjusting mechanism for adjusting the position of the display section 2 from the outside of the cover section 3 is not limited to the configuration of the position adjusting mechanisms 4 (4L and 4R) and 6 and may be other configurations.

In the first embodiment, the guide sections 3333 and 3335 that guide the turning of the display section 2 are formed in the supporting sections 333L and 333R of the main body section 33 configuring the cover section 3. In the second embodiment, the guide sections 5333 and 5335 that guide the turning of the display section 2 are formed in the supporting sections 533L and 533R of the main body 53 configuring the cover section 5. The display section 2 includes, in the housing sections 212L and 212R, the boss 214 inserted into the guide sections 3333 and 5333 and the boss 215 inserted into the guide sections 3335 and 5335. However, not only this, but the display section may include the guide section and the cover section may include the boss inserted into the guide section. Similarly, the cover may include the shaft section and the display section may include the shaft supporting section into which the shaft section is inserted.

In the first embodiment, the cover attachment sections 35L and 35R configuring the cover section 3 turnably support the protection covers 36L and 36R around the turning axis extending along the +Y direction. The protection covers 36L and 36R are turned to the −Z-direction side to cover and protect the operation section 41 and are turned to the +Z-direction side to expose the operation section 41. However, not only this, but the protection covers 36L and 36R may be absent as in the head-mounted display device 1A explained in the second embodiment. Even when the protection cover is provided, a moving direction of the protection cover is not limited to the above explanation. For example, the protection cover may slide along the cover section to thereby expose the operation section 41 or may be detached from the cover section to expose the operation section 41.

On the other hand, in the second embodiment, the head-mounted display device 1A does not include the protection covers 36L and 36R. However, not only this, but the head-mounted display device 1A may include a protection cover that is moved in one direction to expose the position adjusting mechanism 6 and is moved to the other direction to cover the position adjusting mechanism 6.

In the first embodiment, in the head-mounted display device 1, in a state in which the protection covers 36L and 36R are turned to the +Z-direction side and the operation section 41 is exposed, parts of the housing sections 212L and 212R in the display section 2 are exposed via the opening sections 357 of the cover attachment sections 35L and 35R included in the cover section 3, the guide sections 3333 and 3335, and the locking section 3334. In the second embodiment, in the head-mounted display device 1A, a part of the housing section 212L in the display section 2 is exposed via long holes 51L2 to 52L4, the guide sections 5333 and 5335, and the locking section 5334. However, not only this, but, in the head-mounted display devices 1 and 1A, even in a state in which the operation sections 41 and 61 are operable, internal spaces formed by the face of the user US wearing the head-mounted display device 1 or 1A and the covers 3 and 5 may be hermetically sealed and waterproofed.

In the embodiments, the light transmitting sections 31 and 51 are opposed to the light guide section 24 (the light guide section for left eye 24L and the light guide section for right eye 24R) of the display section 2 in the +Z-direction side. However, not only this, but the transmitting section may be provided to be opposed to the display section 2 on at least anyone of the +X-direction side, the −X-direction side, the +Y-direction side, and the −Y-direction side. For example, the entire cover sections 3 and 5 may be configured by a light transmissive member and the light transmitting section may be configured to be opposed to the display section 2 on the +X-direction side, the −X-direction side, the +Y-direction side, and the −Y direction side.

In the embodiments, the head-mounted display devices 1 and 1A include the cover sections 3 and 5 having the goggle-like shape. However, not only this, but, as the cover section located on the opposite side of the emitting side of the image to the display section 2, a cover section like a mask (a facepiece) that covers the entire face of the user may be adopted. That is, the shape of the cover section can be changed as appropriate.

In the second embodiment, the coupling section 42 configuring the position adjusting mechanism 6 is housed in the housing section 613 of the operation section 61. However, not only this, but the operation section 61 does not always have to include the housing section 613.

In the embodiments, the head-mounted display devices 1 and 1A applied with the configuration of the invention are explained as the example of the virtual image display device. However, not only this, but the invention is also applicable to a virtual image display device of a hand-held type held by a hand and used and a virtual image display device such as a sightseeing telescope used by peeking into a display section set on the inside.

The head-mounted display device of the invention, the forms of which are respectively explained in the embodiments, can be used for various uses. For example, virtual image display devices including the head-mounted display devices explained in the embodiments can be used in sites of fire, disaster, construction work, security guard, agriculture, medicine, and the like. Besides, the head-mounted display devices can be used in work in factories, homes, and the like. That is, uses of head-mounted display devices and virtual display devices to which the invention is applicable are not particularly limited.

REFERENCE SIGNS AND NUMERALS 1, 1A . . . head-mounted display device,
2 . . . display section,
21 . . . frame,
212L, 212R . . . housing section,
214, 215 . . . boss,
22L, 22R . . . image emitting section,
24 . . . light guide section,
24L . . . light guide section for left eye,
24R . . . light guide section for right eye,
3, 5 . . . cover section,
31, 51 . . . light transmitting section,
32, 52 . . . contact section,
33, 53 . . . main body section,
331, 531 . . . first extending section,
332L, 332R, 532L, 532R . . . second extending section,
333L, 333R, 533L, 533R . . . supporting section,
3333, 3335, 5333, 5335 . . . guide section, 3334, 5334 ... locking section,
334L, 334R, 534L, 534R ... attachment section,
35L, 35R ... cover attachment section,
351 ... hole section,
352 ... turning supporting section,
353 ... bent section,
354 ... locking claw,
355, 356 ... covered section,
357 ... opening section,
36L, 36R ... protection cover,
361 ... supported section,
362 ... recessed section,
363 ... recessed section,
(4L, 4R), 6 ... position adjusting mechanism,
41, 61 ... operation section,
42 ... coupling section,
613 ... housing section (recessed section),
S ... screw

The invention claimed is:

1. A head-mounted display device comprising:
a display section disposed in front of eyes of a user and configured to display an image;
a cover section wearable on the user and configured to cover the display section when viewed from a position immediately opposed to the user; and
a position adjusting mechanism capable of adjusting a position of the display section on an opposite side of the display section side across the cover section, wherein
the cover section includes a light transmitting section opposed to the display section,
the cover section includes an opening section configured to cause the display section side and an opposite side of the display section with respect to the cover section to communicate, and
the position adjusting mechanism includes:
a coupling section coupled to the display section; and
an operation section, one end of which is connected to the coupling section via the opening section and another end of which is exposed to the opposite side of the display section with respect to the cover section.

2. The head-mounted display device according to claim 1, wherein the display section includes:
an image emitting section configured to emit the image; and
a light guide section having light transmissivity and configured to guide the image emitted from the image emitting section to the eyes of the user.

3. The head-mounted display device according to claim 1, wherein the display section is supported by the cover section to be turnable around a turning axis extending along a left-right direction of the user.

4. The head-mounted display device according to claim 3, wherein, the position adjusting mechanism is configured to lock the display section in a first position and a second position, the first position being downward with respect to a line of sight of the user and the second position being upward with respect to the line of sight of the user.

5. The head-mounted display device according to claim 4, wherein the first position is 12° downward.

6. The head-mounted display device according to claim 3, wherein
the cover section includes a supporting section configured to cross the turning axis and support the display section, and
the position adjusting mechanism is provided according to the supporting section.

7. The head-mounted display device according to claim claim 1, wherein
one of the display section and the cover section includes a guide section extending along a moving direction of the display section, and
another of the display section and the cover section includes a boss inserted into the guide section.

8. The head-mounted display device according to claim 7, wherein
the cover section includes the guide section,
the display section includes the boss, and
the coupling section is coupled to the boss.

9. The head-mounted display device according to claim 1, wherein the cover section includes a protection cover configured to move in one direction to expose the operation section and move in another direction to cover the operation section.

10. The head-mounted display device according to claim 1, wherein the operation section includes a recessed section, on an inside of which the coupling section is disposed.

11. A head-mounted display device comprising:
a display section configured to emit an image to a predetermined visual recognition position and display the image;
a cover section located on an opposite side of an emission side of the image by the display section with respect to the display section; and
a position adjusting mechanism capable of adjusting a position of the display section on an opposite side of the display section side across the cover section, wherein
the cover section includes a light transmitting section opposed to the display section,
the cover section includes an opening section configured to cause the display section side and an opposite side of the display section with respect to the cover section to communicate, and
the position adjusting mechanism includes:
a coupling section coupled to the display section; and
an operation section, one end of which is connected to the coupling section via the opening section and another end of which is exposed to the opposite side of the display section with respect to the cover section.

12. The head-mounted display device according to claim 11, wherein the display section includes:
an image emitting section configured to emit the image; and
a light guide section having light transmissivity and configured to guide the image emitted from the image emitting section to the visual recognition position.

13. The head-mounted display device according to claim 12, wherein the light transmitting section is opposed to the light guide section.

14. The head-mounted display device according to claim 11, wherein the display section is supported by the cover section to be turnable around an axis extending along a horizontal direction of the image displayed by the display section.

15. The head-mounted display device according to claim 14, wherein the position adjusting mechanism is configured to be capable of locking the display section in a plurality of positions in a turning range of the display section around the turning axis.

16. The head-mounted display device according to claim 15, wherein the plurality of positions include a first position where an emitting direction of the image by the display section is an upward direction and a second position where the emitting direction of the image by the display section is a downward direction.

17. The head-mounted display device according to claim 16, wherein the first position is a position where the emitting direction of the image by the display section crosses a plane orthogonal to a center axis of a head of the user wearing the head-mounted display device at a crossing angle of 12°.

* * * * *